United States Patent [19]

Phillips

[11] Patent Number: 5,249,503
[45] Date of Patent: Oct. 5, 1993

[54] VARIABLE RATIO REACTION VALVE

[75] Inventor: Edward H. Phillips, Middletown, Calif.

[73] Assignee: William J. Weinstock, Birgmingham, Mich.

[21] Appl. No.: 485,637

[22] Filed: Feb. 23, 1990

Related U.S. Application Data

[63] Continuation-in-part of Ser. No. 461,541, Jan. 5, 1990, abandoned.

[51] Int. Cl.$^5$ .............................................. F15B 9/10
[52] U.S. Cl. ............................. 91/375 A; 137/625.24; 137/625.21
[58] Field of Search ...................... 91/368, 374, 375 R, 91/375 A; 137/625.21, 625.22, 625.23, 625.24, 625.25, 493.1, 493.5, 493.8, 493.9

[56] References Cited

U.S. PATENT DOCUMENTS

| | | | |
|---|---|---|---|
| 1,947,991 | 2/1934 | Jessup . | |
| 4,310,024 | 1/1982 | Bacardit | 91/375 R X |
| 4,499,922 | 2/1985 | Tanguy | 91/375 A X |
| 4,561,516 | 12/1985 | Bishop et al. | 137/625.17 X |
| 4,577,660 | 3/1986 | Haga et al. | 91/375 A X |
| 4,592,389 | 6/1986 | Yamada et al. | 137/625.21 X |
| 4,644,846 | 2/1987 | Kozuka | 91/375 A X |
| 4,799,514 | 1/1989 | Tanaka et al. | 91/375 R X |
| 4,848,402 | 7/1989 | Elser et al. | 91/375 R X |
| 4,924,910 | 5/1990 | Tabata et al. | 91/375 A X |

Primary Examiner—Edward K. Look
Assistant Examiner—Todd Mattingly
Attorney, Agent, or Firm—Gifford, Groh, Sprinkle, Patmore and Anderson

[57] ABSTRACT

A reaction type control valve, primarily intended for controlling a power assisted steering system, comprising a hydraulic interface having variable effective reaction areas, the extent of which is determined by selected functions of values of torque applied thereto. Differential hydraulic fluid pressure is generated by the valve, which differential hydraulic fluid pressure is proportional to the applied torque and inversely proportional to any particular effective reaction area. Hydraulic fluid is induced to flow through a hydraulic interface between first and second valve members wherein primary and secondary sets of input and return orifices are selectively utilized to define the effective reaction areas as a function of the input torque. The primary and secondary sets of input and return orifices are located at selected radii. The selected radii locating the primary sets of input and return orifices comprise first and second radii, respectively, wherein the first radii are smaller in value than the second radii. The selected radii locating the secondary sets of input and return orifices comprises third and fourth radii, respectively, wherein the third radii are smaller in value than the fourth radii. And, the difference between the second radii and the first radii is greater than the difference between the fourth radii and the third radii.

21 Claims, 41 Drawing Sheets

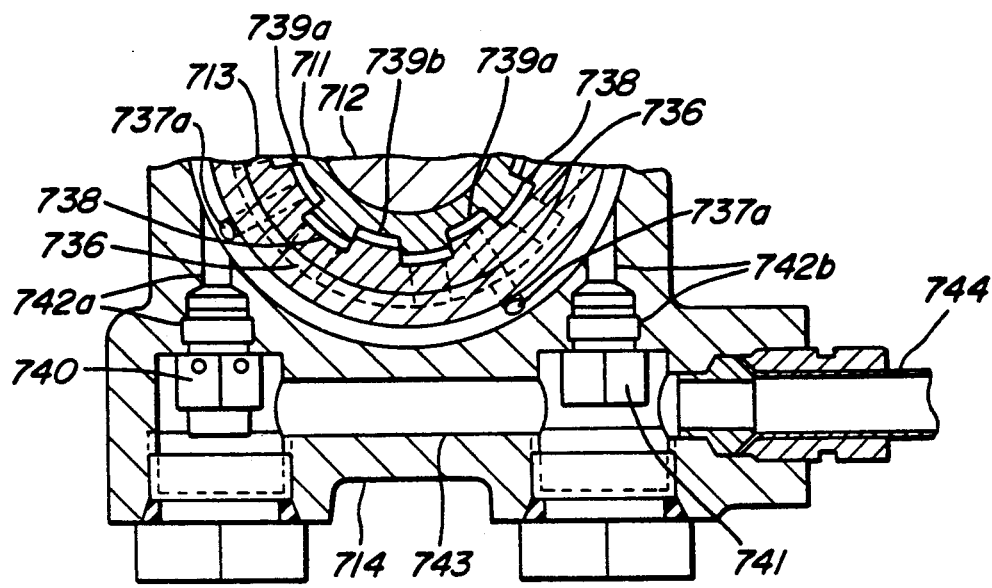
Fig-22B
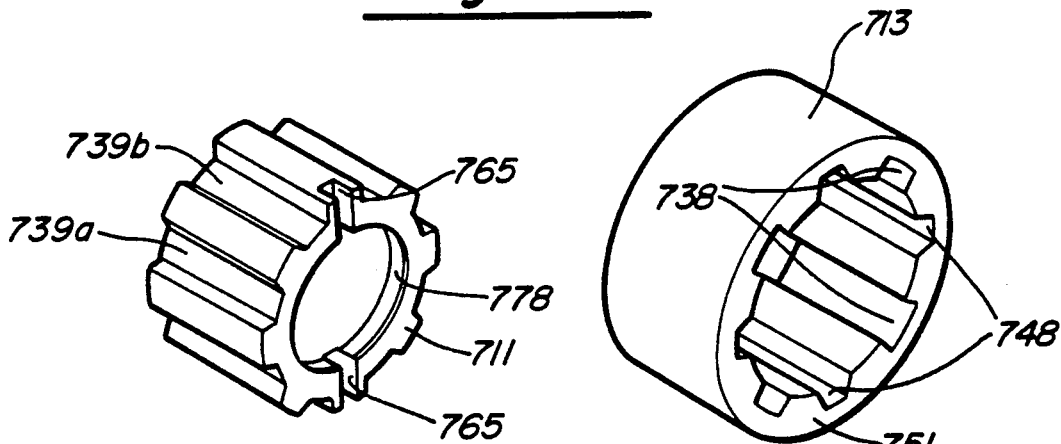
Fig-23A
Fig-23B
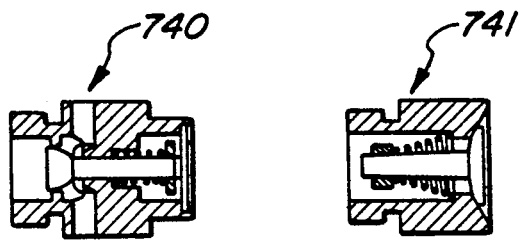
Fig-24A
Fig-24B

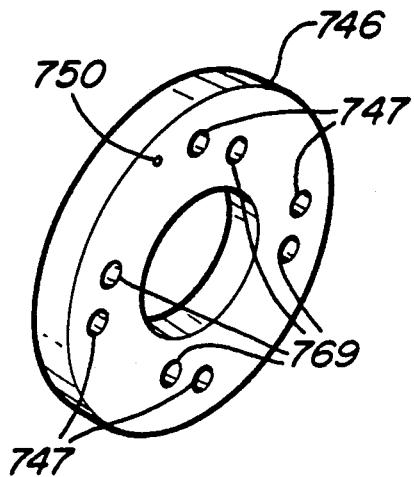
_Fig-25B_
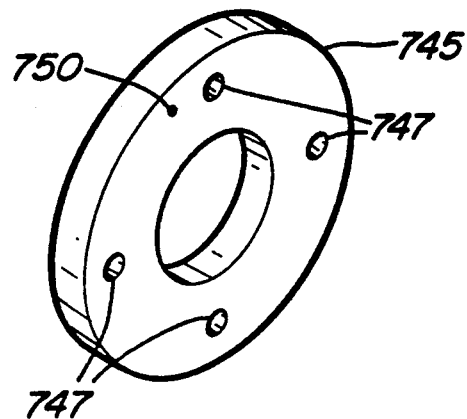
_Fig-26A_
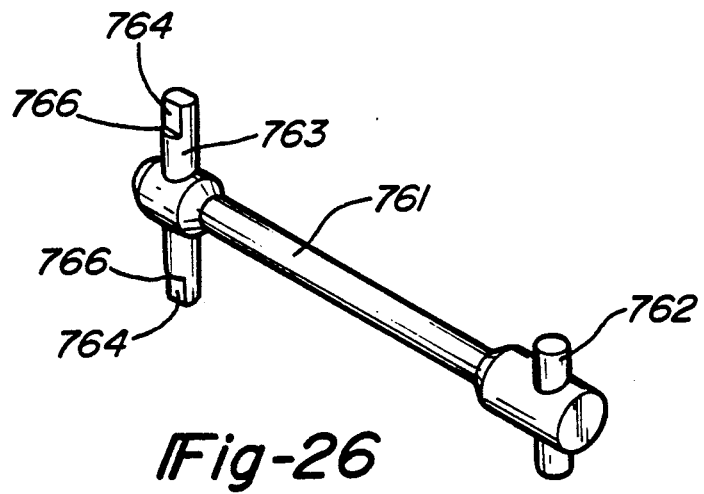
_Fig-26_

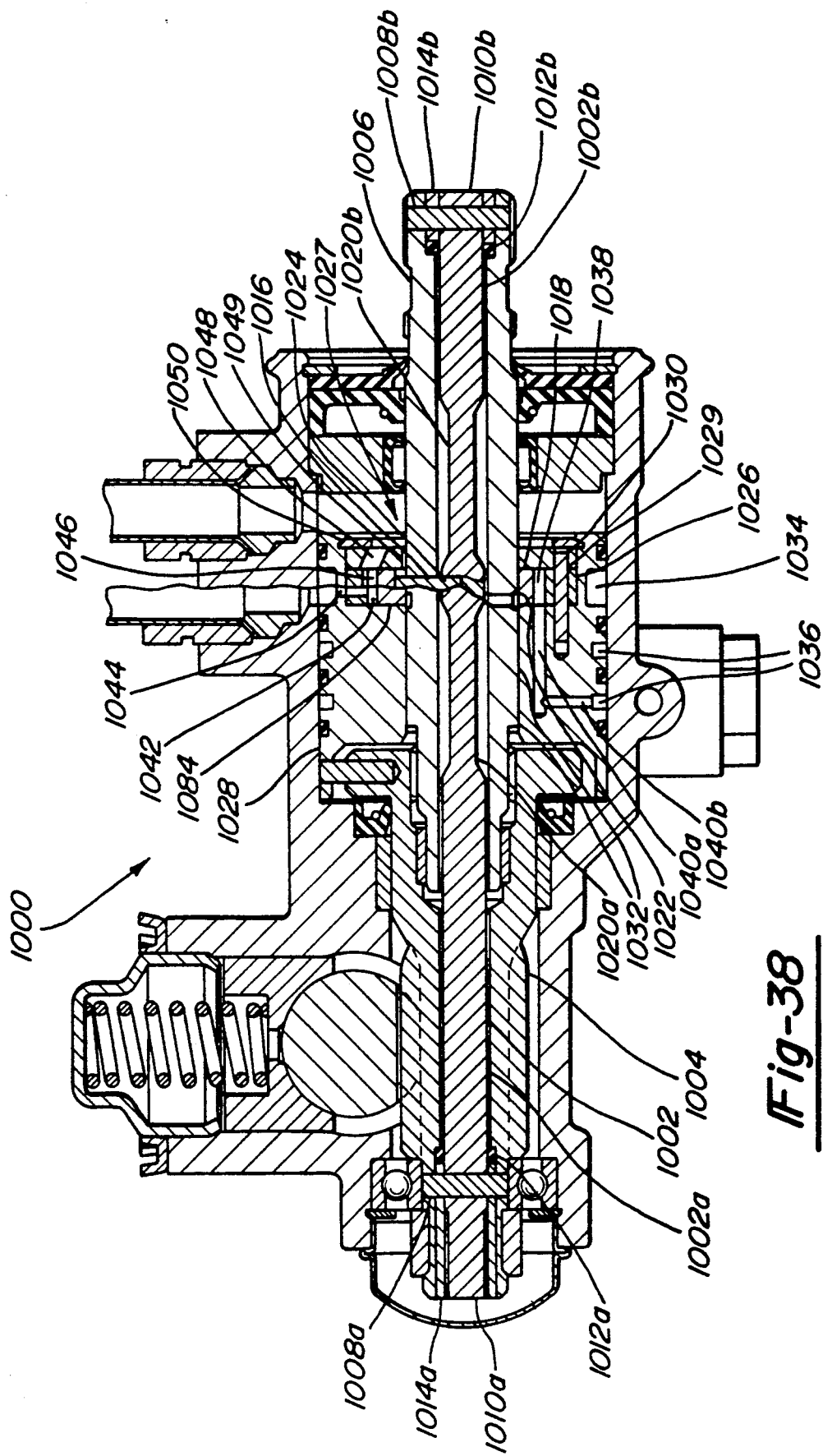

VARIABLE RATIO REACTION VALVE

CROSS-REFERENCE TO RELATED APPLICATION

This is a continuation-in-part application of U.S. patent application Ser. No. 461,541 filed on Jan. 5, 1990 (now abandoned).

TECHNICAL FIELD

This invention relates generally to hydraulically controlled power steering systems and particularly to such systems which utilize four-way open-center hydraulic reaction control valves.

BACKGROUND OF THE INVENTION

Four-way open-center control valves (hereinafter "four-way valves") which use constant flow rate hydraulic power sources are commonly utilized for controlling vehicular power steering systems. Such systems typically employ a four-way rotary valve having "follow along" position feedback. Road feel is artificially induced by deflection of a torsion bar.

An earlier type of power steering system provided feedback partially proportional to actual steering effort. This power steering system featured a four-way open-center hydraulic reaction control valve (hereinafter "reaction valve"). However, such systems were relatively expensive to manufacture and were generally replaced in this country by rotary valve equipped power steering systems. (Note, however, reaction valve equipped power steering systems are still commonly manufactured overseas.)

A rotary valve is a four-way open-center flow control valve which has circumferentially close fitting inner and outer valve members. The inner and outer valve members usually feature four sets each of pressure, first and second output, and return slots. These four sets of slots are equally spaced (at 90 degrees) around the interfacing circumferences of the inner and outer valve members. Differentially controlled output flows in the first and second output slots are obtained by rotationally displacing the inner valve member with respect to outer valve member.

The open-center configuration of the rotary valve allows a nominally constant flow hydraulic fluid source to be utilized. In normal operation, at other than small valve displacements, system supply pressure nominally approximates differential output pressure (hereinafter "output pressure"). This results in minimum system power consumption but results in wildly erratic system control characteristics wherein assist levels can vary by more than 40:1.

In preferred embodiments of the invention, hydraulic reaction torque is generated between inner and outer valve members which are formed with multiple control orifices having differing radii. The control orifices comprise input control orifices which meter fluid from a constant flow hydraulic fluid source into an output port and return control orifices which meter fluid returned therefrom to a tank.

The input control orifices are formed at smaller radii than the return control orifices. Thus, output pressure between the first and second output ports is additively applied to either side of each of a plurality of effectively enlarged ridge sections which form the return control orifices. The product of the output pressure, the summed areas of the enlarged ridge sections, and their effective radii generates the hydraulic reaction torque.

Output pressure is coupled to a utilization device, such as a power cylinder, via flow restrictors. The flow restrictors are controlled orifice devices which have a nominally linear flow resistance characteristic. For this reason, values of differential pressure applied to the utilization device are different than the output pressure. The change in output pressure is nominally proportional to fluid flow rate through the utilization device. This results in a controlled damping ratio and stable operation of systems incorporating the flow restrictors of the present invention.

Improved performance can be obtained from a servo system comprising a torque reaction valve by introducing an orifice in parallel with a utilization device also comprised within the servo system. Fluid flow rate through the orifice improves system damping and results in an improved control characteristic wherein over-sensitive response to small involuntary control inputs is precluded.

In a first set of preferred embodiments, U.S. patent application Ser. No. 461,541 discloses four-way torque reaction valves which comprise an outer valve member directly coupled to an input shaft. The outer valve member comprises various hydraulic slip rings which are subject to substantial hydraulic pressures and are sealed via four seal rings in a known manner. However, because the outer valve member is directly coupled to the input shaft, the seal rings can provide excessive tangential drag on the input shaft when system pressures are high. Thus, in accordance with a second set of preferred embodiments of that invention, torque reaction valves comprising tangentially non-constrained input shafts are also described. This is accomplished via mechanically coupling the input shaft to a torsionally compliant spring member utilized for applying torque to a tangentially floating inner valve member.

A power steering system utilizing either of the torque reaction valves described above exhibits a substantially linear characteristic wherein steering wheel torque is proportional to steering load. However, some prefer a non-linear torque reaction valve wherein moderately increasing values of hydraulic gain are provided concomitantly with increasing steering loads. This enables increased tactile feel of lighter steering loads concomitant with relatively decreased values of steering wheel torque at higher steering loads.

It has been found that a torque reaction valve having an even stronger non-linear characteristic is desired. Furthermore, the predominant non-linearities of such a valve should be present at highest steering loads. Because input torque is linearly dependent upon the summed effective differential area (hereinafter "effective area") of the torque reaction valve, as described above, this new requirement can most effectively be met via reducing the effective area as a function of output pressure.

SUMMARY OF THE INVENTION

In preferred embodiments of the present invention, improved torque reaction valves are disclosed wherein effective reaction area varies as a function of input torque. As input torque is increased, effective reaction area decreases as a function of valve motion and therefore output pressure. Thus, the ratio between output pressure and input torque concomitantly increases whereby the improved torque reaction valves may be described as variable ratio reaction valves.

In the variable ratio reaction valves, a torsion bar is utilized as the compliant spring member mentioned above. The torsion bar is utilized to couple torque from an input shaft to a tangentially floating inner valve member. A torsion bar extension additionally couples a portion of the input torque directly to a pinion shaft member of an output rack-and-pinion set of a host power steering system. An outer valve member is directly coupled to the pinion shaft. An effective hydraulic interface area disposed between the inner and outer valve members transmits the remaining portion of the input torque to the outer valve member from whence it is directly applied to the pinion shaft as well.

Output pressure proportional to the ratio of the remaining portion of the applied torque divided by the effective area is generated by the variable ratio reaction valves. The output pressure is delivered to a double-acting cylinder of the host power steering system. The product of the output pressure and the piston area of the double-acting cylinder comprises steering assist force which supplements mechanical steering force directly generated via a rack member of the output rack-and-pinion set.

The effective area varies as a function of applied torque via the following method: Secondary sets of control orifices, which are hydraulically in series with the primary sets of control orifices described above, supplement the pressure controlling process within the variable ratio reaction valves. The secondary sets of control orifices are formed at radii much closer in value than the primary sets of control radii. In addition, each of the primary sets of control orifices are formed with radial clearance between their inner and outer control edges whereby pressure control smoothly inverts from a nominally equally shared pressure control to dominant pressure control by the secondary sets of control orifices. In a modified variable ratio reaction valve, the primary sets of control orifices are partially defined by a sloping surface whereby dominant pressure control smoothly inverts from the primary sets of control orifices to the secondary sets of control orifices.

In each case, as applied torque values increase, the net closure rate of the secondary set of control orifices becomes greater than that of the primary set of control orifices. Thus, the secondary set of control orifices progressively become dominant in determining pressure drops within the variable ratio reaction valve. Since the interface area determined by the secondary set of control orifices is smaller than that of the primary set of control orifices, the rate of change, or gain, of output pressure to the input torque is greater at higher values of input torque.

Two practical mechanical design aspects of the variable ratio reaction valves are also addressed herein. Firstly, a radial over-constraint resulting from utilizing a single torsion bar for both the previously described torsion bar and torsion bar extension functions is discussed. The over-constraint results from the torsion bar being attached at three points; the input shaft, the inner valve member and the pinion shaft. This over-constraint is ameliorated by making all attachments via co-planer pins. In the pin axes plane, infinite compliance is obtained at the center attachment point because that pin is a slip fit in a hole in the torsion bar. And, by preferred placement of reduced diameters portions of the torsion bar, radial compliance of center attachment point in the orthogonal direction, about the pinned ends of the torsion bar, is maximized.

Secondly, the inner valve member is subject to widely varying pressures between the various slots and control orifices on its outer periphery and its inside diameter. Thus, leakage flow occurs across its end surfaces. Pressure distributions thereon depend upon the fine geometry of the surfaces of the inner valve member and members on either end of the inner valve member which define the leakage flow channels. Asymmetrical pressure distributions resulting therefrom could cock and/or drive the inner valve member against one, or both, of the members on either end. This could result in excessive friction which could result in the inner valve member being held securely against the members on either end—a condition commonly referred to as "hydraulic lock".

Lateral force induced hydraulic lock in spool valves is a serious problem because it is normally not feasible to form hydrostatic bearing surfaces which support the spool member of such spool valves. Thus, multiple circumferential grooves are often formed on lands of the spool members. Then fluid merely flows around the lands and limits lateral pressure build-up.

However, in the case of the variable ratio reaction valves, it is possible to eliminate the problem at its source. This can be accomplished by lapping each end of the inner valve member so as to form a slightly convex surface thereon. The resulting converging leakage flow channels effectively form hydrostatic bearings which fluidically center the inner valve member between the members on either end.

BRIEF DESCRIPTION OF THE DRAWINGS

FIG. 22B is a transverse section view of the hand operated controller of FIG. 22A depicting placement of damper and check valves used therein.

FIGS. 23A and 23B are isometric views of inner and outer valve members used in the hand operated controller of FIG. 22A.

FIGS. 24A and 24B are sectional views of the damper and check valves used in the hand operated controller of FIG. 22A.

FIGS. 25A and 25B are isometric views of alternate barrier rings used in the hand operated controller of FIG. 22A to configure it as a four or three-way valve, respectively.

FIG. 26 is an isometric view of a torsion bar used in the hand operated controller of FIG. 22A.

FIG. 38 is a section view of a variable ratio reaction valve which comprises follow along position feedback.

DESCRIPTION OF THE PREFERRED EMBODIMENTS

The present invention embodies apparatus and control methods which enable proportional and stable control of the position of a hydraulically actuated, double acting utilization device. In the present invention, a four-way torque reaction valve is provided wherein reaction torque is generated within the four-way torque reaction valve itself. This is accomplished by applying output pressure directly between differential surfaces of first and second valve members. Torque application therebetween is unopposed by any spring member analogous to those commonly found on known types of reaction valves. One example is that of a so-called "star" valve as described in U.S. Pat. No. 4,217,932 by Juan S. Bacardit which is entitled HYDRAULIC ROTARY DISTRIBUTER, PARTICULARLY FOR USE IN POWER STEERING SYSTEMS and was issued on Aug. 19, 1980.

Closed-loop servo systems utilizing the four-way torque reaction valve of the present invention to position a mass are stabilized by energy loss associated with motion of the mass. In order to positively control the magnitude of such energy loss, a damper valve assembly, also of the present invention, may be introduced into hydraulic circuits comprised within such closed-loop servo systems.

Figure 1:
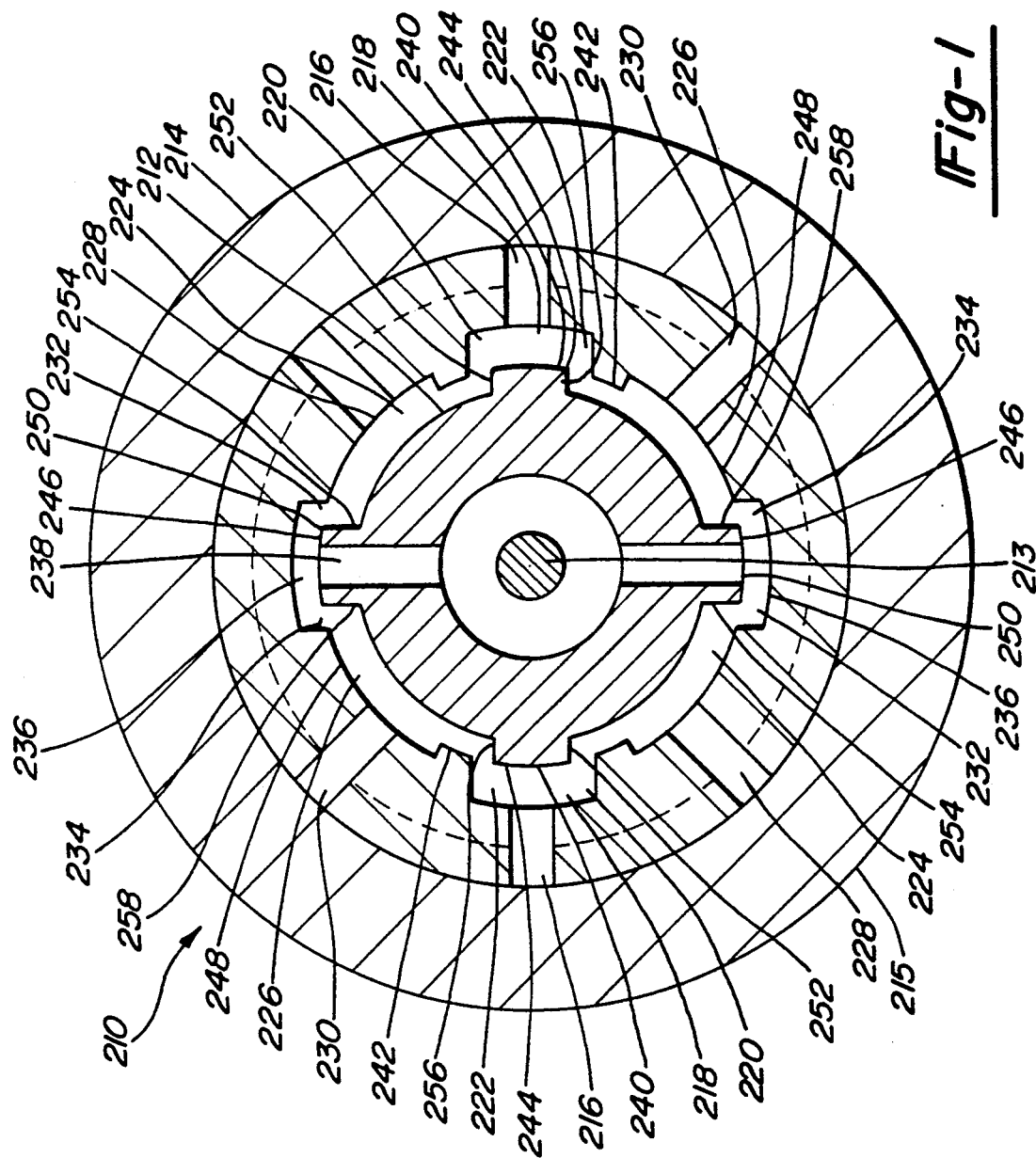
FIG. 1 is a diametrical section view of a torque reaction valve according to a preferred embodiment of the present invention.

Shown in FIG. 1 is a diametrical section view of a four-way torque reaction valve 210. The four-way torque reaction valve 210 comprises a torsion bar 213, inner and outer valve members 212 and 214, respectively, and a valve body 215. As will be described below, input torque is applied to the outer valve member 214 while feedback torque is applied to the inner valve member 212 via the torsion bar 213. Then the magnitude of the resulting output pressure is linearly related to the applied torque.

Fluid from the constant flow hydraulic fluid source (not shown) flows into the four-way torque reaction valve 210 via input ports 216 and into pressure slots 218. The fluid then flows past either or both sets of first and second input control orifices 220 and 222, respectively, to sets of first and second output slots 224 and 226, respectively. A selected portion of the fluid flows out one of first and second output ports 228 and 230, respectively, to a double acting utilization device (not shown) and returns therefrom via the other one of the first and second output ports 228 and 230, respectively. The fluid then flows past either or both sets of first and second return control orifices 232 and 234, respectively, into return slots 236 The fluid is then returned to a tank (not shown) via return ports 238 and an internal drain path (also not shown).

All of the above described ports, slots and control orifices are depicted as balanced sets of two ports, slots and control orifices, respectively. Such balanced pairs of ports, slots and control orifices eliminate radial forces between the inner and outer valve members 212 and 214, respectively. In general, any number, N, of ports, slots and control orifices greater than one (arranged, however, in a balanced manner) may be utilized for the various sets of ports, slots and control orifices. Sets of four (i.e., N=4) ports, slots and control orifices are particularly common.

Outside surfaces 240 of the inner valve member 212 and inside surfaces 242 of the outer valve member 214 comprise functional surfaces of the first and second sets of input control orifices 220 and 222, respectively, and are radially sized with minimal clearance therebetween. Lands 244 of the inner valve member 212 are formed selectively narrower than the pressure slots 218 of the outer valve member 214 in order to effect proper underlapped valve input orifice (i.e., open center) characteristics. Similarly, outside surfaces 246 of the inner valve member 212 and inside surfaces 248 of the outer valve member 214 comprise functional surfaces of the first and second sets of return control orifices 232 and 234, respectively, and are sized with minimal clearance therebetween. Lands 250 of the inner valve member 212 are formed selectively narrower than the return slots 236 of the outer valve member 214 in order to effect underlapped valve return orifice characteristics.

Output pressure comprises the difference between first and second values of pressure present in the first and second output slots 224 and 226, respectively. The first and second values of pressure communicate with both lateral surfaces 252 and 254, and lateral surfaces 256 and 258, respectively. In addition, the outside surfaces 246 of the inner valve member are formed at larger radii than the outside surfaces 240 of the inner valve member. Thus, the lateral surfaces 254 and 258 are larger in area and are located at larger effective radii than the lateral surfaces 252 and 256, respectively. Therefore, non-zero output pressures will concomitantly generate torque between the inner valve member 212 and the outer valve member 214. The torque generated therebetween is determined by $$T = A_v P R_v$$

where T is the torque, $A_v$ is effective net valve area (and is equal to the product of the difference in radii between the outside surfaces 246 and the outside surfaces 240, length of the valve, and N), P is the output pressure and $R_v$ is the effective radius of the effective net valve area, $A_v$.

Figure 2:
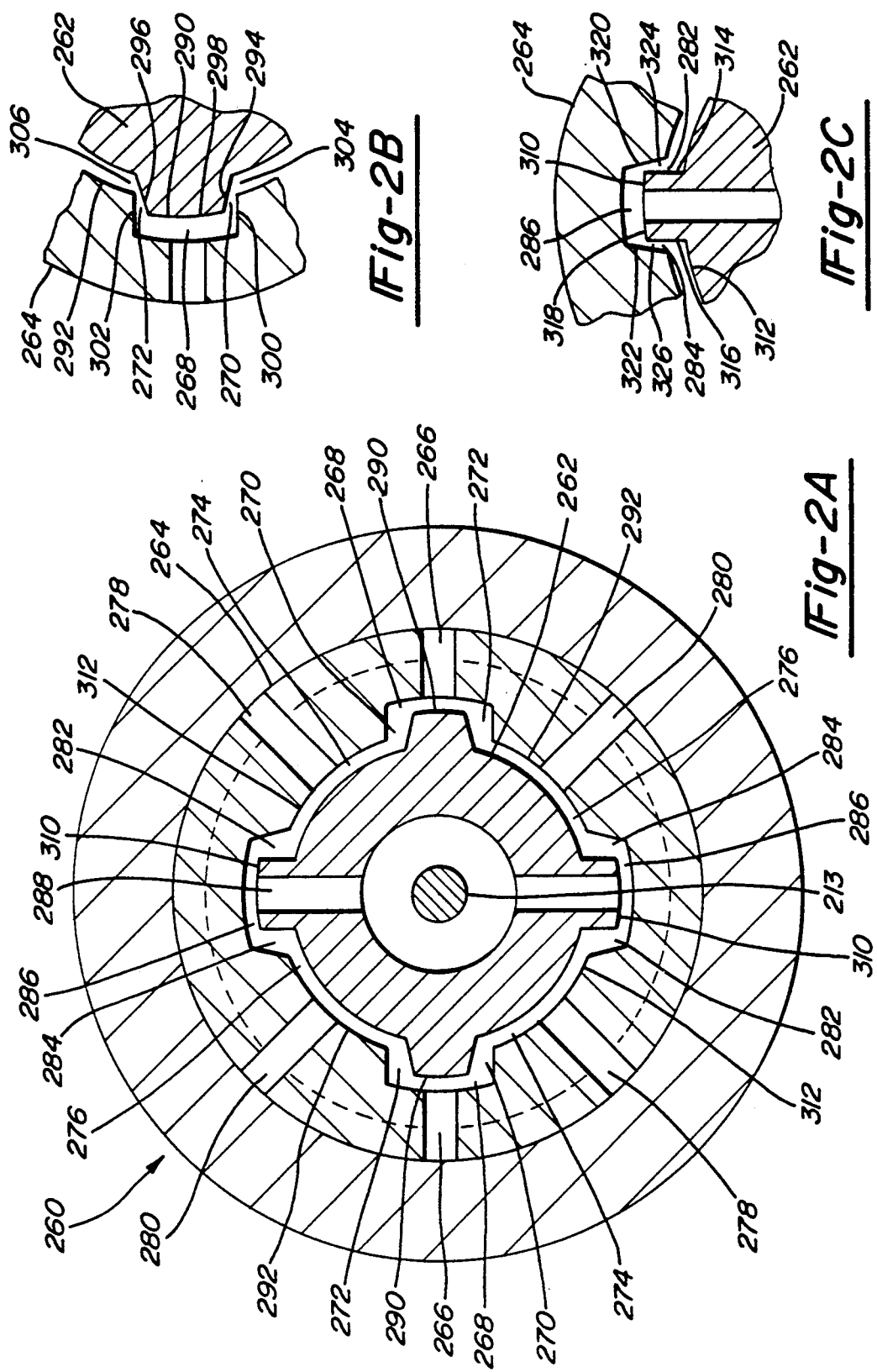
FIG. 2A is a diametrical section view of a torque reaction valve according to an alternate preferred embodiment of the present invention.
FIGS. 2B and 2C are enlarged sectional views of an inlet control orifice and a return control orifice, respectively, of the torque reaction valve of FIG. 2A.

Shown in FIG. 2A is a diametrical section view of an another preferred embodiment of a four-way torque reaction valve 260 also of the present invention. The four-way torque reaction valve 260 comprises inner and outer valve members 262 and 264, respectively. Fluid from a constant flow hydraulic fluid source (not shown) flows into the four-way torque reaction valve 260 via input ports 266 and into pressure slots 268. The fluid then flows past either or both sets of first and second input control orifices 270 and 272, respectively, to sets of first and second output slots 274 and 276, respectively. A selected portion of the fluid flows out one of first and second output ports 278 and 280, respectively, to a double acting utilization device (not shown) and returns therefrom via the other one of the first and second output ports 278 and 280, respectively. The fluid then flows past either or both sets of first and second return control orifices 282 and 284, respectively, into return slots 286. The fluid is then returned to a tank (not shown) via return ports 288 and an internal drain path (also not shown).

All of the above described ports, slots and control orifices are depicted as balanced sets of two ports, slots and control orifices, respectively. Such balanced pairs of ports, slots and control orifices eliminate radial forces between the inner and outer valve members 262 and 264, respectively. In general, any number of ports, slots and control orifices greater than one (arranged, however, in a balanced manner) may be utilized for the various sets of ports, slots and control orifices. Sets of four ports, slots and control orifices are particularly common.

Outside surfaces 290 of the inner valve member 262 are formed at a larger radius than inside surfaces 292 of the outer valve member 264. This is shown more clearly in FIG. 2B which is an enlarged sectional view of one set of a pressure slot 268 and first and second input control orifices 270 and 272, respectively. The first and second input control orifices 270 and 272, respectively, comprise lateral surfaces 294 and 296 of a land 298 of the inner valve member 262 and lateral surfaces 300 and 302 of the pressure slot 268, respectively. The lateral surfaces 294 and 296, and the lateral surfaces 300 and 302, are formed such that gaps 304 and 306 therebetween become progressively narrower with respect to fluid flow direction which occurs from larger to smaller radii therebetween. Thus, the first and second input control orifices 270 and 272, respectively, are formed in the manner of reducing nozzles whose exit widths are the minimum values of the gaps 304 and 306, respectively.

Outside surfaces 310 of the inner valve member 262 are formed at a larger radius than inside surfaces 312 of the outer valve member 264. This is shown more clearly in FIG. 2C which is an enlarged sectional view of one set of a return slot 286 and first and second return control orifices 282 and 284, respectively. The first and second return control orifices 282 and 284, respectively, comprise lateral surfaces 314 and 316 of a land 318 of the inner valve member 262 and lateral surfaces 320 and 322 of the return slot 286, respectively. The lateral surfaces 314 and 316, and the lateral surfaces 320 and 322, are formed such that gaps 324 and 326 therebetween become progressively narrower with respect to fluid flow direction which occurs from smaller to larger radii therebetween. Thus, the first and second return control orifices 282 and 284, respectively, are formed in the manner of reducing nozzles whose exit widths are the minimum valves of the gaps 324 and 326, respectively. Ideally, the exit widths of the gaps 304, 306, 324 and 326 are all made substantially equal.

Although the lateral surfaces 314 and 316 are depicted as being formed parallel to one another, they may be formed in a manner identical to the lateral surfaces 294 and 296. If this is done, the toothlike configuration of the inner valve member 263 may be formed on conventional spur gear fabricating equipment. Then the lateral surfaces 320 and 322 are formed at a larger angle, thus maintaining the reducing nozzle configurations of the return control orifices 282 and 284.

The output pressure comprises the difference between first and second values of pressure present in the first and second output slots 274 and 276, respectively. The first and second values of pressure communicate with both lateral surfaces 294 and 314, and lateral surfaces 296 and 316, respectively. Even though the outside surfaces 290 and 310 of the inner valve member 262 may be formed at equal radii (as shown in FIG. 2A), the effective radial positions of the first and second return control orifices 282 and 284, respectively, are formed at larger radii than the effective radial positions of the first and second input control orifices 270 and 272, respectively. This is because the effective radial position of the first and second input control orifices 270 and 272, respectively, are formed at substantially the same radius as the inner surfaces 292 of the outer valve member 264.

Thus, portions of the lateral surfaces 314 and 316 which are subjected to the output pressure are larger in area and are located at larger effective radii than portions of the lateral surfaces 294 and 296 which are subjected to the output pressure, respectively. Therefore, non-zero output pressures will concomitantly generate torque between the inner valve member 262 and the outer valve member 264. The torque generated therebetween is determined by $$T = A_v P R_v$$

(where in this case $A_v$ is equal to the product of the difference in radii of the portions of the lateral surfaces 314 and 316, and 294 and 296, respectively, which are subjected to the output pressure, the length of the valve, and N).

Figure 3:
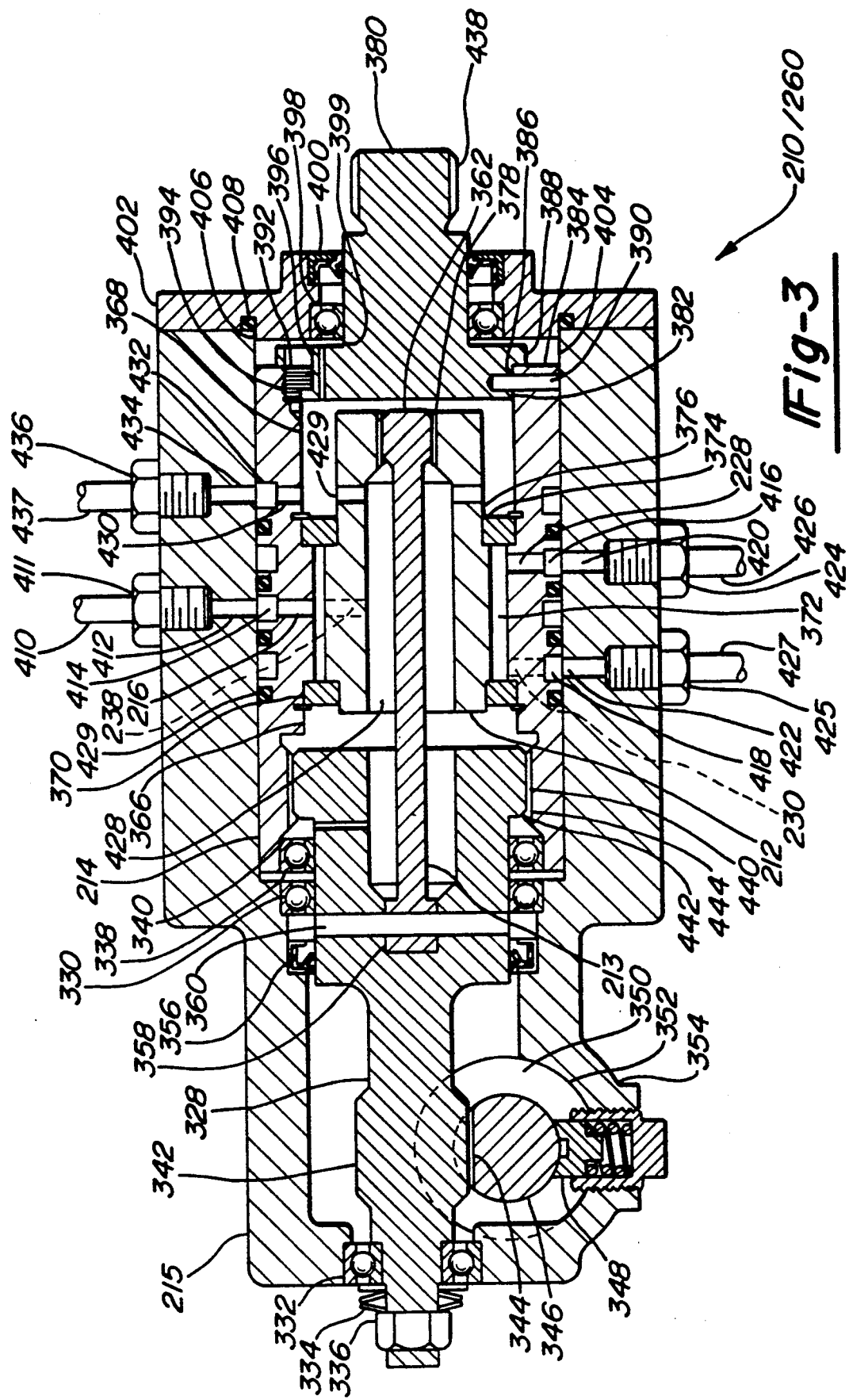
FIG. 3 is a longitudinal section view of a four-way torque reaction valve which is representative of the torque reaction valves of both FIGS. 1 and 2A-C.

Shown in FIG. 3 is a longitudinal section view which is representative of either the four-way torque reaction valve 210 or the four-way torque reaction valve 260. (The description that follows uses the part numbers shown in FIG. 1 for the four-way torque reaction valve 210. However, the following description applies equally to the four-way torque reaction valve 260 and could be repeated using the part numbers shown in FIGS. 2A-C. Therefore, it should be considered to be a generic discussion equally applicable to both the four-way torque reaction valves 210 and 260.)

Disposed within the lower end of the valve body 215 is a pinion shaft 328. It is located therein by ball bearings 330 and 332 wherein axial preload is provided by Belleville spring washers 334 and retaining nut 336. Mounted adjacent the ball bearing 330 is another ball bearing 338 upon whose outer race is located the lower end of the outer valve member 214 via a counterbore 340 therein.

Pinion gear teeth 342 are formed on the pinion shaft 328. Rack gear teeth 344 of a rack assembly 346 are held in mesh with the pinion gear teeth 342 by a spring loaded bearing yoke 348 in a known manner. Axially disposed along the rack assembly 346 is a piston 350. The piston 350 is located within a double acting cylinder 352 formed within a casting 354 which also comprises the valve body 215—all formed in a known manner. A shaft seal 356 provides a barrier to migration of either hypoid oil commonly utilized to lubricate the rack-and-pinion gear section or power steering fluid commonly utilized as fluid within the four-way torque reaction valve 210.

Fixedly mounted within a bore 358 formed within the pinion shaft 328 is the lower end of the torsion bar 213. The torsion bar 213 is retained and rotationally oriented therein by a pin 360. The upper end of the torsion bar 213 is formed with a male spline 362. To facilitate later assembly of the inner valve member 212 thereon, the male spline 362 is formed with a number of teeth equal to an integral multiple of the number N of sets of ports, slots and control orifices comprised in the inner and outer valve members 212 and 214, respectively, wherein the teeth are rotationally oriented in a selective manner with respect to the pin 360.

The outer valve member 214 is formed with a counterbore 366 in its lower end and a counterbore 368 in its upper end. The inner valve member 212 is axially assembled within the outer valve member 214. Barrier rings 370 are assembled within the counterbores 366 and 368 and forcibly retained at the ends thereof by beveled internal retaining rings such as Waldes Truarc part number N5002-112 manufactured by Waldes Kohinoor, Inc. of Long Island City, N.Y.

The axial region 372 (of the axially assembled inner and outer valve members 212 and 214, respectively) comprises the active portions of the four-way torque reaction valve 210 as shown in FIG. 1 (or 260 as shown in FIGS. 2A-C). The respective lengths of the active portions of the inner and outer valve members 212 and 214 are formed such that there is minimal axial operating clearance between the inner valve member 212 and the barder rings 370. The minimal operating clearance provides a nominal flow barrier between the various slots and control orifices. Concomitantly, bores 374 of the barrier rings 370 and shaft portions 376 of the inner valve member 212 are formed such that a free running bearing fit is established therebetween.

A splined hole 378 is formed in the upper end of the inner valve member 212. The splined hole 378 is sized such that it achieves a slideable mesh with the male spline 362. In addition, it is rotationally oriented such that a selected orientation of the inner valve member with respect to the male spline and therefore the pin 360 can be maintained. Thus, feedback torque is transmitted substantially without hysteresis from the pinion shaft 328 to the inner valve member 212 via the pin 360, angular deflection of the torsion bar 213, and mesh of the male spline 362 and the splined hole 378. This method of a transmitting the feedback torque avoids axial overconstraint between the inner valve member 212 and either of the barrier rings 370.

An input shaft 380 is located with respect to counterbore 382 and face 384 of the outer valve member 214 by a pilot boss 386 and a shoulder 388. It is affixed thereto alternately by a plurality of pins 390 or a plurality of set-screws 392 wherein the set-screws 392 are threadably engaged in threaded half holes 394 in the outer valve member 214 and bear against the bottom of half holes 396 in the input shaft 380. The advantage of affixing the input shaft 380 to the outer valve member 214 via the plurality of set-screws 392 is that subsequent disassembly of the torque reaction valve 210 is thereby facilitated.

A ball bearing 398 and a shaft seal 400 are installed in an input housing 402. A wave washer 399, the ball bearing 398 and shaft seal 400 are slideably assembled over the input shaft 380 as the input housing 402 is axially installed onto the valve body 215. The input housing 402 is located radially in main bore 404 of the valve body 215 by a pilot boss 406 and affixed to the valve body 215 by treaded bolts (not shown). Hydraulic fluid is prevented from leaking between the input housing 402 and the valve body 215 by an O-ring seal 408.

Fluid flows through the four-way torque reaction valve 210 generally as described above with respect to FIG. 1. However, detailed fluid flow into and/or out of the rotating assembly of the inner and outer valve members 212 and 214, respectively, is as follows:

Input fluid flows from a fluid source (not shown) through an input line 410, input fitting 411 and input passage 412 through an input slip ring 414 and finally to each of the input ports 216. Similarly, output fluid flows to or from either of the sets of first and second output ports 228 and 230, respectively, via first or second output slip rings 416 and 418, respectively, through first or second output passages 420 and 422, respectively, first or second output fittings 424 and 425, respectively, and first and second output lines 426 and 427, respectively, to or from either end of the cylinder 352, respectively. Finally, return fluid from the return ports 238 flows into an annular cavity 428 occupying the space between the torsion bar 213 and the inside of the inner valve member 212, out through return holes 429 and 430, and through return slip ring 432, return passage 434, return fitting 436 and return line 437 to a tank (not shown). In addition, four seal rings 439 are utilized to preclude leakage from the input slip ring 414 or either of the output slip rings 416 and 418.

In operation, a torque T(in.lbs) is applied to splines 438 formed on the input shaft 380. The torque is transmitted to the outer valve member 214 via the pins 390 or set-screws 392 and the outer valve member 214 rotates slightly. One of the sets of first and second input control orifices 220 and 222, respectively, and the other of the sets of return control orifices 232 or 234, respectively, is enlarged in area while the opposite sets are reduced in area. Output pressure is generated which may result in motion of the piston 350 via fluid flow to and from the cylinder 352. Any motion of the piston 350 will concomitantly result in motion of the rack assembly 346 and "follow up" rotational motion of the pinion 328 and lower end of the torsion bar 213. This rotational motion of the lower end of the torsion bar 213 will generally lag the rotation of the outer valve member 214 by a slight angle which may be thought of as servo system error.

Concomitantly, the applied torque will be opposed by an identical torque generated by the output pressure acting upon the effective net valve area as defined above (i.e., wherein $T = A_v PR_v$). This torque will also cause the inner valve member 212 to rotate in the same direction as the outer valve member 214 (but with less error than the pinion shaft 328) and impart concomitant rotation to the upper end of the torsion bar 213 via the splined hole 378 and the male spline 362. The simultaneous lagging rotation of the lower end and almost full rotation of the upper end of the torsion bar 213 results in the torsion bar 213 twisting by an angle $\theta_\theta$ (rad.). The angle $\theta_\theta$ is a measurement error angle with the value.

$$\theta_\theta = 10.2(1_t G d_t^4)$$

where $1_t$ is the effective length of the torsion bar 213, G is the shearing modulus of elasticity, and $d_t$ is the diameter of the effective length of the torsion bar 213. Thus, the relative angular displacement of the inner valve member 212 with respect to the pinion shaft 328 is linearly related to the applied torque T and has the value $\theta_\theta$—which can be evaluated as defined above.

Should a failure of the hydraulic system occur (i.e., such as by failure of a pump supplying fluid to the four-way torque reaction valve 210), the feedback torque will be absent and $\theta_\theta$ must be otherwise limited. This is accomplished in the four-way torque reaction valve 210 by a tangentially loose fitting spline set 440 comprising a male spline 442 formed on the upper end of the pinion shaft 328 and a female spline 444 formed within the outer valve member 214. Thus, such a failure would result in the applied torque T being directly applied to the pinion shaft 328 via the spline set 440.

To facilitate axial assembly of the preassembled inner and outer valve members 212 and 214, respectively, onto the ball bearing 338 and the male spline 362 of the torsion bar 213, the spline set 440 is formed with a number of teeth equal to an integral multiple of the number N of sets of ports, slots and control orifices comprised within the preassembled inner and outer valve members 212 and 214, respectively.

Although application to vehicular power steering has been assumed hereinabove in discussion of the four-way torque reaction valve 210, no such limitation in its use is appropriate. The four-way torque reaction valve 210 can be used together with any hydraulically actuated, double acting utilization device to perform a wide variety of tasks. All that is required to complete closed-loop systems utilizing the tour-way torque reaction valve 210 is a suitable feedback path enabling application of feedback torque to the bottom end of the torsion bar 213.

Rotational motions greater than the angle $\theta_\theta$ are not necessarily required in such systems. For instance, the four-way torque reaction valve 210 could be used in a very simple servo system to position a cylinder driven slide against a travel limit. All that would be required would be a spring bias on the rack assembly 346 which urges the cylinder driven slide toward the travel limit. When the travel limit struck the end of the rack assembly 346, the servo system would control the cylinder driven slide's position against the travel limit. The possibilities are endless and no attempt is made to catalog them by including a large number of additional application oriented figures herein.

Figure 4:
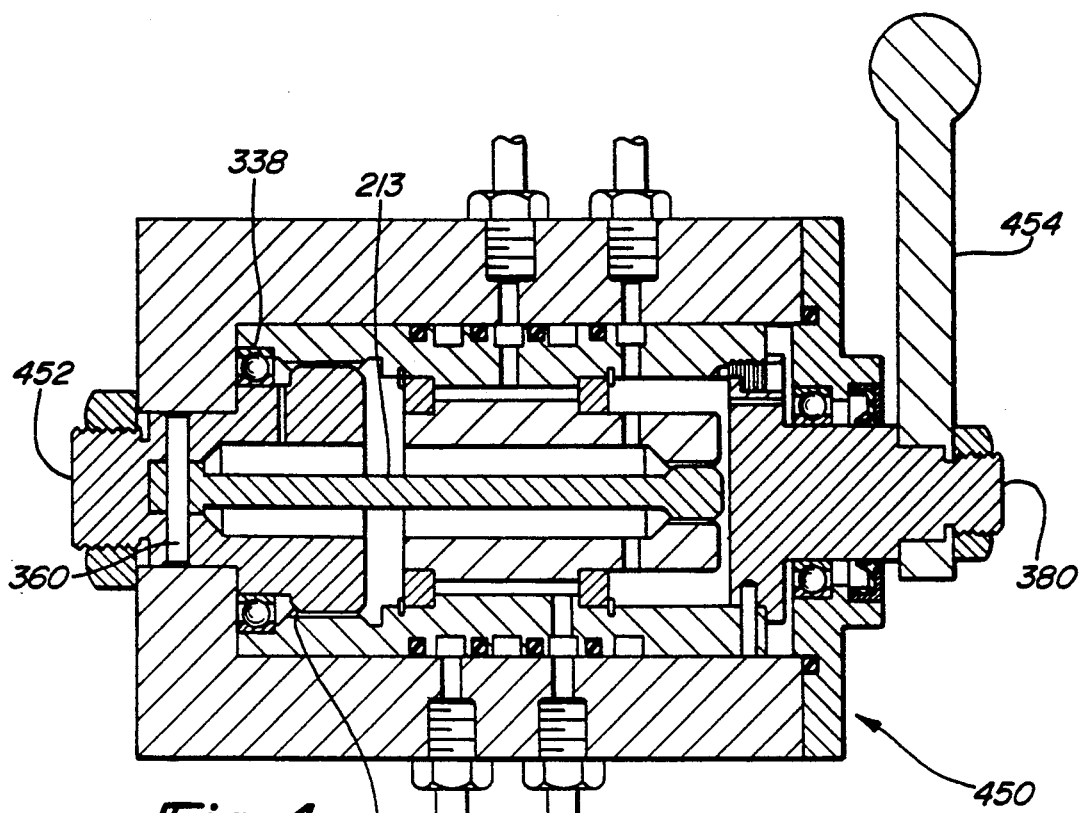
FIG. 4 is a longitudinal section view of a hand operated controller which comprises a four-way torque reaction valve.

In addition, it is possible to use the basic apparatus of the torque reaction valve as an independent controller without feedback. For instance, shown in FIG. 4 is simple differential pressure controller 450. In the differential pressure controller 450 the rotationally movable pinion shaft 328 is replaced by an immovable reaction torque fitting 452. In addition to providing an anchor for the lower end of the torsion bar 213 (via the pin 360), the reaction torque fitting 452 comprises the male spline 442 and provides a cylindrical mounting surface for the ball bearing 338. A handle 454 is mounted on the input shaft 380. Thus, rotation of the handle 454 is possible within the angle $\pm\theta_\theta$ with concomitant linearly related differential output pressure available at the first and second output lines 426 and 427, respectively. Again, possible applications are limitless. For instance, such a differential pressure controller could be utilized in an "open-loop" control system for opening or closing a large hydraulically actuated valve.

Figure 5A:
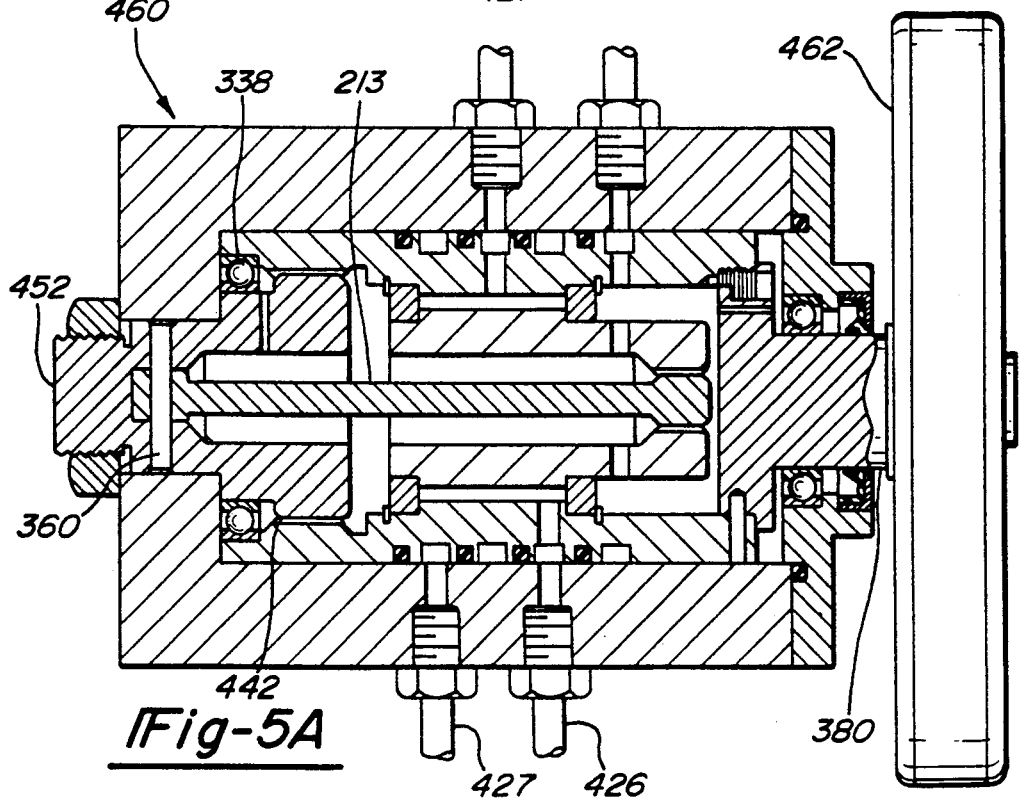
FIG. 5A is a longitudinal section view of an electro-hydraulic servo valve which comprises a four-way torque reaction valve.

If electro-mechanical or other controllable drive means are substituted for the handle 454, a servo-valve is brought into being. For instance, shown in FIG. 5A is an electro-mechanical (i.e., motor driven) servo-valve 460. The electro-mechanical servo-valve 460 is identical with the differential pressure controller 450 except that the handle 454 has been replaced by an electrically actuated motor 462. Suitable examples of electrically actuated motors can be found in a line of limited rotation DC torque motors manufactured by Aeroflex Laboratories Inc. of Plainview, N.Y.

Figure 5B:
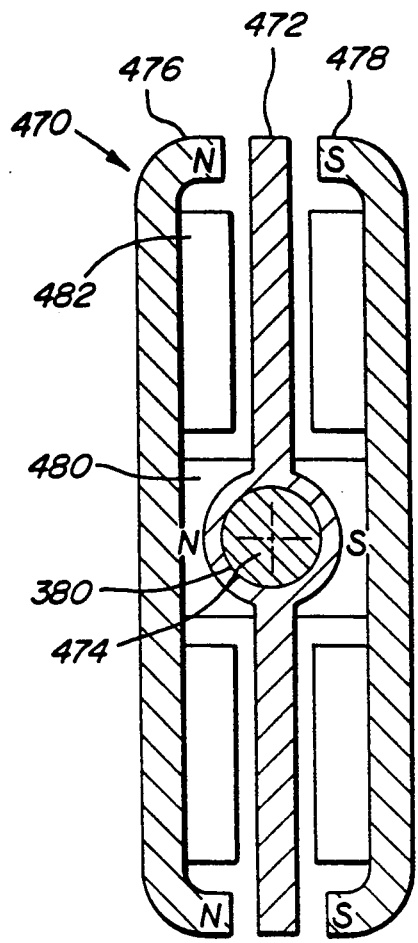
FIG. 5B is an end view which illustrates a preferred embodiment of a limited excursion torque motor utilized with the electro-hydraulic servo valve shown in FIG. 5A.

An alternate preferred embodiment for a limited rotation DC torque motor is shown in FIG. 5B. Shown in FIG. 5B is a torque motor 470. The design of the torque motor 470 is closely related to DC torque motors used by a number of manufacturers for activation two-stage servo-valves of present design. Usually, such DC torque motors are utilized to position a pilot flapper valve and comprise a motor pivot which is located eccentrically with respect to the DC torque motor itself. Often such pivots comprise a flexure tube which serves to exclude fluid from the pilot flapper valve from the DC torque motor. Typical examples of such DC torque motor controlled two-stage servo-valves can be found in a line of servo-valves manufactured by Moog Inc. of East Aurora, N.Y.

In the torque motor 470, an armature bar 472 is affixed concentrically about the input shaft 380. Thus, the armature bar 472 pivots about pivot point 474 which is substantially coincident with the center line of the input shaft 380. Pole pieces 476 and 478 are mounted upon field magnets 480. The field magnets are unidirectionally oriented (magnetically) such that the pole piece 476 is north poled and the pole piece 478 is south poled. A pair of armature coils 482 are provided wherein both of the armature coils 482 are hooked up in an additive manner so that the armature bar 472 becomes an electro-magnet whose pole orientation and magnitude are set by current direction and magnitude in the armature coils 482.

Typically, the armature bar 472 is formed from a "soft" magnetic material having a tall but narrow hysteresis loop of small area. The combined dimensions of the armature bar 472, the field magnets 480 and the pole pieces 476 and 478 are controlled such that clearance is provided between the ends of the armature bar and the pole pieces 476 and 478 for maximum values of $\theta_\theta$.

In operation, a current passing through the armature coils 482 causes one end of the armature bar 472 to be north poled and the other to be south poled. Then the north poled end of the armature bar 472 is repelled by the north poled pole piece 476 and attracted by the south poled pole piece 478. Conversely, the south poled end of the armature bar 472. Currents in the armature coils 482 (and therefore flux levels in the armature bar 472) are held to values wherein there is a substantially linear relationship between current and motor torque.

As noted hereinabove, closed-loop servo systems utilizing the four-way torque reaction valve 210 to position a mass are stabilized by energy loss associated with motion of the mass. Similarly generated energy loss will also have a stabilizing effect upon systems utilizing hydraulic circuits controlled by either the differential pressure controller 450 or the electro-mechanical servo-valve 460.

Under optimum conditions, suitable energy loss may be generated independent from the hydraulic circuits. For instance, an automotive type shock absorber could be coupled to a load to control oscillations of a system which comprises one of these hydraulic circuits. Alternately, a damper valve assembly may be introduced into either, or both, of the first and second output fittings 424 and 425, respectively, or lines 426 and 427, respectively.

An optimum damper valve assembly for this purpose is characterized by having a selected hydraulic resistance (hereinafter "resistance") function. In general, a simple orifice having a square law flow characteristic wherein pressure drop is proportional to fluid flow rate (hereinafter "flow rate") squared is unacceptable. Its resistance function would be determined by $$R_a = P_a/Q_a/10000A_a = (P_a)^{0.5}/100A_a$$

where $R_a$ is the resistance of the orifice, $P_a$ is the pressure drop (hereinafter "pressure") across the orifice, $Q_a$ is the fluid flow rate through the orifice, and $A_a$ is the area of the orifice. Thus, the resistance of an orifice increases linearly with increasing flow rate.

Figure 6:
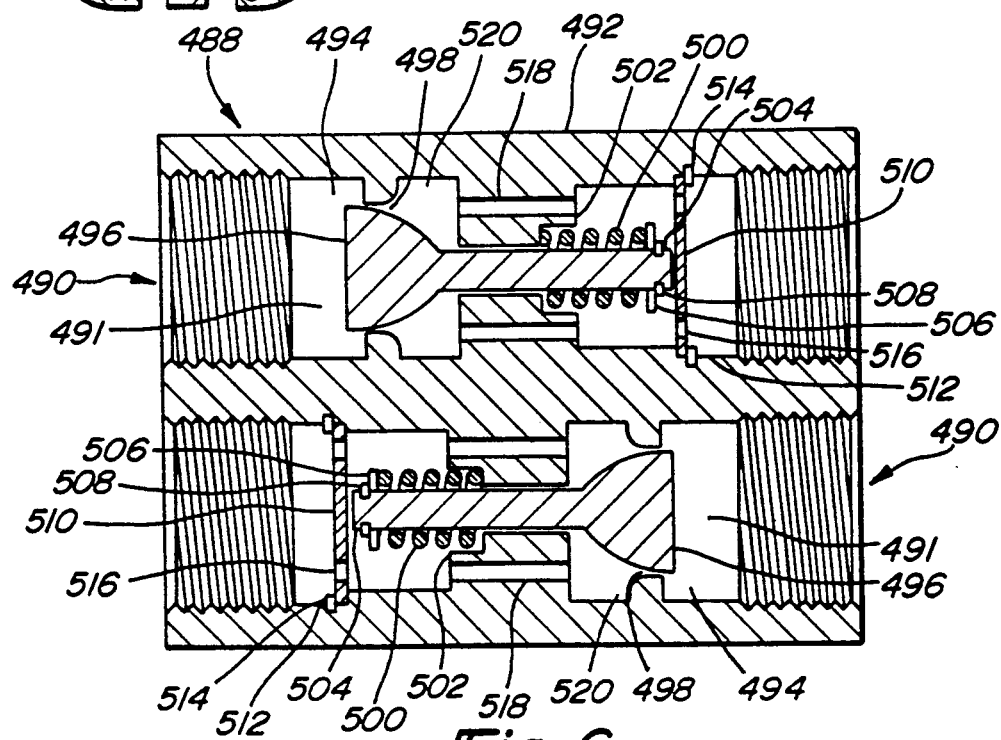
FIG. 6 is a sectional view of two directional controlled orifice flow restrictors (herein called "hydraulic resistors") which are mounted side-by-side and oriented in opposite directions.

A damper valve assembly 488 having a selected resistance function is shown in FIG. 6 The damper valve assembly 488 comprises two damper valves 490, each having nominal one-way flow characteristics. They are mounted side-by-side in bores 491 a valve body 492 and the damper valves 490 are oriented therein in reversed flow directions to accommodate two-way flow. Each damper valve 490 comprises a set of the following items:

An oversize orifice counterbore 494 is formed in the valve body 492. The counterbore 494 is selectively filled by a contoured valve member 496. Thus, an annular orifice 498 is formed which has a selected resistance vs. flow characteristic determined by an individually selected contour on the contoured valve member 496 as combined with selected stiffness and preload of a spring 500 used to retard outward motion of the contoured valve member 496. The spring 500 is located in a counterbore 502 and applies force to a stem 504 of the contoured valve member 496 via a washer 506 and a retaining ring 508. Return travel of the contoured valve member 496 is limited by a disc 510 which is retained in a counterbore 512 in the valve body 492 by a retaining ring 514. Fluid passage to the annular orifice 498 is effected via holes 516 and 518 formed in the disc 510 and valve body 492, respectively, and an annular chamber 520 also formed in the valve body 492.

Figure 7:
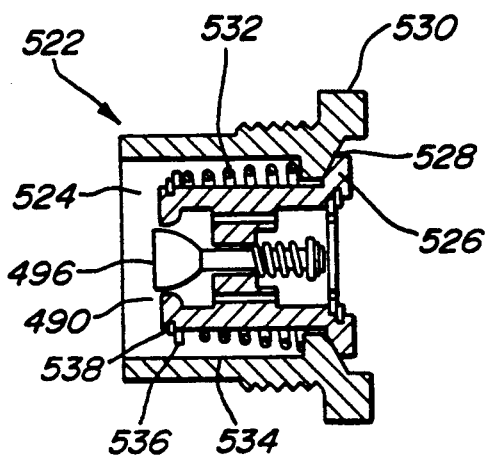
FIG. 7 is a sectional view of a single controlled orifice flow restrictor mounted within a check valve.

Shown in FIG. 7 is an alternate damper valve assembly 522 wherein a damper valve 490 is mounted in a bore 524 in a check valve 526 wherein one set of all of the above described counterbores, spring, retaining rings, disc and holes are formed or disposed in similar juxtaposition to a contoured valve member 496. The check valve 526 is urged against a spherical seat 528 formed in a check valve body 530 by a spring 532 which is located in a counterbore 534 and applies seating force to the check valve 526 via a washer 536 and retaining ring 538.

The damper valve 490 is oriented so that its nominal flow direction is opposite that of the check valve 526. Thus, flow is nominally unimpeded in one direction but encounters a resistance R in the other. Utilizing one of the damper valve assemblies 522 in each of output lines 426 and 427 enables similar pressures to be maintained in either side of the double acting cylinder 352 for similar motions in either direction.

Figure 8:
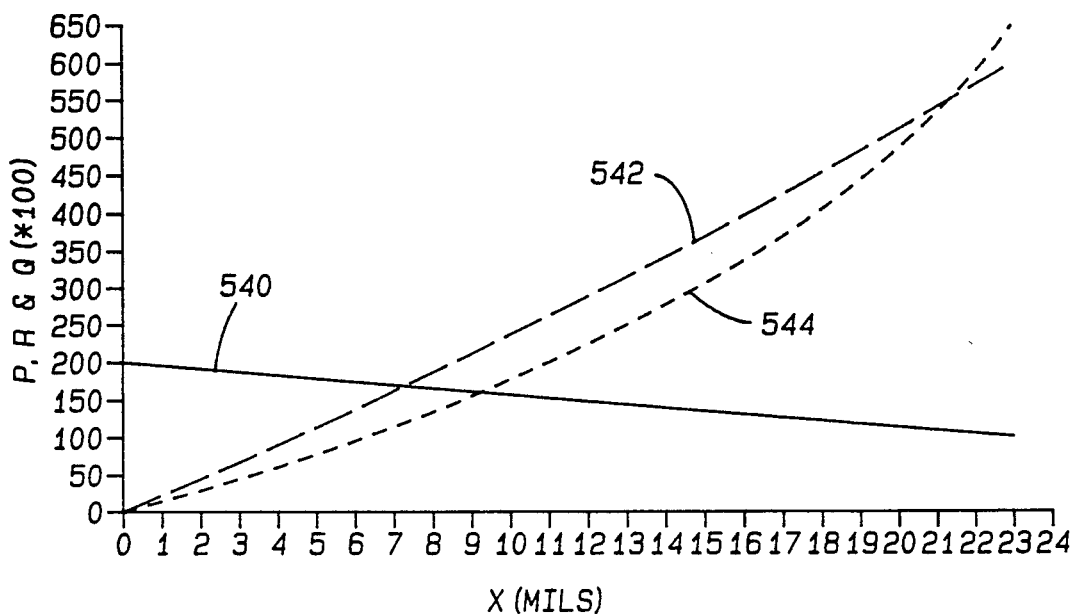
FIG. 8 is a graph showing flow resistance, pressure drop and flow rate vs. displacement for a controlled orifice flow restrictor.

While a single valued resistance value is often chosen as the resistance function for a particular design of the damper valve 490, a selected variable resistance function may be chosen as well. For instance, shown in FIG. 8 are a set of performance curves for a damper valve 490 wherein a resistance function that decreases with respect to motion of the contoured valve member 496 is used. Resistance function, $R(lbs.sec./in.^5)$, is illustrated by curve 540 while pressure drop, $P_d$ $(lbs/in.^2)$, and flow rate, $Q_d(in.^3/sec.)$, are illustrated by curves 542 and 544, respectively. In FIG. 6, the values shown for R, $P_d$ and of assume zero preload of the spring 500 and they are plotted vs. displacement of the contoured valve member 496, $X_d$(mils). A procedure for designing a damper valve 490 is illustrated via the following example calculation for a damper valve 490 having the performance depicted in FIG. 8.

Because the annular orifice 298 has a wedge shaped flow, its flow coefficient is about 50 percent higher than a sharp edged orifice. Thus, $$Q_d = P_d/R = 150A_d(P_d)^{0.5}$$

where $A_d$ is the flow area of the annular orifice 298. Also, $$R = 200 - 5000X_d$$

and $$A_d = \pi[(0.47)^2 - r_d^2]$$

where $X_d$ is a displacement value for the contoured valve member 496 and $r_d$ is a value representative of a particular radius of the contoured valve member 496. Also, valve force is determined by $$F_d = K_d X_d = P_d \pi r_d^2$$

where $k_d$ is the spring constant of the spring 500 which is determined by the relationship $$P_d = 400(lbs/in.^2) \text{ when } X_d = 20(mils).$$

Figure 9:
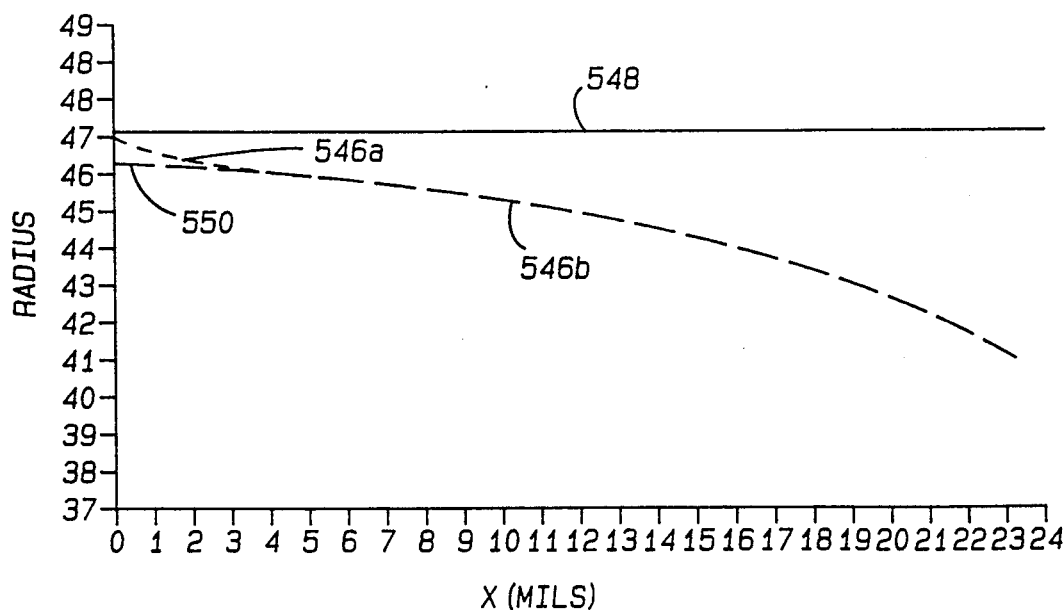
FIG. 9 is a graph showing contoured valve member clearance vs. displacement for a controlled orifice flow restrictor.

When these equations are mutually solved, $X_d$ is found by
$$X_d[(20+0.0309P_d)-(400-1.236P_d+(0.01189P_d)^{1.5}+(-0.000955P_d)^2)^{0.5}]/1000$$

and points generating the curves 540, 542 and 544 are evaluated in a transcendental manner. In addition, values of $r_d$ are also calculated. These values are plotted as curves 546a and 546b in FIG. 9. At $X_d=0$, the curve 546a has the same value as curve 548 whose value is that of the inside radius of the counterbore 494.

However, the above equations assume that all energy loss in the damper valve 490 is due to kinetic energy loss. Actual loss is partially due to viscous flow energy loss. In fact this form of energy loss is dominant for very small clearances. For instance, power steering fluid has an absolute viscosity of 0.0000171 $(lb.sec./in.^2)$ at an operating temperature of 170(deg.F) and according to a formula presented in a book entitled HYDRAULIC CONTROL SYSTEMS, by Herbert E. Merritt and published by John Wiley & Sons, Inc.

$$R' = P_d/Q_d = 6\mu L_d/\pi r_d c_d$$

where R' is the resistance of such an orifice and $L_d$ is a length associated with a portion of smaller values of $c_d$. $c_d$, in turn, is the radial clearance between the curve 548 and a combined curve 550 and 546b. The curve 550 is a chosen continuation of the curve 546b which designates contour requirements of the contoured valve member 496 to effect the values of R shown by the curve 540 in FIG. 8.

Figure 10A:
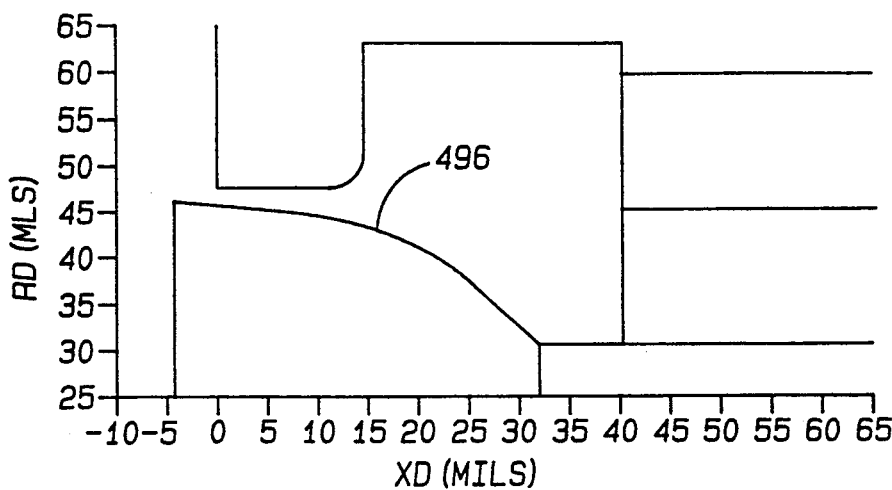
FIG. 10A, 10B and 10C are diagrammatic graphs which illustrate positions of a controlled orifice for displacements corresponding to zero, quarter and full-flow, respectively.
Figure 10B:
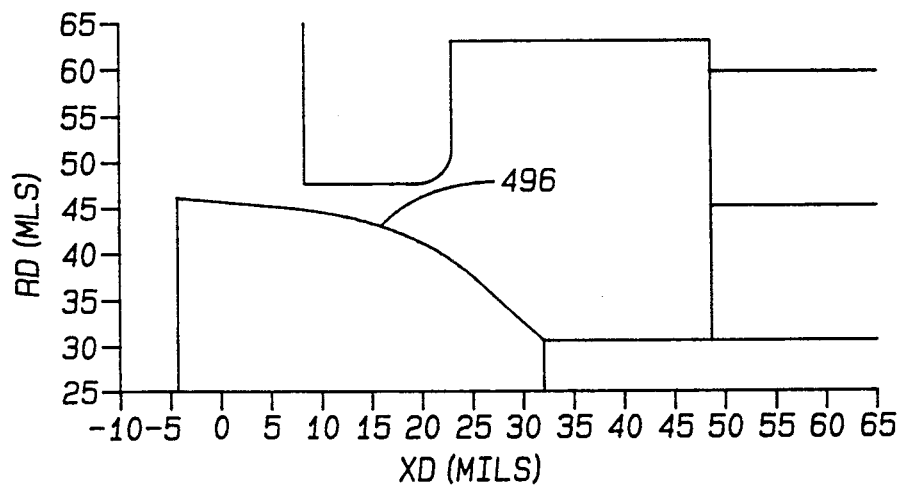
Figure 10C:
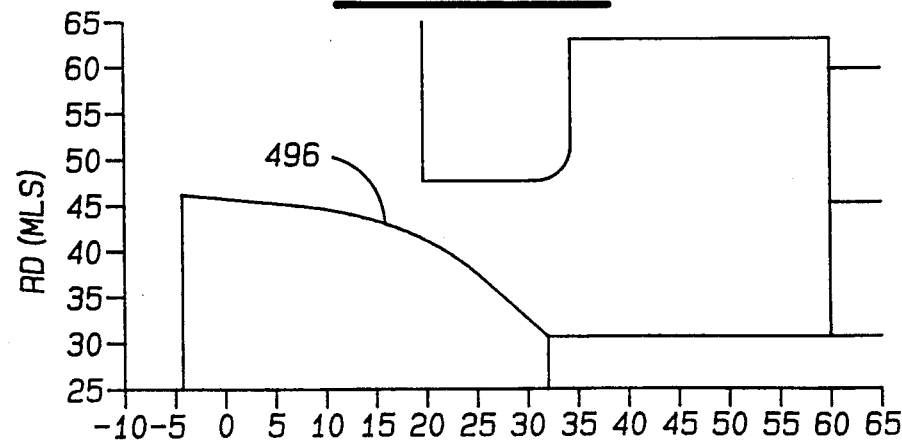

The actual contour of the contoured valve member 496 is determined by progressively taking the values of cd resulting from the difference between the curve 548 and the curves 546b and 550 and swinging radii with a compass to generate a curve which is then used for the actual contour. Shown in FIGS. 10A, 10B and 10C are enlarged views of the actual contour of the contoured valve member 496 wherein $X_d$=0(mils), 8.9 (mils) and 20.0 (mils), respectively. These are values of $X_d$ for which $Q_d$=0 (in.$^3$/sec.), 1 (ins$^3$/sec.) and 4 (in.$^3$/sec.), respectively.

Figure 11:
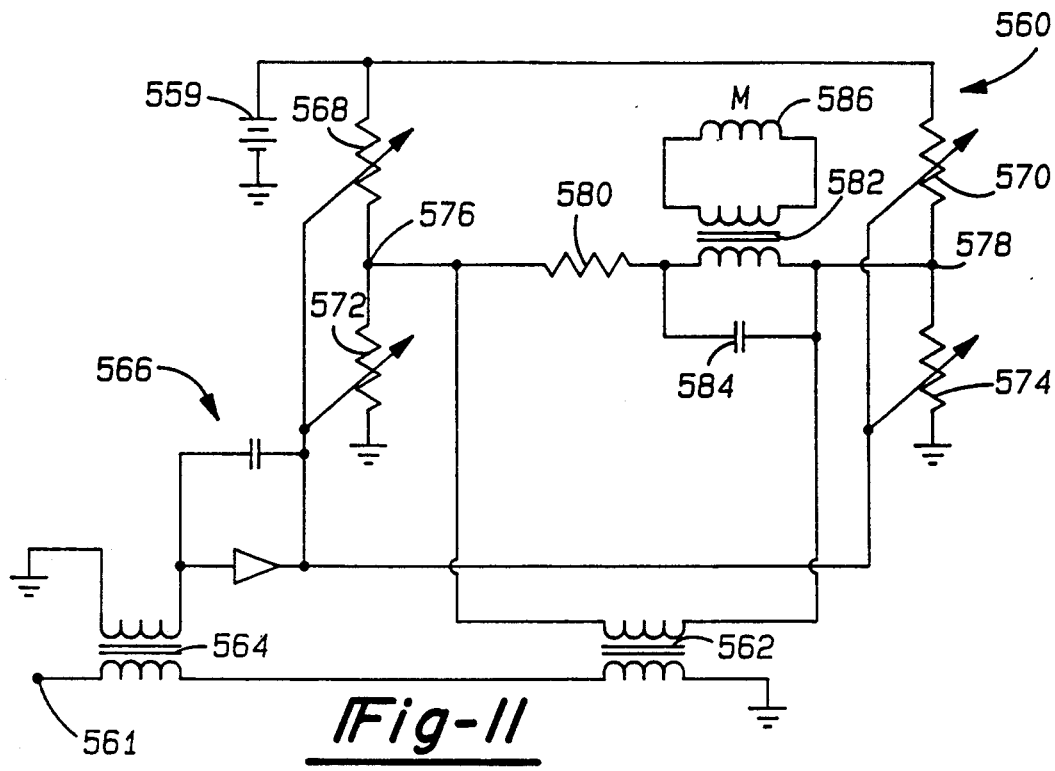
FIG. 11 is a schematic drawing of a simple open-loop control system wherein a four-way torque reaction valve and a hydraulic resistor are utilized to control the position of a mass via a double acting hydraulic cylinder.

Open-loop operation of the four-way torque reaction valve 210 augmented by a particular damper valve assembly 488 having a single valued resistance of 200 (lb.sec./in.$^5$) can be determined by analyzing a schematic circuit 560 shown in FIG. 11. If an effective radius, $R_v$, of an effective valve area, $A_v$, is chosen equal to 0.4 (in.), then $$F_v = T/0.4$$

where $F_v$ is the force imposed upon the effective valve area, $A_v$, and T is the torque imposed upon the input shaft 380.

As illustrated in the schematic circuit 560, a pump unit 559 delivers input flow rate $Q_s$ to a bridge circuit comprising variable resistors 568, 570, 572 and 574. In addition, $F_v$ is applied to the primary of an ideal transformer 562 (which has the ratio $A_v$:1) via a terminal 561 and the primary of an ideal velocity transformer 564. The ideal velocity transformer 564 converts tangential valve velocity $dX_v/dt$ into valve displacement $X_v$ via action of a hypothetical integrating operational amplifier 566. The valve displacement $X_v$ results in variation of values of the variable resistors 568 and 570, whose values correspond to the flow characteristics of the first and second input control orifices 270 and 272, respectively, and the variable resistors 572 and 574, whose values correspond to the flow characteristics of the first and second return control orifices 282 and 284, respectively. Output pressure P appears between circuit nodes 576 and 578.

The output pressure P is applied to a circuit comprising a resistor 580 that is series connected with a parallel combination of the primary of an ideal transformer 582 and a capacitor 584, all in parallel with the secondary of the ideal transformer 562. The ideal transformer 582 simulates the area of the piston 350 (which has the ratio $A_p$:1). The ideal transformer 582 transforms pressure applied to the piston 350 into force which is applied to an inductor 586 (which has the value M). The capacitor 584 simulates the capacitance of the fluid trapped in the cylinder 352 (which has the value C). The ideal transformer 562 simulates the effective net valve area (which has the ratio $A_v$:1). The transforming action of the ideal transformer 562 simulates the relation $$P = F_v A_v.$$

(The above designated circuit elements have the following values in the examples below: M=0.25 (lb.sec.$^2$/in.), C=0.000025 (in.$^5$/lb), $A_p$=1 (in.$^2$) and $A_v$=0.1 (in.$^2$).)

As soon as a circuit becomes more complex than a series or parallel combination of circuit elements, the simplest way to analyze it is by using a method known as the Ladder Method, which method is explained in the book entitled ELECTRICAL ENGINEERING CIRCUITS by Hugh Hildreth Skilling and published by John Wiley & Sons, Inc. In utilizing this method for the pressure/flow problems herein, a velocity of $dX_m.dt$ is assumed to flow in the inductor 586. Then the flow rate across the primary of the transformer 582 is $A_p(dX_m/dt)$ and the pressure drop across the primary of the transformer 582 is $(j\omega M/A_p)(dX_m/dt)$. This pressure is divided by the impedance of the capacitor 584, $(-j/\omega C)$ to determine the flow rate through the capacitor 582 (which is $(-1)(\omega^2 MC/A_p)(dX_m/dt)$). These flow rates are then summed and multiplied by the resistance value of the resistance 580, R, to determine the pressure drop across the resistor 580. This pressure drop is summed with the pressure drop across the primary of the transformer 582 to determine a concomitant value for the output pressure P. This is multiplied by the effective valve area $A_v$ which results in an equation relating $(dX_m/dt)$ to $F_v$ in terms of R, $A_p$, $A_v$, $\omega$, M and C. Finally, the resulting equation is rearranged and the Laplace-transform variable s is applied which results in the block transfer function $$X_m/F_v = (1/RA_p A_v)/s[(MC/A_p^2)s^2 = (M/RA_p^2)s + 1]$$

Figure 12A:
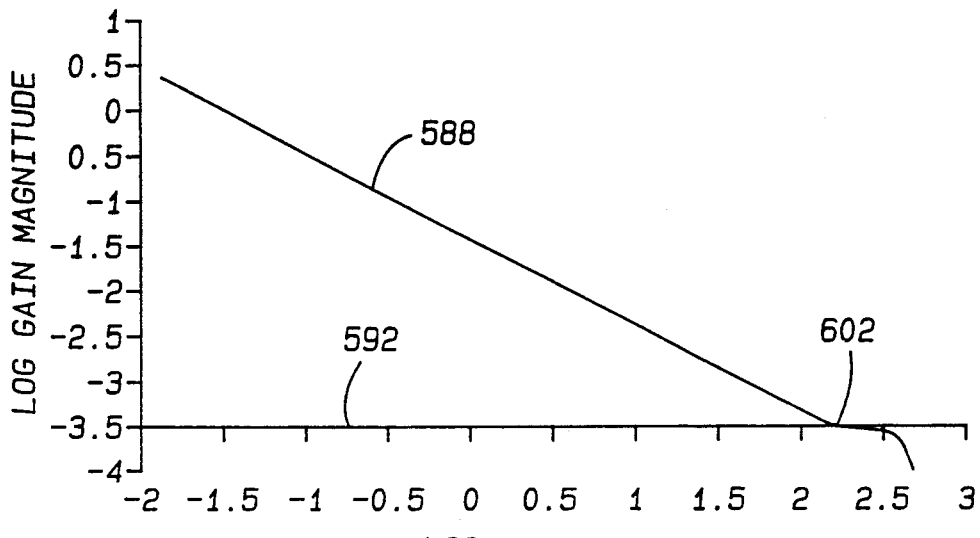
FIGS. 12A and 12B are Bode diagrams which illustrate the dynamic performance range of the open-loop control system of FIG. 11.
Figure 12B:
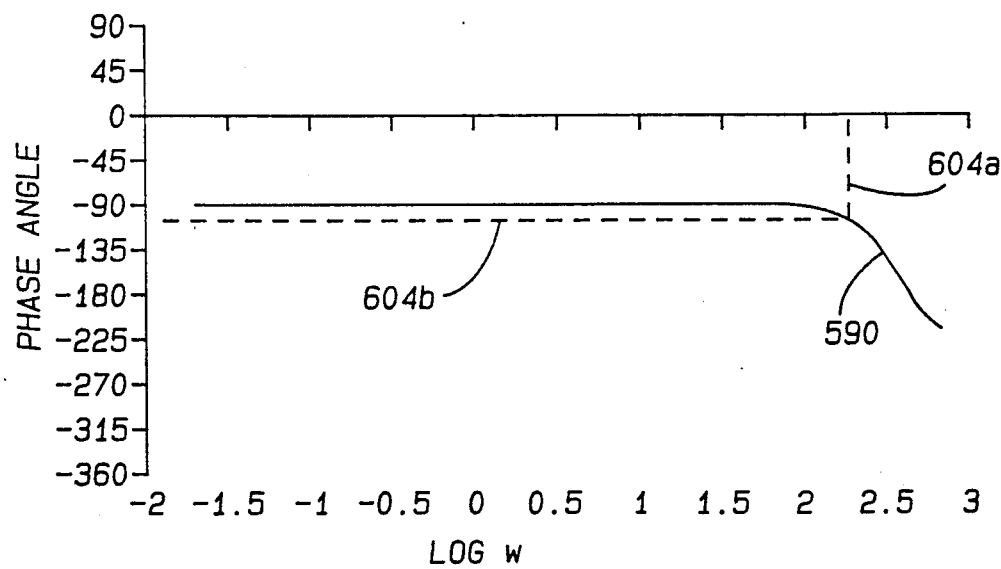

Shown in FIGS. 12A and 12B are Bode diagrams for the gain magnitude and phase angle, respectively, of this block transfer function ( as evaluated by using the circuit values mentioned above). A curve 588 depicts the log of the magnitude of $X_m/F_v$ shown in FIG. 28A and a curve 590 depicts the concomitant phase angle shown in FIG. 28B.

Figure 13:
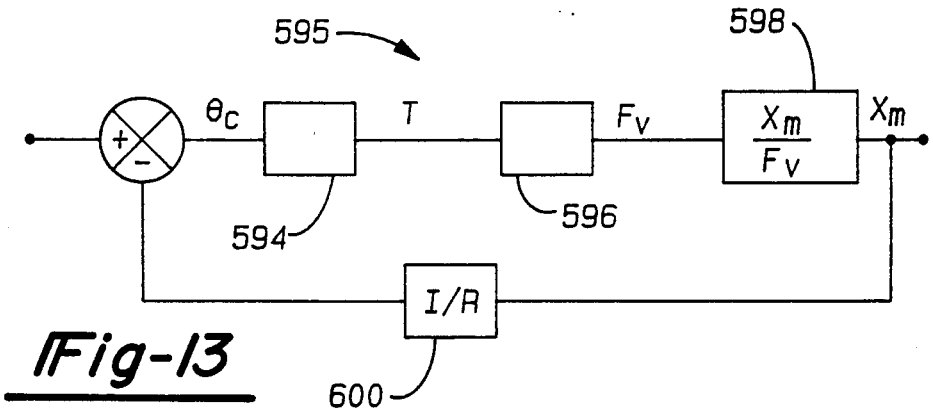
FIG. 13 is a block diagram which depicts a closed-loop servo system comprising the open-loop control system illustrated in FIG. 11.

The torsional stiffness of the torsion bar 213 determines the log ($X_m/F_v$) value of the abscissa 592. Shown in FIG. 13 is a simplified block diagram 595 for a closed-loop servo system comprising the closed-loop system described by the schematic circuit 560 and the mechanical features of the four-way torque reaction valve 210. Comprised in a block 594 is the torsional stiffness value of 400 (in.lb/rad.) selected for the torsion bar 213. Thus, a maximum value of $\theta_\theta$=0.1 (rad.) results in T−40 (in.lb). The torque value is then divided by R=0.4 (in.) in block 596 to determine a value for $F_v$ (yielding a maximum value of $F_v$=100 (lbs) which when divided by $A_v$=0.1 (in.$^2$) results in a maximum value of P=1000 (lb/in.$^2$). $X_m$ is determined via multiplication of $X_m/F_v$ in block 598, which block comprises the above defined block transfer function). $X_m$ is fed back via block 600 whose value is the inverse of the radius of the pinion 328, $1/N_p$=1/0.333 (in.). Finally, the $X_m/F_v$ value of the abscissa 592 is that value for the block 598 which will result in a loop gain of 1. This value is the inverse of the product of the values of the blocks 594, 596 and 600, or 0.000333 (in./lb). Therefore, the abscissa 592 is plotted at log (0.000333)=−3.477.

The phase angle associated with unity gain cross-over (at point 602), determines the stability of the closed-loop servo system. This angle is shown (via following lines 604a and 604b) to be −106 (deg.) in FIG. 12B. However, the nature of the curves 588 and 590 at frequencies slightly higher than that corresponding to unity gain cross-over 182 (rad./sec.)=29.0 (Hz)) suggests that slight changes in gain could lead to stability problems. This problem can easily be corrected by reducing the torsional stiffness of the torsion bar 213. However, that would concomitantly diminish the other performance parameters of the closed-loop servo system.

One might be tempted to change the value of R. Increasing the value of R would reduce the gain, but would also reduce circuit damping. If carried far enough, this would result in the curve 588 having a resonance like characteristic. In fact, if R is reduced to near zero values, $X_m/F_v$ becomes $A_p/MA_vs^2$ (which equals $(-1)(A_p/MA_v\omega^2)$) with a concomitant constant phase angle value of $-180$ (deg.).

Another way to increase circuit damping is to introduce a "leak" across the primary of the transformer 582. The conductance of such a "lease" would obviously serve to dampen any oscillations of the parallel circuit comprising the mass 586, transformer 582 and capacitor 584. However, because it would be in series with the resistor 580, it would also reduce the maximum pressure available at the primary of the transformer 582 and the concomitant maximum force available to move the mass 586.

Figure 14:
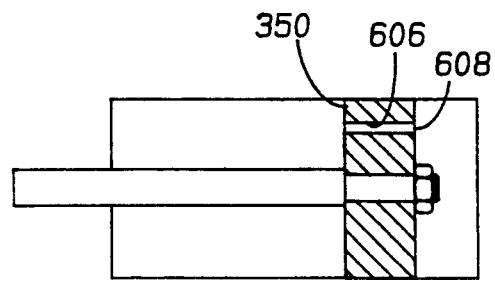
FIG. 14 is a sectional view of an orifice which is hydraulically in parallel with a piston of the double acting cylinder and which is used to improve the dynamic characteristics of the open-loop control system of FIG. 11.

On the other hand, if a system having more realistic load characteristics is assumed, a non-linear resistor, such as an orifice whose resistance is $R_b=(P_b)^{0.5}/100A_b$, may be utilized as the "leak". The increasing resistance, with respect to pressure, of such an orifice limits the loss of maximum force available to move the mass 586. For instance, consider a system having a load characterized by $$F = F_o K_a X_m + b(dX_m/dt)$$

where F is a load force encountered by the mass 586 whenever it moves, $F_o$ is a coulomb (friction) force component of the load force, $K_a$ is a load spring constant (i.e., such as the restoring caster angle derived force encountered by a vehicular steering system), and $K_b$ is a load damping constant (i.e., such as encountered by scrubbing soft rubber against an abrasive surface). The nature of such a load force permits an orifice 606 as shown in FIG. 14 to be utilized anywhere in parallel with the primary of the transformer 582. As shown in FIG. 14, one convenient location for mounting the orifice 606 is in a hole 608 formed in the piston 350.

Figure 15:
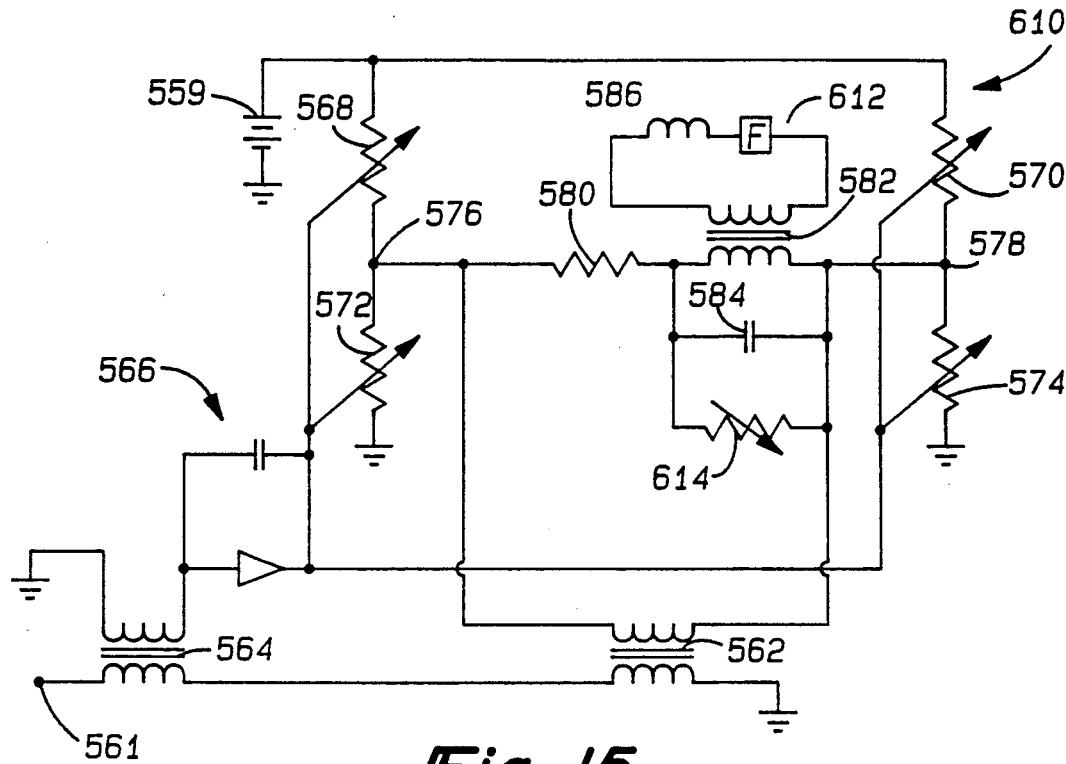
FIG. 15 is a schematic drawing of an enhanced open-loop control system which additionally comprises the orifice shown in FIG. 10 and block representing a load placed upon the piston of the double acting cylinder.

Shown in FIG. 15 is a schematic circuit 610 which has been modified to include a block 612 comprising the load force F and a variable resistor 614 depicting the variable resistance of the orifice 606. The schematic circuit 610 is analyzed generally in the same manner as the schematic circuit 560. However, the pressure drop across the primary of the transformer 582 is now $(j\omega M/A_p)(dX_m/dt)+(F/A_p)$ and the flow rate through the capacitor 584 is now $(-1)(\omega^2 MC/A_p)(dX_m/dt)+(C/A_p)(dF/dt)$. The function (dF/dt) can be found via the equation $$dF/dt = K_a(dX_m/dt) + K_b(d^2X_m/dt^2).$$

In addition, there is a parallel flow rate through the variable resistor 614 of $(j\omega M/R_bA_p)(dX_m/dt)+F/R_bA_p$.

Because of the $K_a dX_m$ term in the load force F, the system is no longer a so called type 1 system. That is, the denominator of a resulting block transfer function is no longer multiplied by the Laplace-transform variable s to the first power. The practical result of this is that there will be a residual steady state error in $X_m$ and concomitant non-zero steady state values of F and P. For this reason and for the reason that some persons skilled in the art may not be familiar with Laplace-transformations, the resulting equations for determining the gain magnitude and phase angle of a new block transfer function are presented as follows:

$$X_m/[F_v - ((R+R_b)A_vF_o/R_bA_p)] = (1/RA_pA_v)/$$
$$[(K_a(R+R_b)/RR_bA_p^2) - (((R+R_b)M/R-R_bA_p^2) + (K_bC/A_p^2))\omega^2$$
$$+ j\omega(1+(K_aC/A_p^2)+(K_b(R+R_b)/R-R_pA_p^2) - (MC\omega^2/A_p^2))]$$

and $$f = -\tan^{-1}[1+(K_aC/A_p^2)+(K_b(R+R_b)/R-R_bA_p^2)-(MC\omega^2/A_p^2)]\omega/$$
$$[(K_a(R+R_b)/RR_bA_p^2)-(((R+R_b)M/R-R_bA_p^2)+(K_bC/A_p^2))\omega^2],$$

respectively.

Steady state values of these equations can be evaluated by setting $\omega=0$. When the relation $T=0.4$ F is included, the following equations describe torque and phase angle as a function of $K_a$, R, $R_b$, $A_p$, $A_v$, $F_o$ and $X_m$ under steady state conditions:

$$T = 0.4[(R+R_b)A_v/R_bA_p](F_o+K_aX_m)$$

and $$f = 0.0 \text{(rad.)},$$

respectively.

Figure 16:
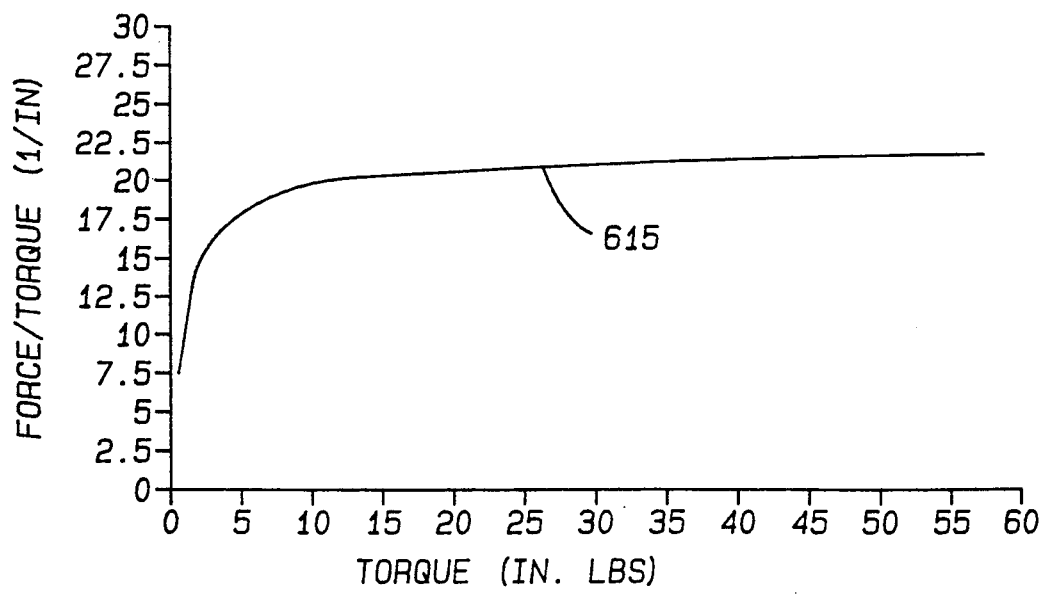
FIG. 16 is a graph illustrating output force/torque vs. torque for the open-loop control system of FIG. 15.

Most of the circuit values previously mentioned are used in evaluating the above equations, including $M=0.25$ (lb.sec.$^2$/in.), $C=0.000025$ (in.$^5$/lb.), $A_p=1$ (in.$^2$) and $A_v=0.1$ (in.$^2$). However, $K_a$, $K_b$, R and $R_b$ may vary as a function of load conditions. Shown in FIG. 16 is a curve 615 which depicts output force/torque vs. torque for $K_a=100$ (lb./in.), $R=200$ (lb.sec./in.$^5$) and $R_b=63.25$ $(F/A_p^2)^{0.5}$ (lb.sec./in.$^5$) where the output force, F, equals the sum, $F_o+K_aX_m$.

(This value for $R_b$ requires an orifice sized via the following procedure:

$$R_b = (1/A_p^2)(dF/dQ_b) = [dQ_b^2/10000A_b^2]/dQ_b$$
$$= [Q_b/5000A_b^2] = [100A_b(F/A_b^2)^{0.5}/5000A_b^2],$$

thus $$63.25(F/A_p^2)^{0.5} = (0.02/A_b)(F/A_p^2)^{0.5},$$

or $$A_b = (0.02/63.25) = 0.000316 \text{ (in.}^2\text{)},$$

and $$d_b = 0.0226 \text{ (in.)}$$

where $d_b$ is the diameter of the orifice 606.

Figure 17A:
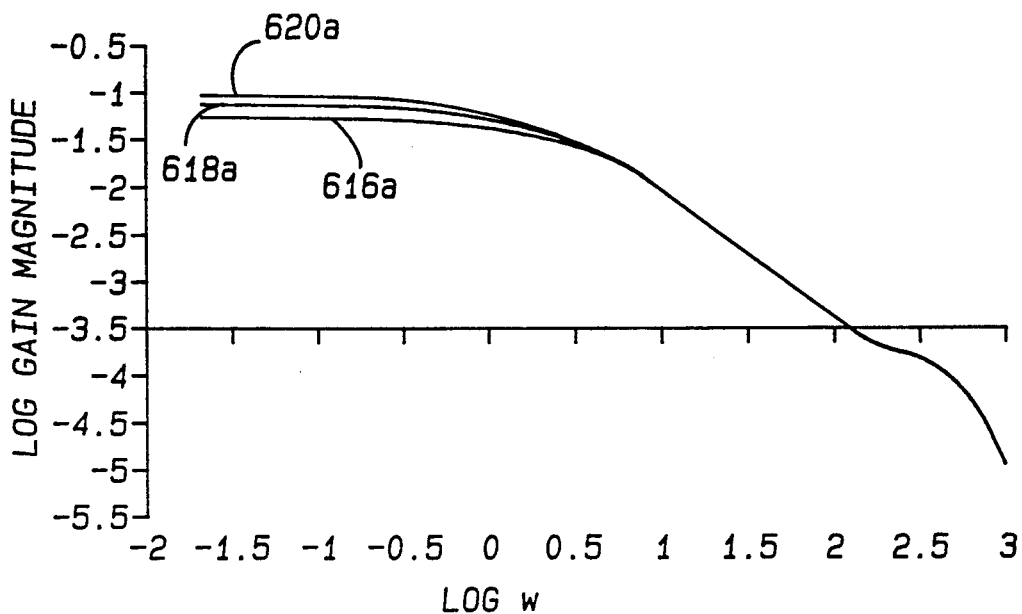
FIGS. 17A and 17B are Bode diagrams which illustrate the dynamic performance range of the open-loop control system of FIG. 15 for output forces of 10 (lbs), 100 (lbs), and 1000 (lbs).
Figure 17B:
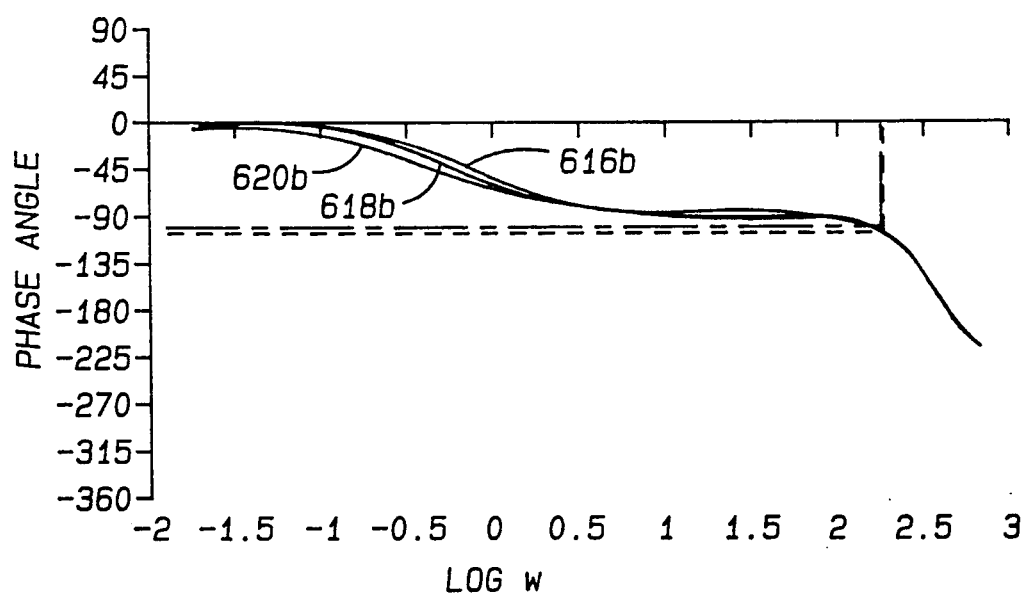

Shown in FIGS. 17A and 17B are Bode diagrams for the gain magnitude and phase angle, respectively, of the new block transfer function for the following assumed values for $K_a$, $K_b$, R and $R_b$ which correspond to F 10 (lbs.), 100 (lbs.) and 1000 (lbs.) and near zero values of $dX_m/dt$: $K_a=100$ (lbs./in.); $K_b=10$ (lb.sec./in.), 20 (lb.sec./in.) and 40 (lb.sec./in.), respectively; $R=200$ (lb.sec./in.$^5$), 632.5 (lb.sec./in.$^5$) and 2000 (lb.sec./in.$^5$), respectively. In FIGS. 17A and 17B, curves 616a and 616b, 618a and 618b, and 620a and 620b correspond to F=10 (lbs.), 100 (lbs.) and 1000 (lbs.), respectively.

Figure 18A:
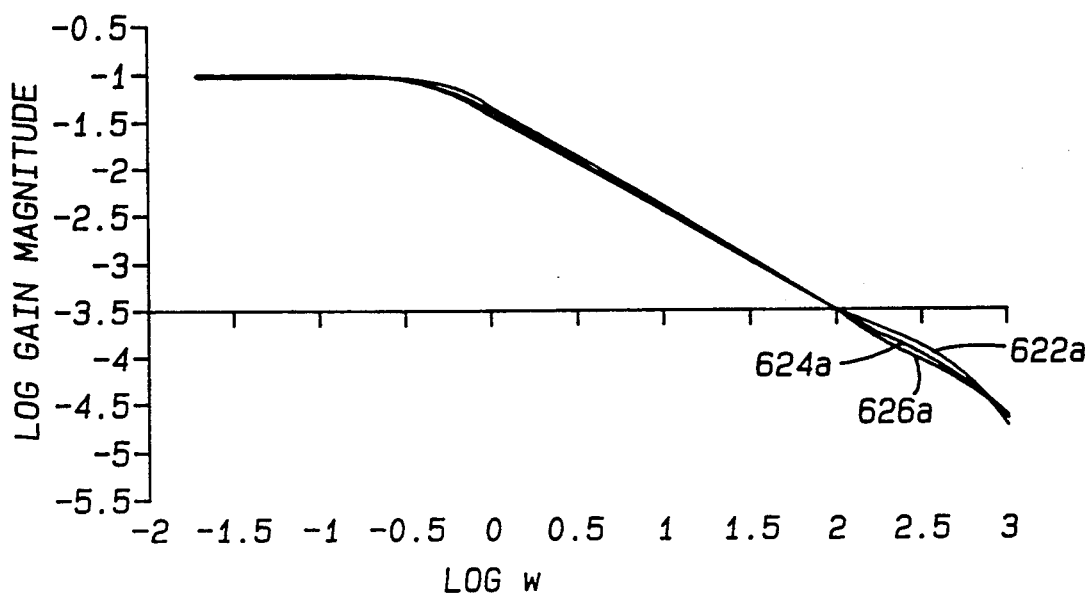
FIGS. 18A and 18B are Bode diagrams which illustrate the dynamic performance range of the open-loop control system of FIG. 15 for velocities of 0 (in./sec.), 1 (in./sec.), and 4 (in./sec.) and an output force of 1000 (lbs).
Figure 18B:
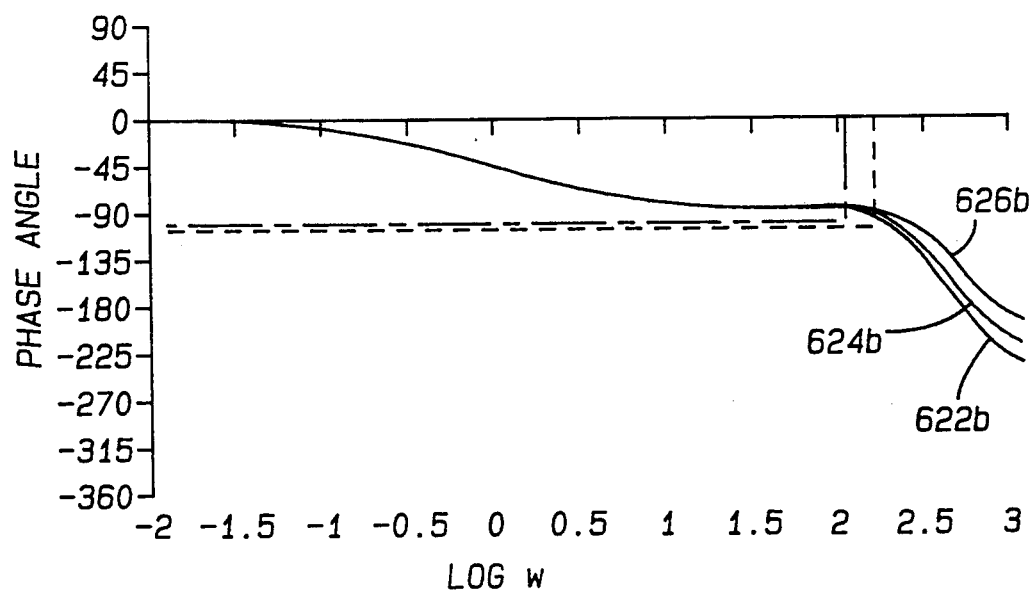

Shown in FIGS. 18A and 18B are Bode diagrams for the gain magnitude and phase angle, respectively, of the new block transfer function for the following assumed values for $K_a$, $K_b$, R and $R_b$ which correspond to F=1000 (lbs.) and $dX_m/dt=0$ (in./sec.), 1 (in./sec.) and 4 (in./sec.): $K_a=100$ (lbs./in.); $K_b=40$ (lb.sec./in.), 80 (lb.sec./in.) and 160 (lb.sec./in.), respectively; R=200 (lb.sec./in.$^5$), 150 (lb.sec./in.$^5$) and 100 (lb.sec./in.$^5$), respectively, and $R_b=2000$ (lb.sec./in.$^5$). In FIGS. 18A and 18B, curves 622a and 622b, 624a and 624b, and 626a and 626b correspond to $dX_m/dt=0$ (in./sec.), 1 (in./sec.) and 4 (in./sec.) respectively. All of the curves shown in FIGS. 17A, 17B, 18A and 18B depict stable operation with very acceptable phase angles and margins of error.

Figure 19:
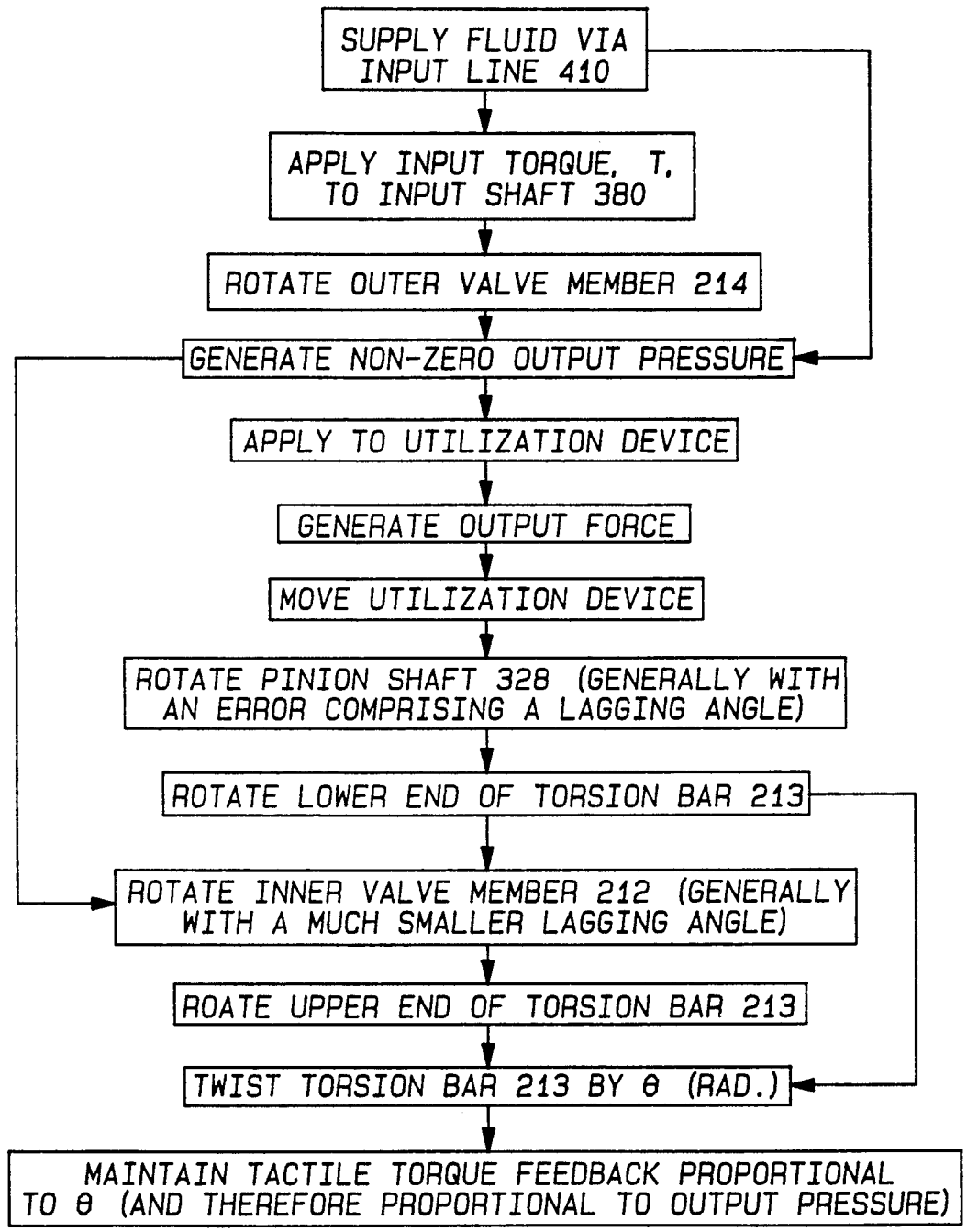
FIG. 19 is a flow chart outlining a method of controlling a closed-loop servo system comprising a four-way torque reaction valve.

FIG. 19 is a flow chart that outlines the procedure followed in controlling a closed-loop servo system comprising a four-way torque reaction valve 210. Fluid is supplied to the four-way torque reaction valve 210 via input line 410. Torque is applied to input shaft 380 which causes outer valve member 214 to rotate. Non-zero output pressure is generated and applied to a utilization device. The utilization device generates an output force which (in general) results in movement of the utilization device. The movement of the utilization device causes counter-rotation of pinion shaft 328 and the lower end of torsion bar 213. The output pressure also causes inner valve member 212 to rotate—which causes rotation of the upper end of the torsion bar 213. Combined counter-rotation of its lower end and rotation of its upper end causes the torsion bar 213 to twist by $\theta_\theta$. The twisting of the torsion bar 213 maintains tactile torque feedback (to the input shaft 380) which is proportional to $\theta_\theta$ (and therefore proportional to the output pressure).

Figure 20:
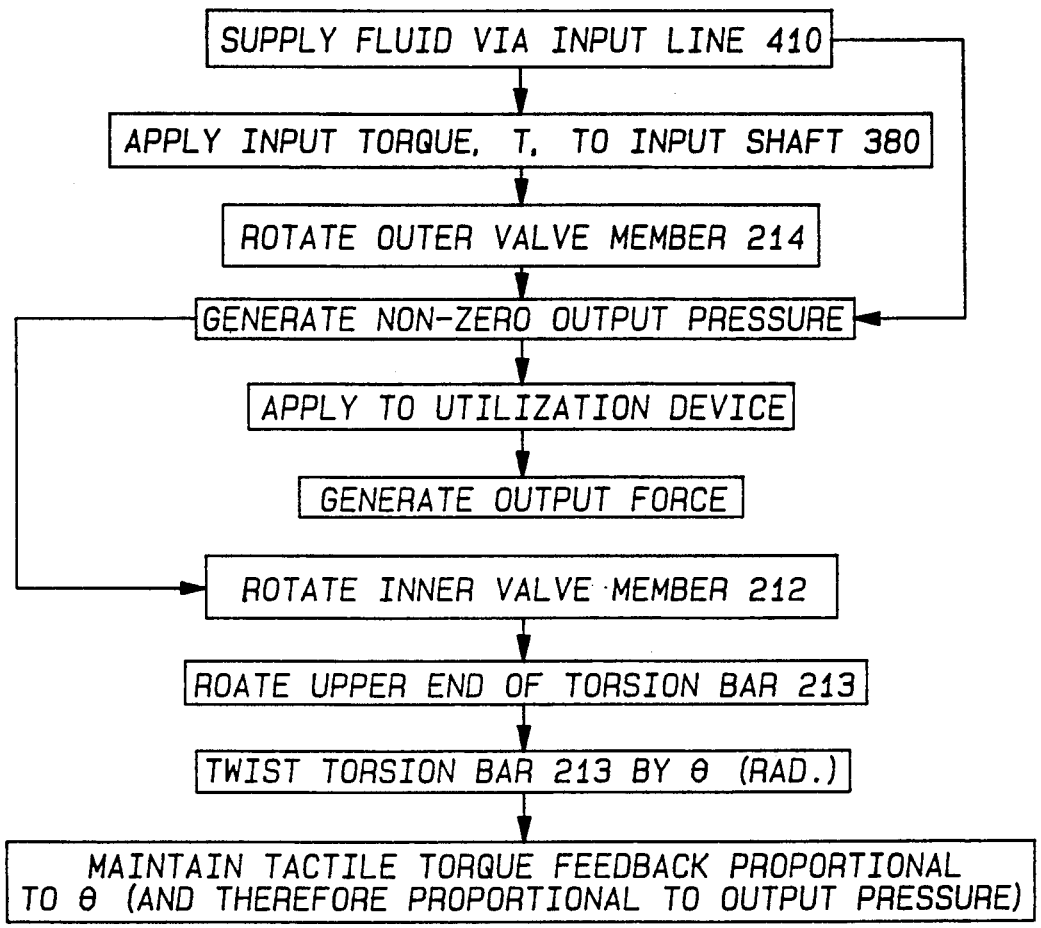
FIG. 20 is a flow chart outlining a method of controlling an open-loop servo system comprising a hand operated controller.

FIG. 20 is a flow chart that outlines the procedure followed in controlling an open-loop servo system comprising a differential pressure controller 450. Fluid is supplied to the differential pressure controller 450 via line 410. Torque is applied to input shaft 380 which causes outer valve member 214 to rotate. Non-zero output pressure is generated and applied to a utilization device. The utilization device generates an output force. The output pressure also causes inner valve member 212 to rotate—which causes rotation of the upper end of the torsion bar 213. The rotation of its upper end causes the torsion bar 213 to twist by $\theta_\theta$. The twisting of the torsion bar 213 maintains tactile torque feedback (to the input shaft 380) which is proportional to $\theta_\theta$ (and therefore proportional to the output pressure).

Figure 21:
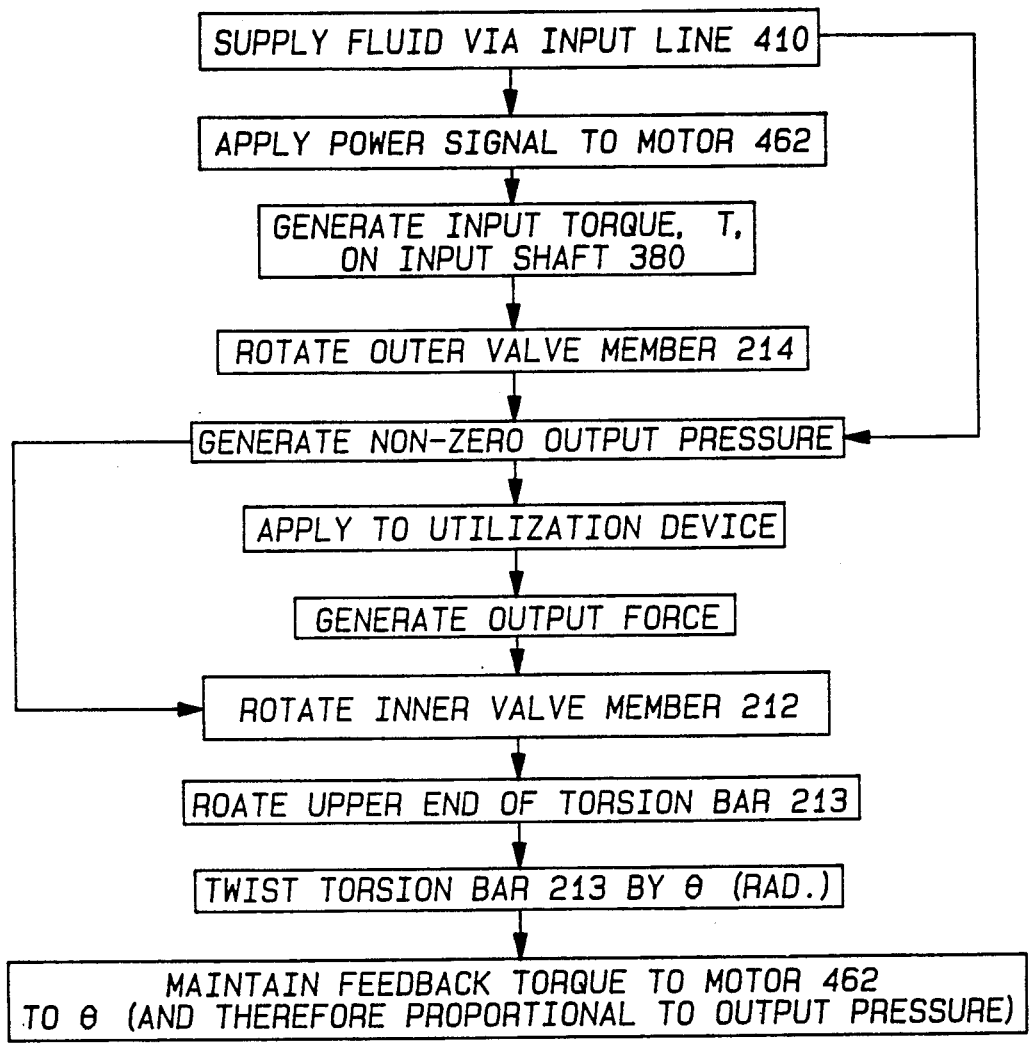
FIG. 21 is a flow chart outlining a method of controlling a closed or open-loop servo system comprising an electro-hydraulic servo valve.

FIG. 21 is a flow chart that outlines the procedure followed in controlling a servo system (either open or closed-loop) comprising an electro-hydraulic servo valve 460. Fluid is supplied to the electro-hydraulic servo valve 460 via input line 410. A power signal is applied to motor 462 which exerts torque on input shaft 380. This causes outer valve member 214 to rotate. Non-zero output pressure is generated and applied to a utilization device. The utilization device generates an output force. The output pressure also causes inner valve member 212 to rotate on pinion shaft 328 and the lower end of torsion bar 213. The output pressure also causes inner valve member 212 to rotate—which causes rotation of the upper end of the torsion bar 213. The rotation of its upper end causes the torsion bar 213 to twist by $\theta_\theta$. The twisting of the torsion bar 213 maintains feedback torque to the motor 462 (via the input shaft 380) which is proportional to $\theta_\theta$ (and therefore proportional to the output pressure).

Figure 22A:
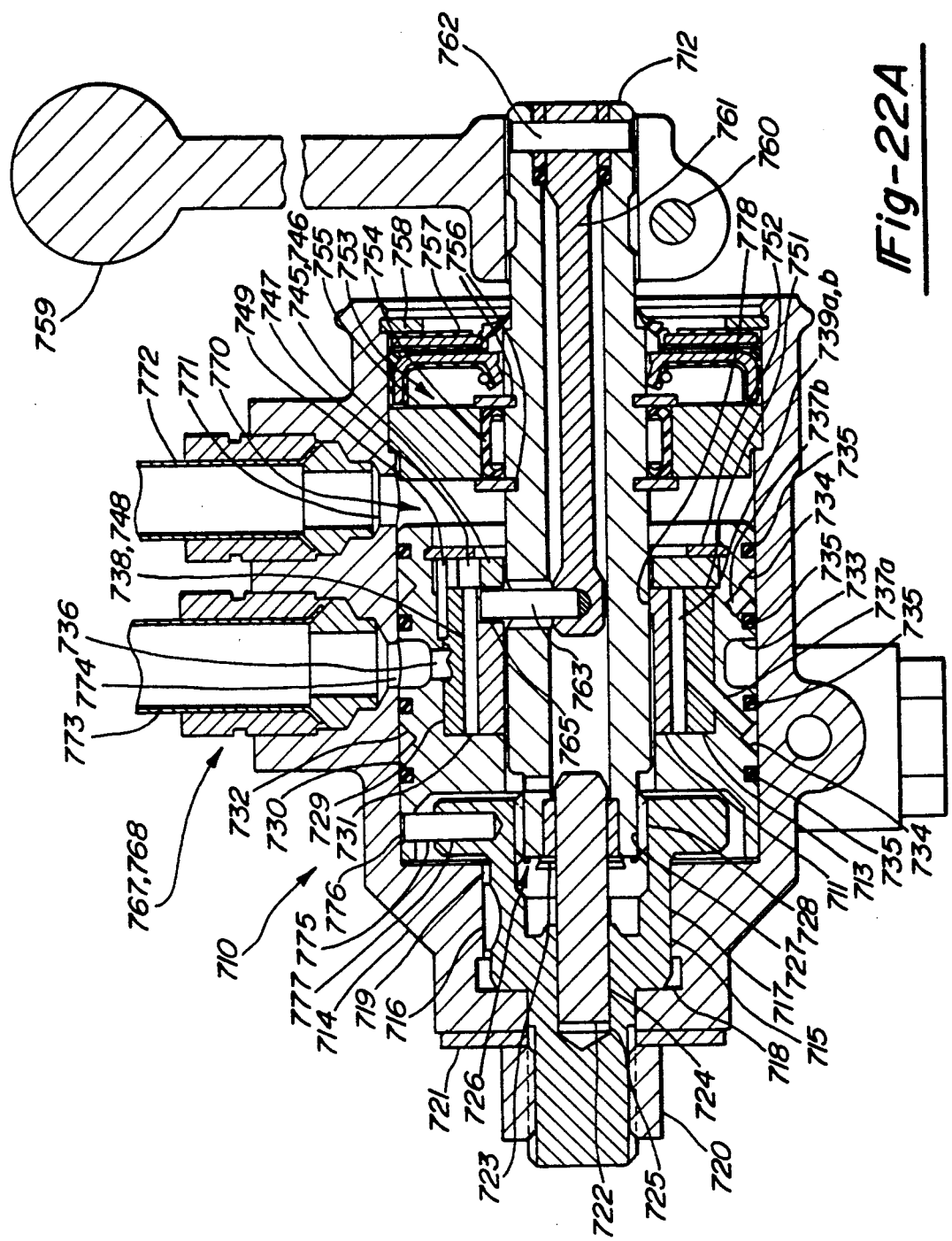
FIG. 22A is a longitudinal section view of a hand operated controller which comprises an improved torque reaction valve.

Shown in FIG. 22A is a longitudinal section view (whose top and bottom halves are taken along selected sections as described below) of a hand operated pressure controller 710 which is operationally similar to the differential pressure controller 450 shown in FIG. 4. Because the outer valve member 214, which comprises various hydraulic slip rings and their concomitant seal rings 439, is directly coupled to the input shaft 380 of the differential pressure controller 450, it has been found that excessive torque can be required for its operation when system pressures are high. Thus, the hand operated pressure controller 710 comprises a convoluted design wherein its inner valve member 711 is directly coupled to its input shaft 712 and its outer valve member 713 is directly coupled to its valve body 714.

The inner valve member 711 and outer valve member 713 function in the same manner as the inner and outer valve members 212 and 214, respectively, in the torque reaction valve 210 or the inner and outer valve members 262 and 264, respectively, in the torque reaction valve 260. If they emulate the inner and outer valve members 262 and 264, respectively, they are configured as shown in FIGS. 23A and 23B, respectively, and fabricated in the manner of external and internal gears, respectively, as described above.

Disposed within the lower end of the valve body 714 is an anchor shaft 715 with a locating key 716. It is located therein by a bore 717, shoulder 718 and keyway 719 formed in the valve body 714 whereat it is retained by a nut 720 and washer 721. The lower end of the input shaft 712 is supported for rotation within the anchor shaft 715 and about a bearing pin 722 by a bushing 723. The bearing pin 722 is secured within the anchor shaft 715 via a knurled portion 724 pressed into a bore 725 formed in the anchor shaft 715. Excessive rotation of the input shaft 712 is precluded in a known manner via action of a loose meshing spline section 726 whose external teeth 727 are formed in the input shaft 712 and internal teeth 728 are formed in the anchor shaft 715. To eliminate later assembly problems, the number of teeth comprised in the loose meshing spline section 726 is chosen to be an integer multiple of the number of slot sets formed in the inner and outer valve members 711 and 713, respectively, as also described above.

The outer valve member 713 is pressed into a bore 729 of a valve sleeve 730 until it is seated against a shoulder 731 thereof to form an outer valve assembly 732. The outer valve assembly 732 is precluded from rotation within the valve body 714 by a pin 775 protruding through a hole 776 formed in the valve sleeve 730. The pin 775 is disposed in a fixed location with respect to the valve body 714 because it is pressed into a hole 777 formed in the anchor shaft 715 which is precluded from rotation in the valve body 714 by the locating key 716.

Input and output hydraulic slip rings 733 and 734, respectively, and seal rings 735 are provided—also in a known manner. After the outer valve member 713 is pressed into the valve sleeve 730, multiple input and output ports 736, and 737a and 737b, respectively, are formed in the outer valve assembly 732 to allow fluid to flow from the input hydraulic slip ring 733 to input slots 738, and to or from the output hydraulic slip ring 734 from (or to) either sets of output slots 739a or 739b, respectively, (Note that the top and bottom halves of FIG. 22A are taken along sections comprising the input ports 736 and the output ports 737, respectively.)

Shown in FIGS. 24A and 24B are a damper valve 740 and a check valve 741, respectively. They are constructed in substantially the manner described above with respect to the damper valve 490 and check valve 526 subassemblies of the damper valve assembly 522 shown in FIG. 7. As shown in FIG. 22B, they are threadably assembled into first and second output flow passage legs 742a and 742b, respectively, formed in the valve body 714. The output flow passage legs 742a and 742b communicate directly with either of the output hydraulic slip rings 734 and fluid flow therefrom flows without restriction to output passageway 743 and output line 744 via the check valve 741. Returning fluid flow to the output passageway 743 must flow through the damper valve 740, however, is subject to resistive pressure drop which is a function of its flow rate as described hereinabove.

Pressurized fluid is supplied via input line 773 and input port 774 and subjects the input slots 738 and one of the sets of output slots 739a or 739b to pressurized fluid. The pressurized fluid contained therein is nominally sealed by the shoulder 731 and either of barrier rings 745 shown in FIG. 25A or 746 shown in FIG. 25B. The barrier rings 745 and 746 are formed with a set of holes 747. The holes 747 are aligned with return slots 748 (formed in the outer valve member 713) during assembly via alignment of a pin 749 (pressed into the outer valve member 713) and a hole 750 formed in the barrier ring 745. The barrier ring 745 is forceably held against outer end 751 of the outer valve member 713 by a beveled internal retaining ring 752 as shown in FIG. 22A. To facilitate unconstrained rotational motion of the inner valve member 711—combined with adequate sealing of pressurized fluid—the inner valve member 711 is formed axially slightly shorter than the outer valve member 713. Representative differences in axial length range between 0.0002 (in.) and 0.0006 (in.). Thus, the inner valve member 711 is constrained axially and in pitch and yaw by the shoulder 731 and either of the barrier rings 745 or 746 while it is constrained in either radial direction by an internal circumferential rib 778 formed therein.

The input shaft 712 is located radially by a bearing assembly 753 comprising a drawn cup needle bearing 754 mounted in a ring 755 and axially in a known manner by retaining rings 756 loosely bearing against the drawn cup needle bearing 754. Fluid is sealed within the hand operated pressure controller 710 by a seal assembly 757 also formed in a known manner. The ring 755 and the seal assembly 757 are forceably retained within the valve body by an internal retaining ring 758.

Torque inputs to the hand operated pressure controller 710 are made via tangential force applied to a handle 759 by an operator. The handle 759 is clamped onto the input shaft 712 via a bolt 760 in a known manner. Input torque is transmitted to the inner valve member via a torsion bar 761 as indicated in FIG. 26. Torque is transmitted to the torsion bar 761 from the input shaft 712 via a pin 762 in a known manner. The torsion bar 761 undergoes torsional deflection which is proportional to the impressed torque thereby availing the operator suitable tactile response. The torque is then transmitted to the inner valve member 711 via a pin 763 whose notched ends 764 engage radial slots 765 formed in the inner valve member 71 1. The purpose of shoulders 766 (formed via notching the pin 763) is to limit radial displacement of the pin 763 so that it can not contact the outer valve member 713 and interfere with unconstrained rotational motion of the inner valve member 711.

Utilizing the barrier ring 745 serves to configure the hand operated pressure controller 710 as a four-way hand operated pressure controller 767. This is because both sets of output slots 739a and 739b are sealed by the shoulder 731 and barder ring 745. This requires the use of two sets of damper valves 740, check valves 741 output flow passage legs 742a and 742b, output passageways 743 and output lines 744. The four-way hand operated pressure controller 767 operates in precisely the same manner as the differential pressure controller 450.

Utilizing the barrier ring 746 serves to configure the hand operated pressure controller 710 as a three-way hand operated pressure controller 768. This is because another set of holes 769 is used to deactivate the set of output slots 739b by relieving fluid pressure therein directly to valve body chamber 770. All return fluid is conducted therefrom to return port 771 and return line 772. Thus, only one set of damper valve 740, check valve 741 output flow passage legs 742a and 742b, output passageway 743 and output line 744 is required.

Figure 27:
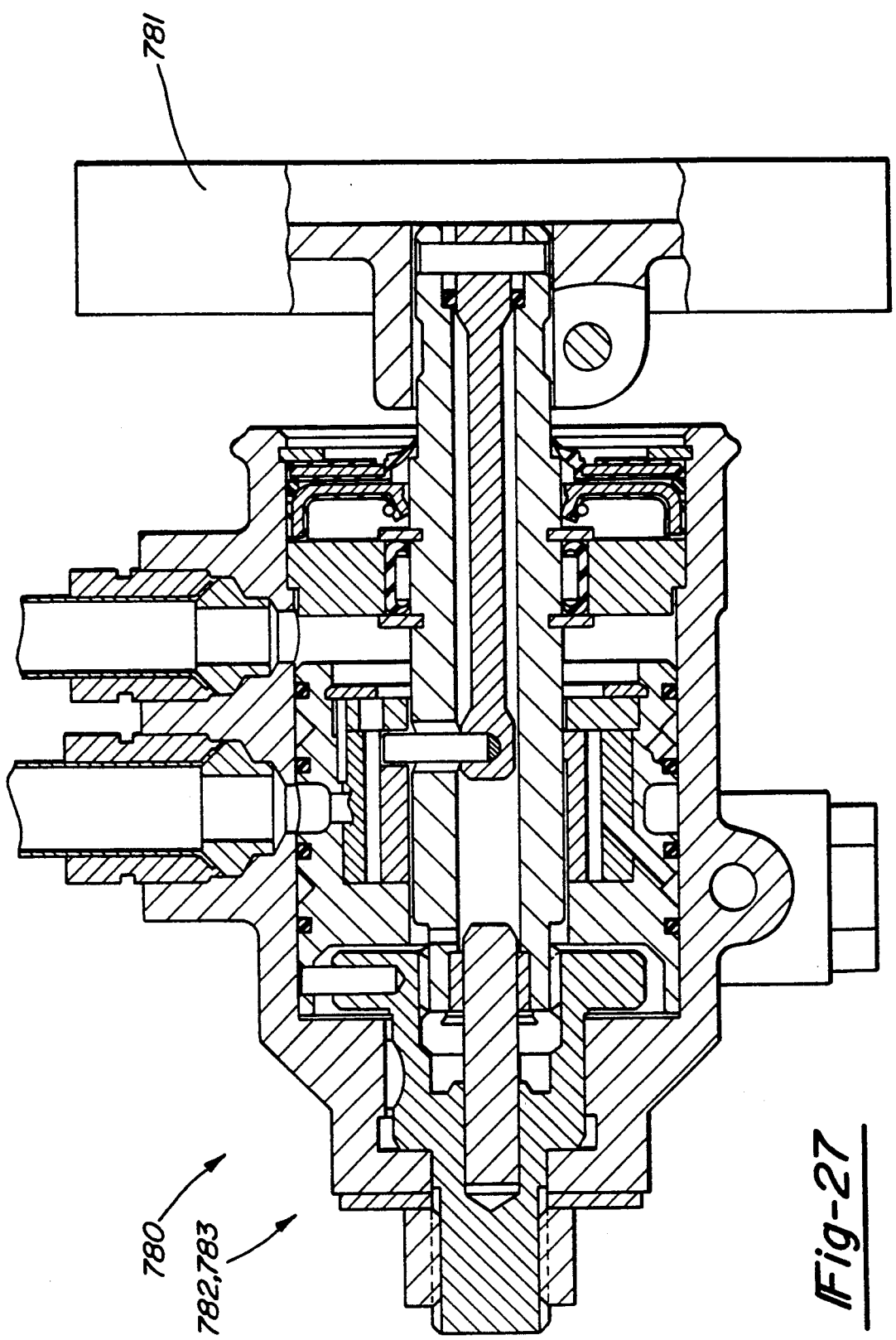
FIG. 27 is a longitudinal section view of an electro-hydraulic servo valve which comprises the improved torque reaction valve.

Shown in FIG. 27 is a is an electro-mechanical servo-valve 780. The electro-mechanical servo-valve 780 is identical with the hand operated pressure controller 710 except that the handle 759 has been replaced by an electrically actuated motor 781. The electrically actuated motor 781 can comprise the torque motor 470 shown in FIG. 5B. If the barrier ring 745 is utilized in the electro-mechanical servo-valve 780, then it is configured as a four-way electro-mechanical servo-valve 782—which operates in precisely the same manner as the electro-mechanical servo-valve 460. If the barrier ring 746 is utilized in the electro-mechanical servo-valve 780 then it is configured as a three-way electro-mechanical servo-valve 783.

Figure 28:
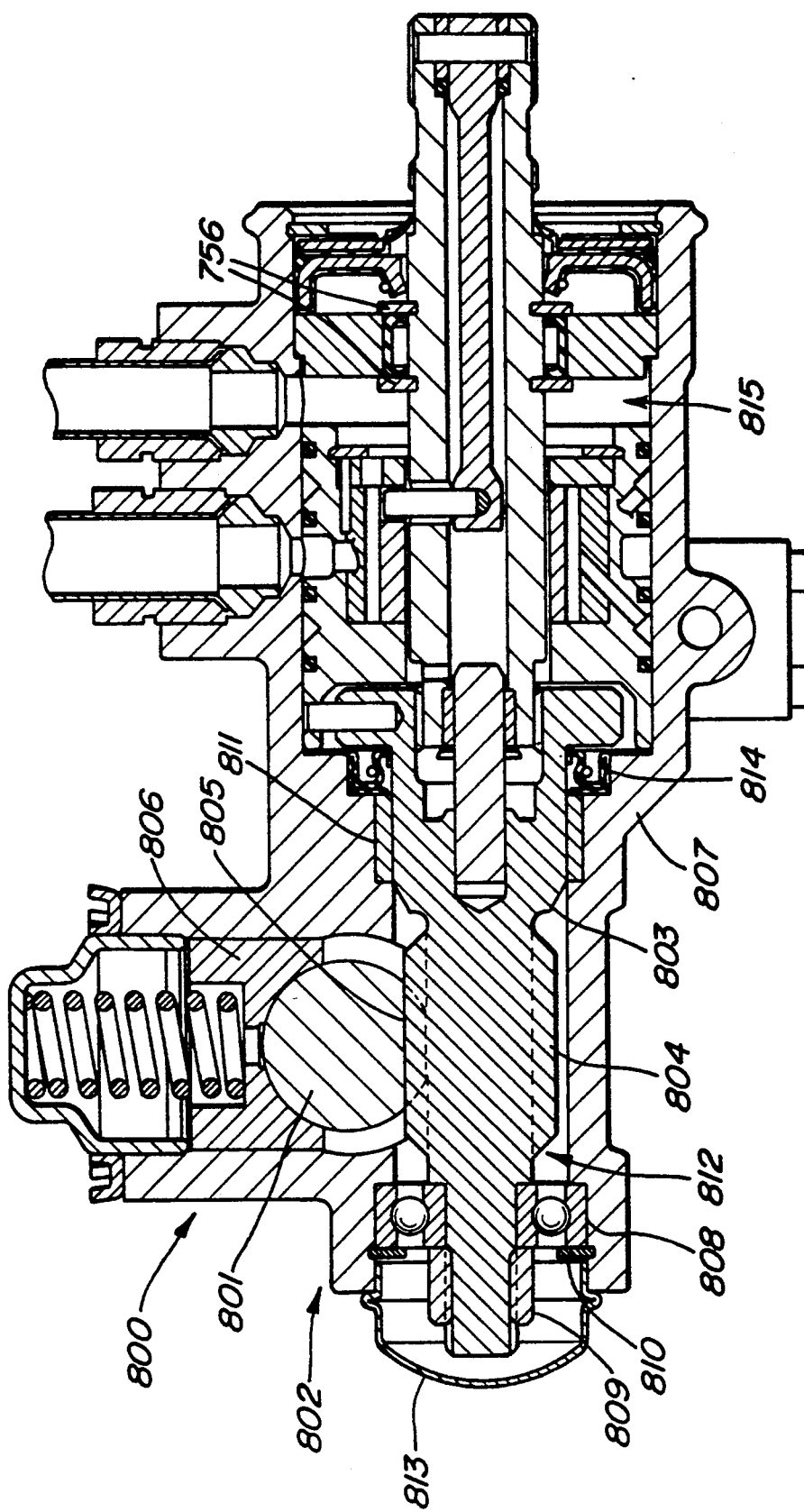
FIG. 28 is a section view of a first torque reaction valve which comprises follow along position feedback.

Shown in FIG. 28 is a torque reaction valve 800 which is functionally equivalent to either of the torque reaction valves 210 or 260. However, it also comprises substantially all of the inner components described above with respect to the hand operated pressure controller 710. However, the inner components of the torque reaction valve 800 rotate in a "follow-along" manner with respect to a piston/rack assembly 801 of a power steering system 802 within which the torque reaction valve 800 is comprised. Substantive differences between the torque reaction valve 800 and the hand operated pressure controller 710 comprise the following:

The anchor shaft 715 is replaced with a rotating pinion shaft 803 which comprises a pinion gear 804 that meshes with rack gear teeth 805 formed on the piston/rack assembly 801. The piston/rack assembly 801 is forceably urged toward the pinion gear 804 by a spring loaded yoke 806 in a known manner so that the mesh between the pinion gear 804 and the rack gear teeth 805 is backlash free. Thus, the outer valve assembly 732 is constrained to rotate proportionally to transversing (i.e., in and out of the plane of FIG. 28) motions of the piston/rack assembly 801. The pinion shaft 803 is located with respect to a steering gear/valve body 807 in a known manner by a bearing 808, nut 809, a beveled internal retaining ring 810 and a bushing 811. Gear lubricant is contained in a chamber 812 comprising the pinion gear 804 and rack gear teeth 805 by a cap 813 and a shaft seal 814 in a known manner. The shaft seal 814 also serves to keep hydraulic fluid from migrating into the chamber 812 from a chamber 815 comprising the inner components of the torque reaction valve 800.

Figure 29:
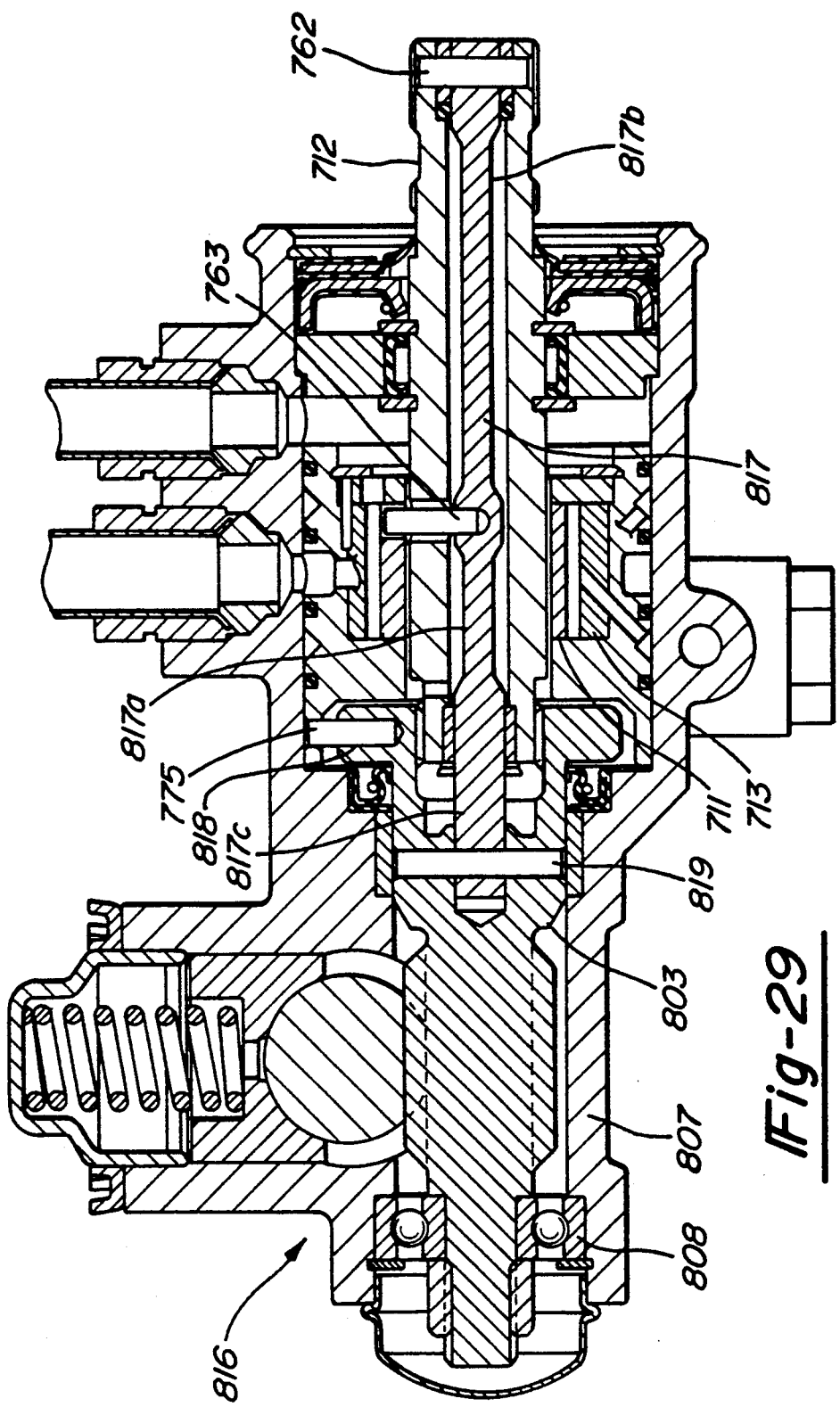
FIG. 29 is a section view of a second torque reaction valve which also comprises follow along position feedback.

Shown in FIG. 29 is a torque reaction valve 816 which additionally comprises a feedback torsion bar 817a. The feedback torsion bar 817a is actually formed as a portion of a new torsion bar 817 which also serves both the function of the torsion bar 761 and the bearing pin 722. Thus, the new torsion bar 817 comprises the feedback spring 817a, a torsion bar 817b and a bearing pin 817c. Incipient torque levels applied via the input shaft 712 are directly applied to the pinion shaft 803 via the torsion bar 817—before the inner valve member 711 moves substantially with respect to the outer valve member 713. In fact, applied torque is bifurcated between the feedback spring 817a and reaction interface of the inner and outer valve members 711 and 713, respectively. The torsional spring stiffness of the reaction interface (i.e., valve torsional stiffness $K_v$) is $$K_v = R_v A_v Q_s^2 / 45000 L_{ve}^2 (X_o - X_v)^3,$$

where $R_v$ is valve radius, $A_v$ is valve area, $Q_s$ is fluid supply flow rate as described hereinbefore, $L_{ve}$ is effective valve length, $X_o$ is nominal tangential valve clearance and $X_v$ is tangential valve motion.

In addition, because the pin 763 must be rotationally indexed with respect to the pinion shaft 803, the inner and outer valve members 711 and 713, respectively, are rotationally centered with respect to one another and then a hole 818 formed to receive the pin 775. Alternately, a pin 819 can be used to anchor the new torsion bar 817 (instead of the press fit described hereinabove). Thus, the required rotational indexing can be accomplished via assembly of either the pin 775 or the pin 819.

Also, because the input shaft 712 is axially constrained with respect to the new torsion bar 817 via assembling pin 762, it is thereby axially constrained with respect to the steering gear/valve body 807 via the pinion shaft 803 and the bearing 808. Thus, there is no requirement for the retaining rings 756 in the torque reaction valve 816.

Figure 30A:
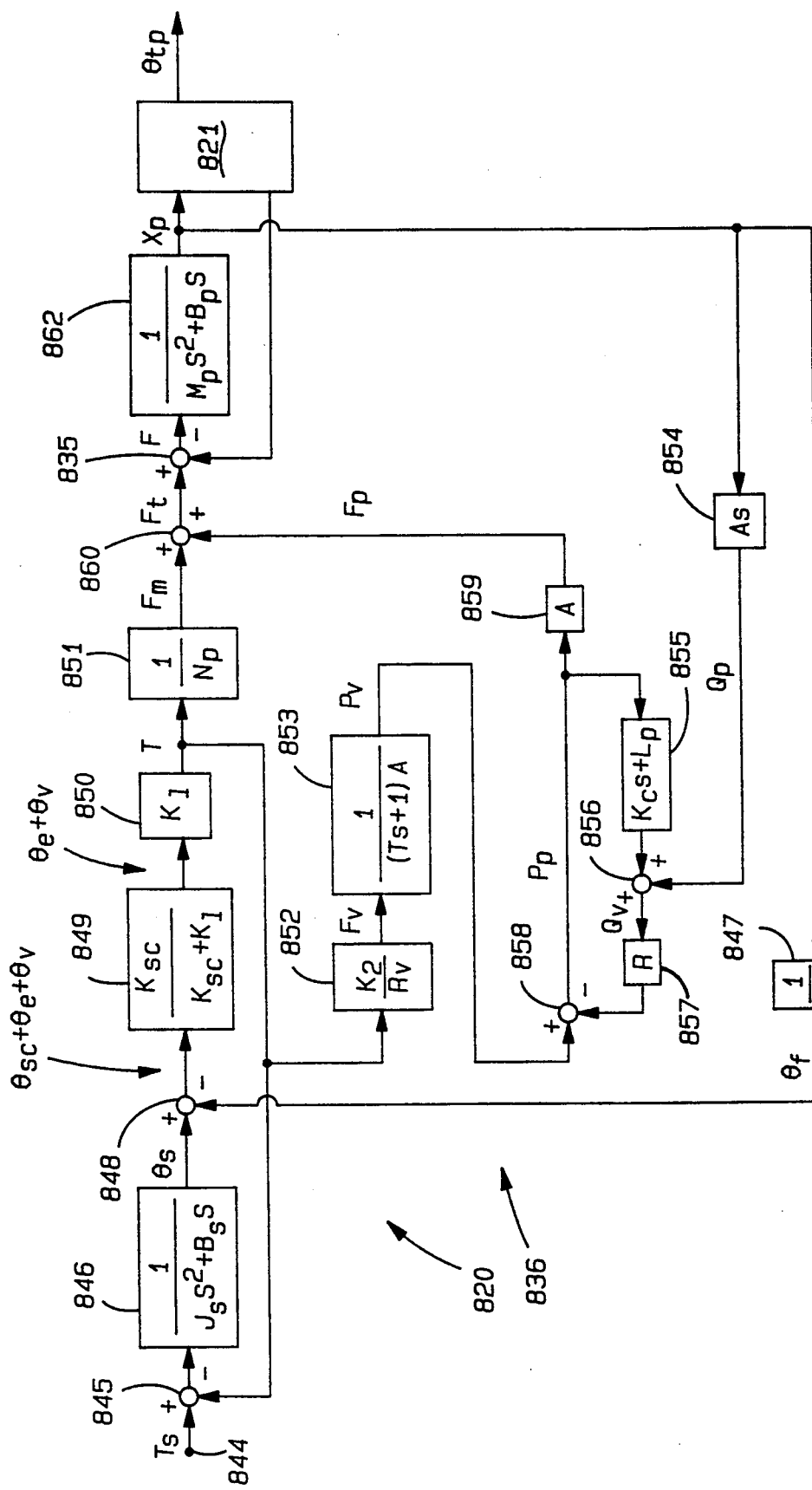
FIG. 30A is a block diagram which depicts the operation of a power steering system that utilizes either of the first or second torque reaction valves.
Figure 30B:
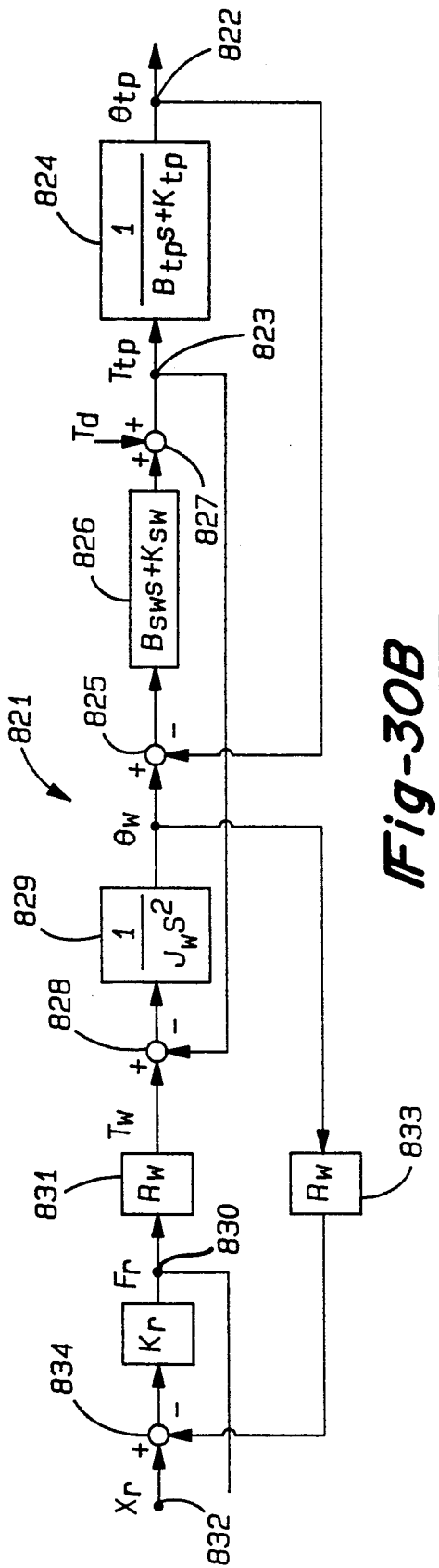
FIG. 30B is a block diagram which depicts the operation of an output section of the block diagram shown in FIG. 30A.

Shown in FIG. 30A is a block diagram 820 depicting operation of a power steering system which incorporates either of the torque reaction valves 800 or 816. Shown in FIG. 30B is an output section block diagram 821 which is pertinent to understanding the block diagram 820. The block diagram 821 depicts the operational characteristics of a host vehicle's structure, wheels, tires and tire patch wherein tire patch characteristics include $$K_{tp} = 15000 e^{-1.5 X_p}$$

and $$B_{tp} = 500 + 1000 X_p + 175 X_p^2,$$

where $k_{tp}$ is tire patch stiffness, $X_p$ is piston/rack assembly motion and $B_{tp}$ is tire patch damping coefficient for a sample tire patch.

The output signal of a steering system as a whole determines the average steering angle achieved at the host vehicle's tire patches, $\theta_{tp}$, which is located in the block diagram 821 at output terminal 822. $\theta_{tp}$ is determined by the sum of the torques applied to the tire patches, $T_{tp}$ (located at terminal 823), multiplied by control element $1/(B_{tp}s + K_{tp})$ shown at block 824. $T_{tp}$ is determined by the difference between average dirigible wheel angle, $\theta_w$, and $\theta_{tp}$ (which difference is achieved via summing point 825), multiplied by control element $(B_{sw}s + K_{sw})$ (side wall damping and spring rate terms, respectively) shown at block 826—plus any disturbing torque (as shown at summing point 827). $\theta_w$ is determined by the difference between the sum of the torques applied to the wheels, $T_w$, and $T_{tp}$ (which difference is achieved via summing point 828), multiplied by control element $1/(J_w s^2)$ (wheel moment of inertia term) shown at block 829. $T_w$ is determined by the sum of the forces applied to wheel lever arms, $F_r$ (located at terminal 830), multiplied by a control element $R_w$ shown at block 831. $F_r$ is determined by the difference between the position of a rack of the host steering system, $X_r = X_t$ (located at terminal 832), and $\theta_w$ multiplied by another control element $R_w$ shown at block 833 (which difference is achieved via summing point 834), multiplied by control element (overall stiffness of the host vehicle's structure—including its tie rod assembly).

The principle function of a host steering system is to determine $X_p$. It is not able to do this independently from the elements of the output section 821. This is because $F_r$ is fed back from terminal 818 to a position located within the host steering system. In the block diagram 820 this occurs at summing point 835 which is located within control section 836.

Inputs to the control section 836 are made at input terminal 844 by applying torque, $T_s$, to the host vehicle's steering wheel (not shown). Torque present at an input shaft of the torque reaction valve, T, is subtracted therefrom (which subtraction is performed by summing point 845). The product of $(T_s - T)$ and control element $1/(J_s s^2 + B_s)$ shown at block 846 determines steering wheel angle $\theta_s$. The product of $X_p$ and control element $1/N_p$ shown at block 847 determines rotational position feedback angle $\theta_f$. The difference between $\theta_s$ and $\theta_f$, which difference is generated by summing point 848, generates the sum of a steering shaft twist angle $\theta_{sc}$ and a system input error angle $(\theta_e + \theta_v)$ (where $\theta_v$ is a displacement angle of the inner valve member 711 with respect to the outer valve member 713). The product of $(\theta_{sc} + \theta_e + \theta_v)$ and control element $K_{sc}/(K_1 + K_{sc})$ (where $K_1 = K_t(K_v + K_f)/(K_t + K_v + K_v)$, and $K_t$, $K_v$ and $K_f$ are torsion bar stiffness, the valve torsional stiffness and feedback spring stiffness, respectively) shown at block 849 generates the system input error angle $(\theta_e + \theta_v)$ which comprises a twist angle of the torsion bar plus a valve orifice displacement angle (i.e., inner valve member rotation with respect to the outer valve member). The product of $(\theta_e + \theta_v)$ and control element $K_1$ shown at block 850 provides the torque T.

Mechanically derived steering force, $F_m$, is provided by the product of T and control element $1/N_p$ shown at block 851. Hydraulically derived steering force, $F_p$, is provided via a product of T and a string of control elements as follows: T multiplied by control element $K_2/R_v$ (where $K_2 = K_v/(K_v + K_f)$ and $R_v$ is valve radius) shown at block 852 generates tangential valve force $F_v$. $F_v$ multiplied by control element $1/(\tau s + 1)A_v$ (where t is fluid supply time constant, s is Laplace complex variable and $A_v$ is valve reaction area) shown at block 853 generates valve output pressure $P_v$. Piston pressure $P_p$, is generated as follows:

The product of $X_p$ and control element As (product of piston area and Laplace complex variable) shown at block 854 determines cylinder flow rate $Q_p$. $Q_p$ subtracted from the product of $P_p$ and control element ($K_c s + L_p$) shown at block 855 (which subtraction is performed at summing point 856) determines net valve flow rate $Q_v$. The product of $Q_v$ and control element R (damper valve resistance as described hereinabove) shown at block 857 is subtracted from $P_v$ at summing point 858 to generate $P_p$. The product of $P_p$ and control element A shown at block 859 generates hydraulically derived steering force $F_p$. $F_p$ is summed with $F_m$ at summing point 860 to generate total steering force $F_t$. $F_r$ (from the block diagram 821) is subtracted from $F_t$ at summing point 835 to generate net steering force F. And finally, F multiplied by control element $1/(M_p s^2 + B_p s)$ shown at block 862 generates $X_p$.

Figure 31:
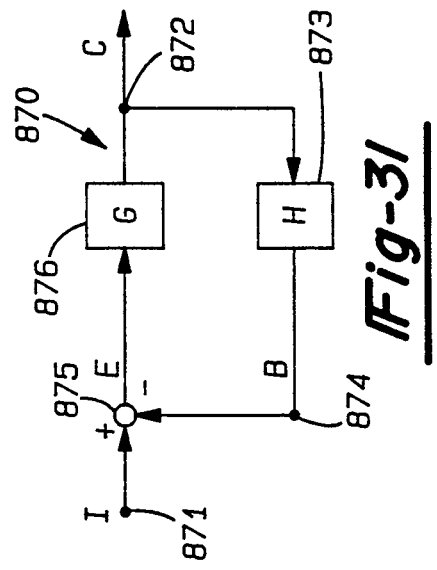
FIG. 31 is a "cononical form" of feedback control system to which the block diagram of FIG. 30A can be reduced via computation of forward and feedback transfer functions.

Shown in FIG. 31 is a "canonical form" block diagram 870. The block diagram 820 can be reduced to this format via computation of suitable forward and feedback transfer functions. In the block diagram 870 an input signal, I, is applied to input terminal 871. Closed-loop response of the block diagram 870 yields an output signal, C, at output terminal 872. C multiplied by control element H shown at block 873 generates a feedback signal, B, which appears at feedback terminal 874. B is subtracted from I at summing point 875 to generate an error signal, E. Finally, E multiplied by control element G shown at block 876 generates the output signal C.

It is desirable for the power steering system represented by the block diagram 870 to operate in a stable manner. This will occur if the absolute value of an open-loop transfer function comprising the product GH goes through the value 1 with the absolute value of its argument less than 180(deg.). If this is true then any disturbing signal input to the system will be damped out and the system's operation will be stable.

Two forms of open-loop transfer function can be defined with respect to the block diagram 820. A first open-loop transfer function, GH, relates $X_p$ to $T_s$. It is of interest to plot this function with respect to frequency and phase angle in order to judge system stability. A second open-loop transfer function, GoHo, relates $X_p$ to $\theta_s$. Because low frequency values differ widely between these two functions, it is of interest to plot real and imaginary parts of ratios of tire patch rotation $\theta_{tp}$ to $T_s$ and $\theta_s$, respectively, (In the case of $T_s$ it is also helpful to multiply by a normalizing function such as a control element $Q_9 = J_s s^2 + B_s s$.) In an ideal power steering system, plots of these ratios would be resonance free and have their maximum values at 0.0(Hz).

Detailed analysis and plotting of these functions is greatly aided by utilizing sophisticated computer analysis techniques. Such analysis has been performed herein on a Macintosh computer with an analysis program entitled MATHEMATICA (which program is available from Wolfram Research, Inc. of Champaign, Ill,). Shown below are typical values for the various terms defined above. These values comprise input data for particular programs which were used to analyze a torque reaction valve equipped power steering system. In these programs lower case letters and no subscripts are used. Thus, js is understood to represent $J_s$ and so on. The first program is used to plot output (steering) force ft as a function of xv. The second program is used to plot system performance for a particular chosen value of xv. The first program is defined as follows:

```
xo = 0.004;
kt = 640.0;
```

-continued
```
ks = 0.0;
kf = 0.0;
lve = 1.5;
rv = 0.55;
av = 0.05;
qs = 6;
lp = 0.0001;
r = 200;
tv[xv_]:= rv av qs∧2/(90000 lve∧2 (xo − xv)∧2);
ts[xv_]:= tv[xv] + kf xv/rv;
kv[xv_]:= rv av qs∧2/(4500 lve∧2 (xo − xv)∧3);
k2[xv_]:= kt kv[xv]/(ks (kt + kv[xv] + kf) +
    kt (kv[xv] + kf));
np = 0.333333;
fm[xv_]:= ts[xv]/np;
a = 1.0;
fp[xv_]:= tv[xv] a/(rv av (1 + rlp));
ft[xv_]:= fm[xv] + fp[xv];
thetae[xv_]:= ts[xv]/kt;
thetav[xv_]:= xv/rv;
thetas[xv_]:= thetae[xv] + thetav[xv];
```

Figure 32A:
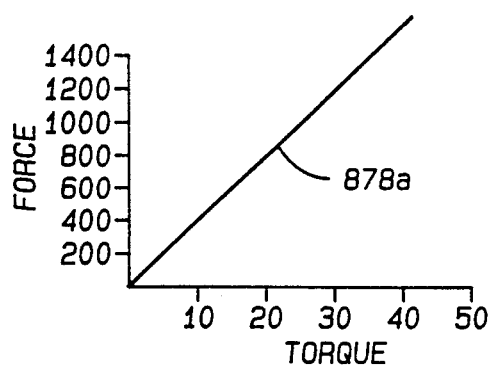
FIGS. 32A-C are plots depicting steering force as a function of applied torque, tangential valve motion and input shaft rotation, respectively, for the first torque reaction valve.
Figure 33A:
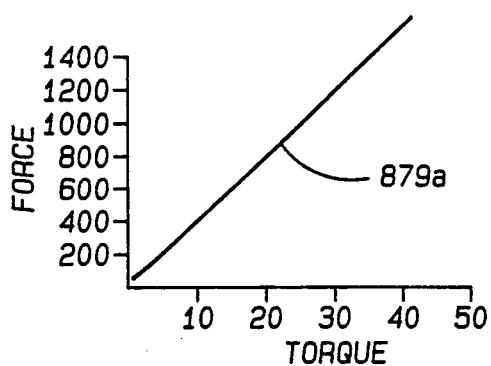
FIGS. 33A-C are plots depicting steering force as a function of applied torque, tangential valve motion and input shaft rotation, respectively, for the second torque reaction valve.
Figure 32B:
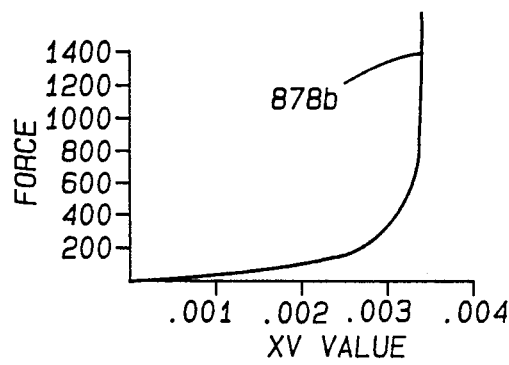
Figure 33B:
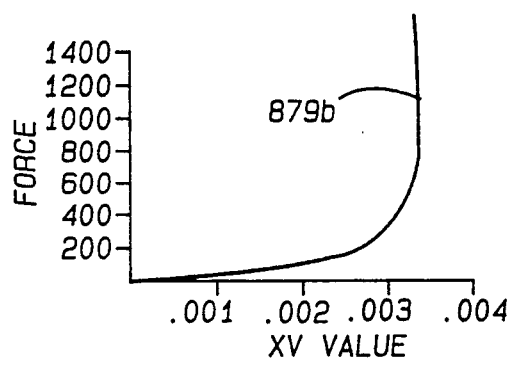
Figure 32C:
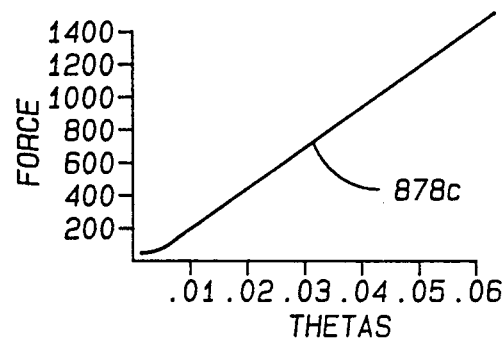
Figure 33C:
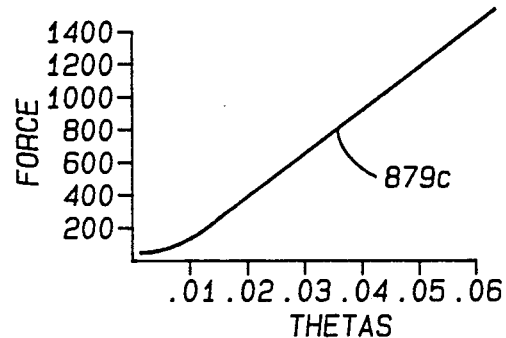

Shown in FIGS. 32A-C are curves 878a-c, respectively which depict the output force ft as a function of $T_s$, $X_v$, and $q_s$, respectively, via utilization of the above values. Since kf=0.0 in the above values, the curves 878a-c depict the output force for a power steering system utilizing the torque reaction valve 800. Shown in FIGS. 33A-C are curves 879a-c, respectively, which depict the output force ft as a function of $T_s$, $X_v$ and $\theta_s$, respectively, for a modified set of values wherein kf=960(in.lb.). Thus, the curves 879a-c depict the output force for a power steering system utilizing the torque reaction valve 816.

The second program is defined as follows: (Note: This set of values includes a particular chosen value of xv=0.001 (in.). In general, any value of xv less than 0.004(in.) may be used so long as it results in an ft value less than 400(lbs.))

```
xv = 0.001;
xo = 0.004;
js = 0.32;
bs = 0.0;
ksc = 3200.0;
kt = 640.0;
ks = 0.0;
lve = 1.5;
rv = 0.55;
av = 0.05;
qs = 6;
lp = 0.0001;
r = 100;
tv = rv av qs∧2/(90000 lve∧2 (xo − xv)∧2);
ts = tv + kf xv/rv;
kv = rv av qs∧2/(4500 lve∧2 (xo − xv)∧3);
k1 = kt (kv + kf)/(kt + kv + kf);
k2 = kv/(kv + kf);
k4 = ksc/(ksc + k1)
np = 0.333333;
fm = ts/np;
a = 1.0;
fp = ts a/(rv av (1 + rlp));
ft = fm + fp;
xp = −Log[1 − ft/400]/1.5;
ktp = 15000.0 E∧(−1.5 xp);
btp = 500 + 1000 xp + 175 xp∧2;
ksw = 25000.0;
bsw = 100.0;
jw = 6.25;
rw = 5.0;
kr = 4000.0;
mp = 0.025;
bp = 2.0;
q1[s_]:= bsw s + ksw;
q2[s_]:= (btp + bsw) s + ktp + ksw;
```

```
-continued
q3[s_]:= jw s∧2 + q1(s) − q1[s]∧2/q2[s] + kr rw∧2;
q4[s_]:= mp s∧2 + bp s + kr;
tau = 0.05;
kc = 0.000025;
pi = N[Pi, 10];
q5[s_]:= tau s + 1;
q8[s_]:= js s∧2 + bs s + k1 k4;
q9[s_]:= js s∧2 + bs s;
q10[s_]:= 1 + r (kc s + lp);
q11[s_]:= q1[s] kr rw/(q2[s] q3[s]);
go[s_]:= Block[{myq3,myq4,myq5,myq10},
    myq3 = q3[s];
    myq4 = q4[s];
    myq5 = q5[s];
    myq10 = q10[s];
    N[k4 (k1/np + k1 a/(myq5 myq10 rv av))/
    (myq4 − (kr rw)∧2/myq3 + r a∧2 s/myq10),
    10]];
ho = N[1/np , 10];
g[s_]:= Block[{myq3,myq4,myq5,myq8,myq10},
    myq3 = q3[s];
    myq4 = q4[s];
    myq5 = q5[s];
    myq8 = q8[s];
    myq10 = q10[s];
    N[k4 (k1/np + k1 a/(myq5 myq10 rv av))/
    (myq8 (myq4 − (kr rw)∧2/myq3 +
    r a∧2 s/myq10)) , 10]];
h[s_]:= N[q9[s]/np , 10];
(*qtp(mrad) q9/ts = 1000 q11 g/(1 + g h) and
  qtp(mrad)/θs = 1000 q11 go/(1 + go ho)*)
```

(A thorough explanation of the syntax and other conventions used in the above programs can be found in a book entitled MATHEMATICA by Stephen Wolfram and published by Addison-Wesley. Also, an explanation of the procedures followed in obtaining these plots can be found therein.)

Figure 34A:
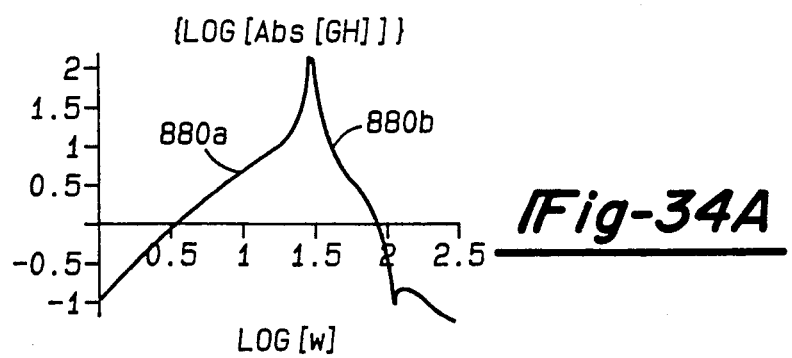
FIGS. 34A-H are plots depicting performance of a power steeling system utilizing the first torque reaction valve for a low value of steering force.
Figure 34B:
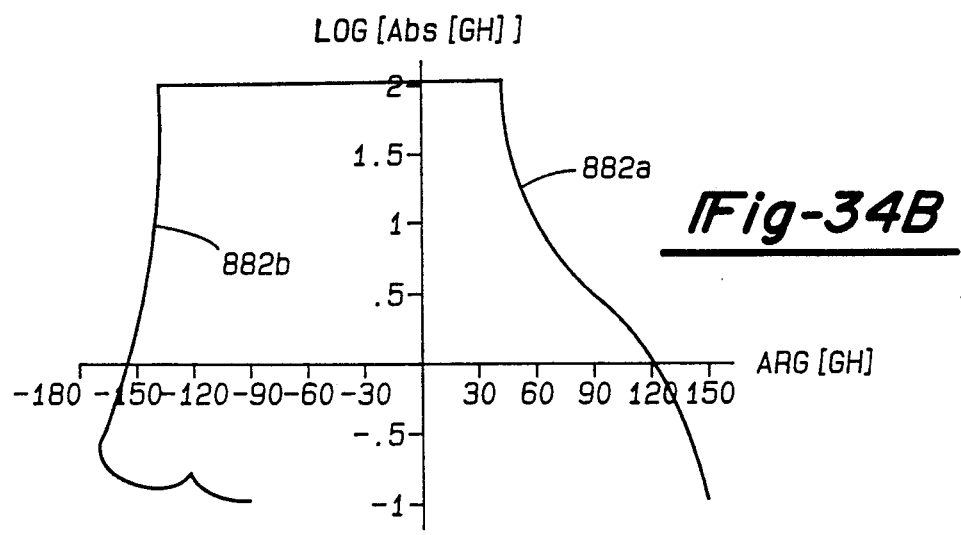

Shown in FIGS. 34A-H are plots depicting Log-[Abs[GH], Log[Abs[GH]] as a function of Arg[GH] (usually known as a Nichols Plot), Re[$\theta_{tp}$Q9/T$_s$], Im[$\theta_{tp}$Q9/T$_s$], Re[$\theta_{tp}/\theta_s$], Im[$\theta_{tp}/\theta_s$], R$_s$ and X$_s$ (where R$_s$ and X$_s$ are the real and imaginary parts, respectively, of a steering wheel impedance Z$_s$=T$_s$/q$_s$s), respectively, for X$_v$=0.0015(in.)—for a power steering system which uses the torque reaction valve 800. The selected value X$_v$=0.0015(in.) results in F$_t$=30.5(lbs). Curve 880a in FIG. 34A depicts GH for low frequencies to approximately 4.5(Hz) while curve 880b depicts GH for high frequencies greater than approximately 4.5(Hz). The curve is discontinuous because of a sharp resonance in the term (myq4−(kr rw)∧2/myq3+r a∧2 s/myq10). Similarly, curve 882a in FIG. 34B depicts GH for low frequencies to approximately 4.5(Hz) while curve 882b depicts GH for high frequencies greater than approximately 4.5(Hz). This curve is also discontinuous because of the sharp resonance in the term (myq4−(kr rw)∧2/myq3+r a∧2s/myq10). In fact, it is subject to a jump of −180(deg.) at the resonance as shown by straight line 882c.

Figure 34C:
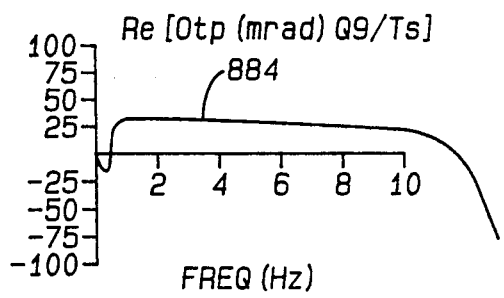
Figure 34D:
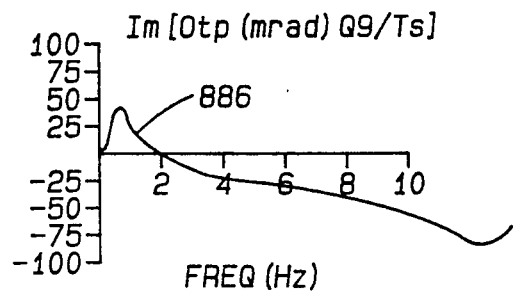

Curve 884 in FIG. 34C depicts Re[$\theta_{tp}$ Q9/T$_s$] while curve 886 in FIG. 34D depicts Im[$\theta_{tp}$ Q9/T$_s$]. They clearly depict a nominally critically damped resonance at approximately 0.6(Hz). The reason for that can be seen in curves 880a and 882a whereat Log[Abs[GH]] equals zero. At that value (where Log[w]has a value of about 0.6) Abs[GH] = 1.0 and has a phase angle of about +120 (deg.)—or a value that is reasonably close to (−1)$^{0.5}$. Thus, even though the curve 882a is to the right of the origin, conditions depicted in the curves 884 and 886 are present.

Figure 34E:
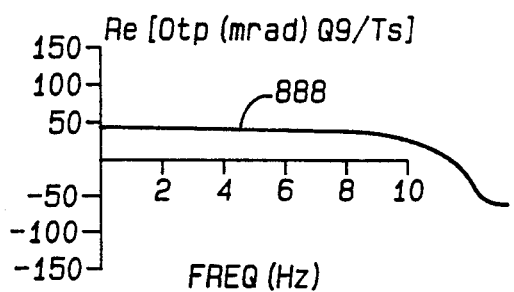
Figure 34F:
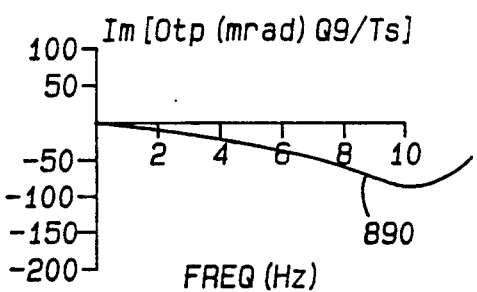

On the other hand, curves 888 and 890 depicting Re[$\theta_{tp}/\theta_s$] and Im[$\theta_{tp}/\theta_s$], respectively, in FIGS. 34E and 34F, respectively, are near ideal. Thus, a power steering system equipped with the torque reaction valve 800 will be accurately positioned but present a tactile torque lag at low frequency. While this lag is undesirable, lit is highly preferable to a resonance which occurs in manual and other types of power steering systems at about the same frequency.

Figure 34G:
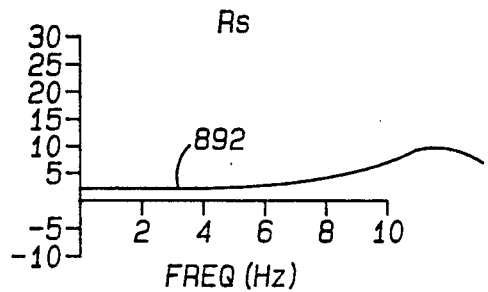
Figure 34H:
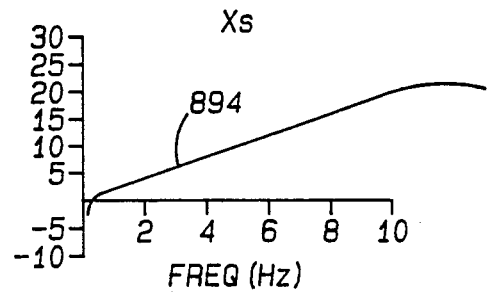

Real and imaginary parts R$_s$ and X$_s$, respectively, of the steering wheel impedance Z$_s$=T$_s$/$\theta_s$s are plotted in FIGS. 34G and 34H, respectively. This is accomplished by plotting real and imaginary parts of the expression totable/(ttable I wtable) via the Mathematica program as curves 892 and 894, respectively. These curves comprise a tactile feel that is quite acceptable. R$_s$ is slightly positive which is desirable for a stable tactile feel. X$_s$ is modestly spring-like at very low frequencies (i.e., less than about 0.5(Hz)) and then (via becoming positive) becomes inertia like and increases in value as a depiction of the steering wheel moment of inertia.

Figure 35A:
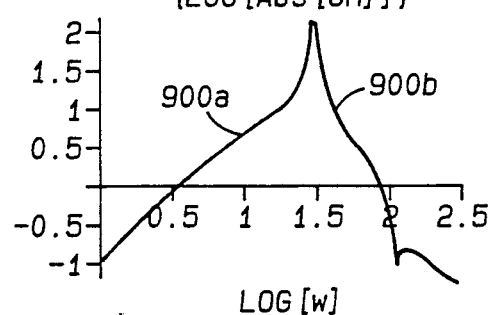
FIGS. 35A-H are plots depicting performance of a power steeling system utilizing the first torque reaction valve for a high value of steering force.
Figure 35B:
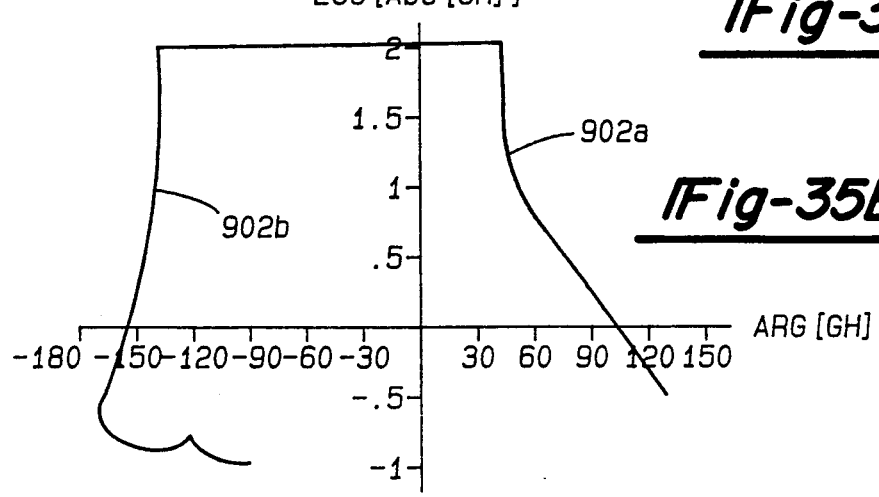

Shown in FIGS. 35A-H are plots depicting Log-[Abs[GH], Log[Abs[GH]] as a function of Arg[GH], Re[$\theta_{tp}$Q9/T$_s$], Im[$\theta_{tp}$Q9/T$_s$), Re[$\theta_{tp}/\theta_s$], Im[$_{tp}/\theta_s$], R$_s$ and X$_s$, respectively, for X$_v$=0.003125(in.)—for a power steeling system utilizing the torque reaction valve 800. The value X$_v$=0.0031.25(in.) results in F$_t$=249.1(lbs). Curve 900a in FIG. 35A depicts GH for low frequencies to approximately 6.3(Hz) while curve 900b depicts GH for high frequencies greater than approximately 6.3(Hz). Similarly, curve 902a in FIG. 35B depicts GH for low frequencies to approximately 6.3(Hz) while curve 902b depicts GH for high frequencies greater than approximately 6.3(Hz).

Figure 35C:
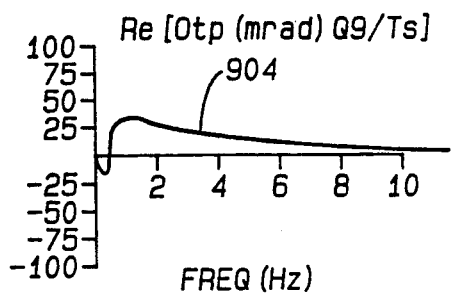
Figure 35D:
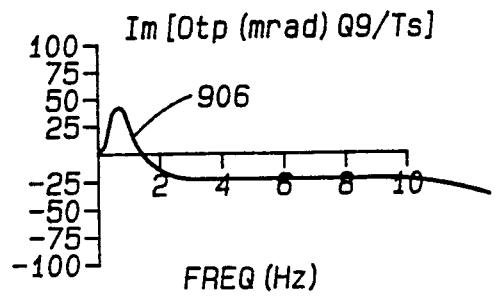
Figure 35E:
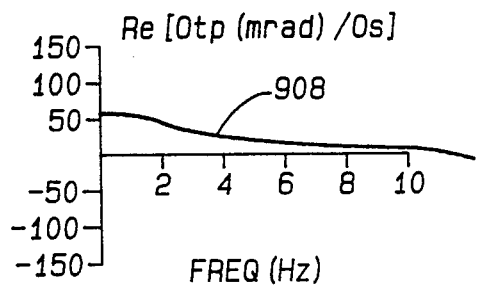
Figure 35F:
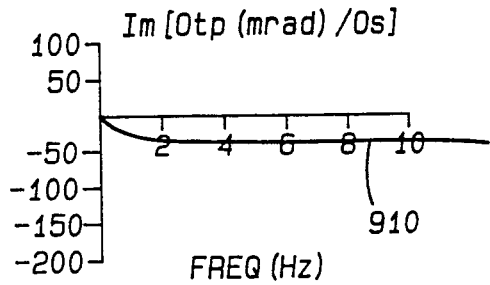

Curve 904 in FIG. 35C depicts Re[$\theta_{tp}$Q9/T$_s$] while curve 906 in FIG. 35D depicts Im[$\theta_{tp}$Q9/T$_s$]. They depict a nominally critically damped resonance at about 0.6(Hz). Curves 908 and 910 depicting Re[$\theta_{tp}$ /$\theta_s$) and Im[$\theta_{tp}/\theta_s$], respectively, in FIGS. 35E and 35F, respectively,—as well as the curves 904 and 906—depict a faster reduction in response with respect to frequency than the curves 888, 890, 884 and 886, respectively. This is because a tire patch has a lower value of torsional stiffness and a higher damping coefficient at higher steering load.

Figure 35G:
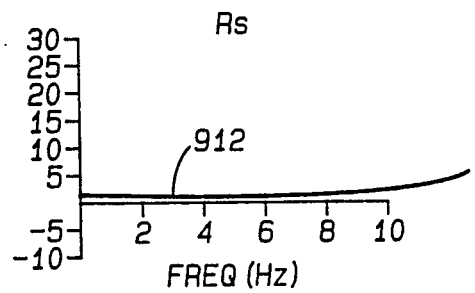
Figure 35H:
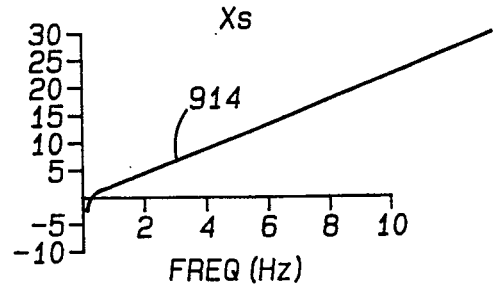
Figure 36A:
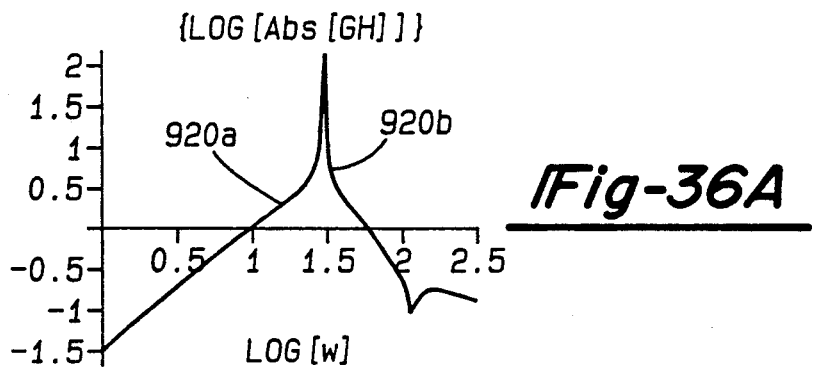
FIGS. 36A-H are plots depicting performance of a power steering system utilizing the second torque reaction valve for a low value of steering force.
Figure 36B:
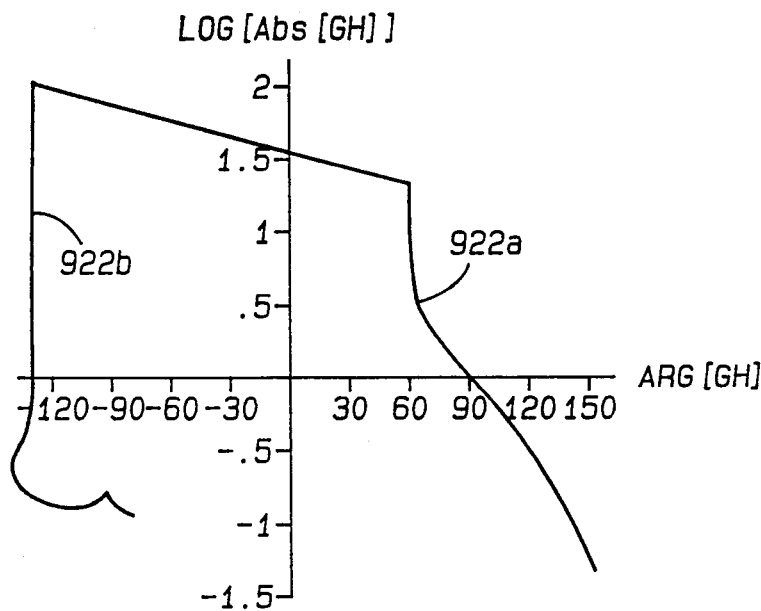

R$_s$ and X$_s$ are plotted in FIGS. 35G and 35H, respectively, as curves 912 and 914, respectively. These curves comprise a tactile feel that is also quite acceptable. This contrasts strongly with standard U.S. manufactured rotary valve equipped power steering systems which show negative values of R$_s$ sat about 3(Hz). This is a highly undesirable situation where a driver feels no steering resistance at all and is the explanation for a tactilely unstable condition at high steering loads such as those encountered while rounding a long freeway on-ramp (with such power steering systems). Shown in FIGS. 36A-H are plots depicting Log[Abs[GH]], Log-[Abs[GH]] as a function of Arg[GH], Re[$\theta_{tp}$Q9/T$_s$], IM[$\theta_{tp}$Q9/T$_s$], Re[$\theta_{tp}/\theta_s$], Im[$\theta_{tp}/\theta_s$], R$_s$ and X$_s$, respectively, for X$_v$=0.001 (in.)—for a power steering system which uses the torque reaction valve 816. The selected value X$_v$=0.001 (in.) results in F$_t$=29.4(lbs). Curve 920a in FIG. 36A depicts GH for low frequencies to approximately 5.5(Hz) while curve 920b depicts GH for high frequencies greater than approximately 5.5(Hz). The curve is discontinuous because of a sharp resonance in the term (myq4−(kr rw)∧2/myq3+r a∧2 s/myq10). Similarly, curve 922a in FIG. 36B depicts GH for low frequencies to approximately 5.5(Hz) while curve 922b depicts GH for high frequencies greater than approximately 5.5(Hz). This curve is also discontinuous because of the sharp resonance in the term (myq4−(kr rw)∧2/myq3+r a∧2 s/myq10).

Figure 36C:
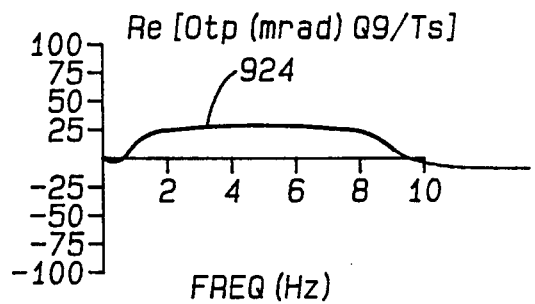
Figure 36D:
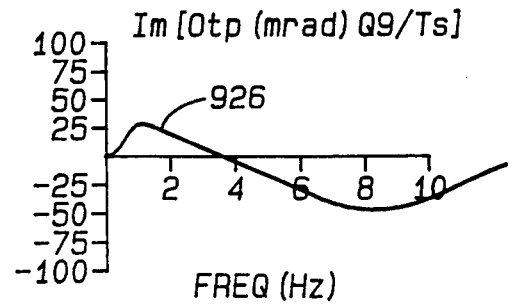

Curve 924 in FIG. 36C depicts Re[$\theta_{tp}$Q9/T$_s$] while curve 926 in FIG. 36D depicts Im[$\theta_{tp}$Q9/T$_s$]. They clearly depict a nominally critically damped resonance at approximately 1(Hz). The reason for that can be seen in curves 920a and 922a whereat Log[Abs[GH]] equals zero. At that value (where Log[w] has a value of about 0.95) Abs[GH]=1.0 and has a phase angle of about +85(deg.)—or a value that is very close to $(-1)^{0.5}$. Thus, even though the curve 922a is to the fight of the origin, conditions depicted in the curves 924 and 926 are present.

Figure 36E:
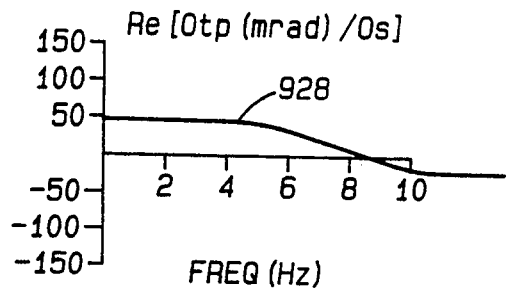
Figure 36F:
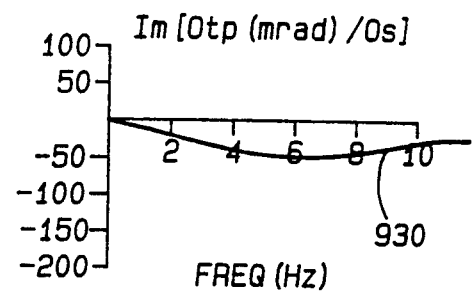
Figure 36G:
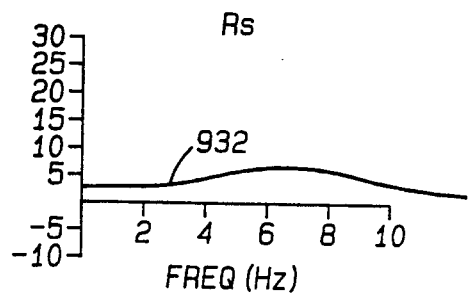
Figure 36H:
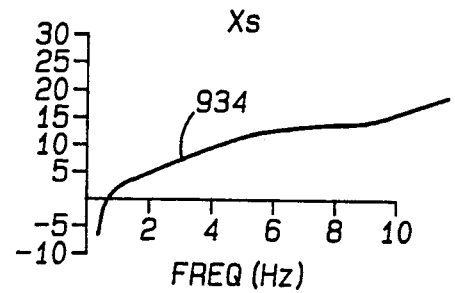

Curves 928 and 930 depicting Re[$\theta_{tp}/\theta_s$] and Im[$\theta_{tp}/\theta_s$], respectively, in FIGS. 36E and 36F, respectively, are near ideal. Thus, a power steering system equipped with the torque reaction valve 816 will also be accurately positioned but present a tactile torque lag at low frequency. Real and imaginary parts R$_s$ and X$_s$, respectively, of the steering wheel impedance Z$_s$=T$_s$/$\theta_s$ are plotted in FIGS. 36G and 36H, respectively, as curves 932 and 934, respectively. These curves also comprise a tactile feel that is similarly quite acceptable.

Figure 37A:
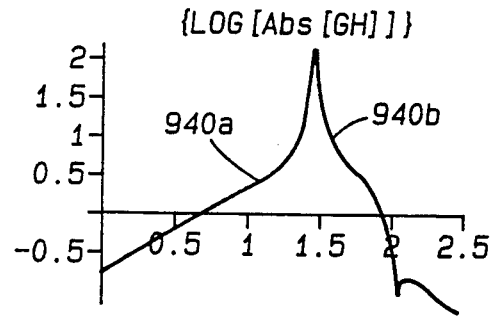
FIGS. 37A-H are plots depicting performance of a power steering system utilizing the second torque reaction valve for a high value of steering force.
Figure 37B:
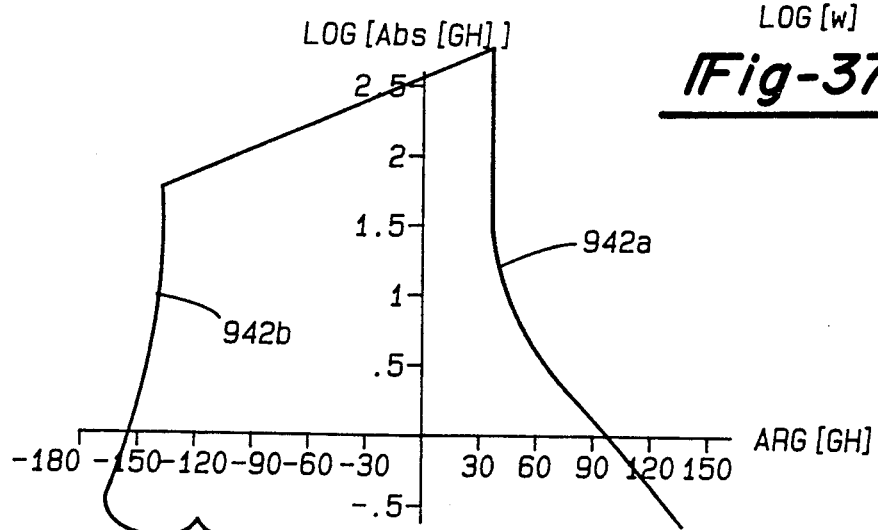

Shown in FIGS. 37A-H are plots depicting Log[Abs[GH], Log[Abs[GH]] as a function of Arg[GH], Re[$\theta$tpQ9T$_s$], Im[$\theta_{tp}$Q9T$_s$], Re[$\theta_{tp}/\theta_s$], Im[$\theta_{tp}/\theta_s$], R$_s$ and X$_s$, respectively, for X$_v$=0.00275(in.) which results in F$_l$=263.3(lbs). Curve 940a in FIG. 37A depicts GH for low frequencies to approximately 6.1 (Hz) while curve 940b depicts GH for high frequencies greater than approximately 6.1 (Hz). And, curve 942a in FIG. 37B depicts GH for low frequencies to approximately 6.1 (Hz) while curve 942b depicts GH for high frequencies greater than approximately 6.1 (Hz).

Figure 37C:
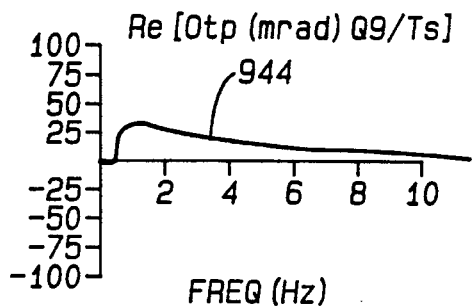
Figure 37D:
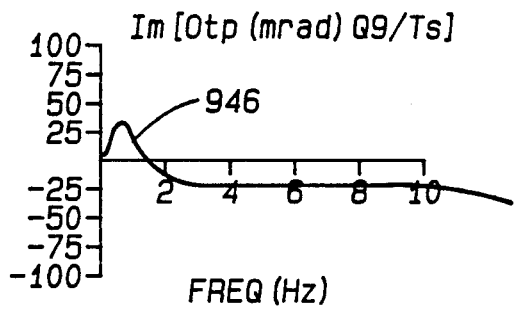
Figure 37E:
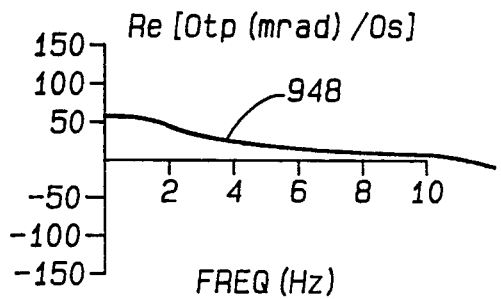
Figure 37F:
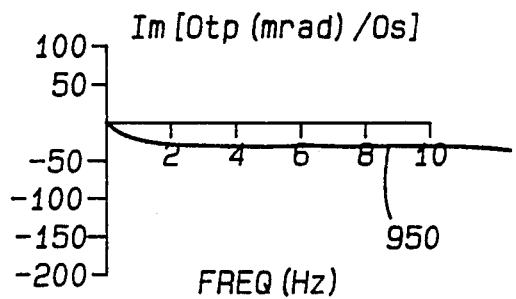
Figure 37G:
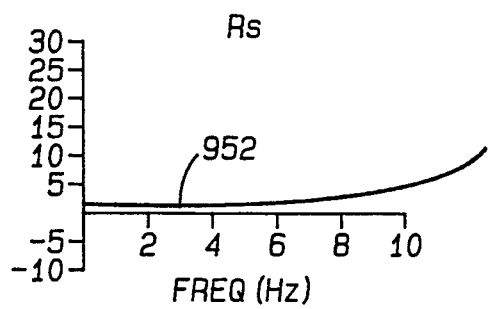
Figure 37H:
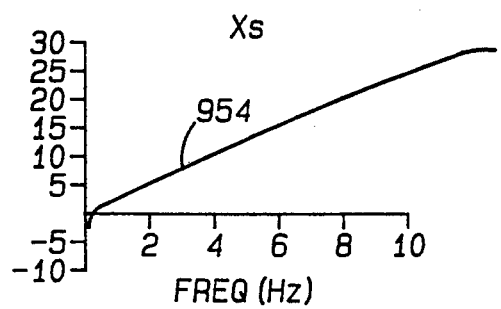

Curve 944 in FIG. 37C depicts Re[q$_{tp}$ Q9/T$_s$) while curve 946 in FIG. 37D depicts Im[q$_{tp}$ Q9/T$_s$]. They similarly depict a nominally critically damped resonance at about 0.7(Hz). Curves 948 and 950 depicting Re[q$_{tp}$/q$_s$] and Im[q$_{tp}$/q$_s$s], respectively, in FIGS. 37E and 37F, respectively, as well as the curves 904 and 906 depict a reduction in response with respect to frequency. R$_s$ and X$_s$ are plotted in FIGS. 37G and 37H, respectively, as curves 952 and 954, respectively. These curves also comprise a tactile feel that is quite acceptable.

Other preferred embodiments of the present invention will now be described with reference to FIGS. 38–47.

Shown in FIG. 38 is a longitudinal section view (whose top and bottom halves are taken along selected sections as described below) of a variable ratio reaction valve 1 000 which is both functionally and physically related to the torque reaction valve 816 shown in FIG. 29. All parts thereof not specifically described below are both functionally and physically similar to with corresponding parts of the torque reaction valve 816. Differences therebetween comprise the following:

A torsion bar 1002 having feedback torsion bar and torsion bar portions 1002a and 1002b, respectively, is functionally similar to the torsion bar 817. However, it has been found that rotational indexing (during assembly) of the feedback torsion bar 1002a with respect to a pinion shaft 1004 and the torsion bar 1002b with respect to an input shaft 1006, respectively, can most easily be accomplished if the ends of the torsion bar 1002 protrudes from the pinion shaft 1004 and the input shaft 1006, respectively, during the indexing operation. Holes are drilled near either end and pins 1008a and 1008b, respectively, are pressed therein. Then the ends of the torsion bar 1002 are cut off to a flush condition as indicated at 1010a and 1001b, respectively. Hydraulic fluid leakage is precluded in a known manner at each end by O-ring seals 1012a and 1012b, respectively, and bushings 1014a and 1014b, respectively.

This method of assembly has an added advantage. It results in added length between either of the pins 1008a and 1008b and a drive pin 1016 which is utilized to apply a selected portion of the input torque to an inner valve member 1018. All three pins are assembled in a substantially co-planer manner, as shown in FIG. 38. Thus, the torsion bar 1002 can be regarded as a beam with pinned ends in its orthogonal direction. Reduced diameter sections 1020a and 1020b (which determine torsional spring constants of the feedback torsion bar 1002a and the torsion bar 1002b, respectively) are positioned closest to the drive pin 1016. This results in the torsion bar 1002 having maximum lateral compliance. Any lateral misalignment therebetween results in minimal transverse loading of the inner valve member 1018 on an external circumferential rib 1022 formed on the input shaft 1006 and utilized as a bearing surface. A representative spring rate at the drive pin 1016 is 500(lbs./in.). Thus, lateral misalignment in the order of 0.002(in.) results in a bearing loading of perhaps 1 (lb.), (No lateral misalignment occurs in the other direction because the drive pin is sized to be a slip fit in a center hole 1024 of the torsion bar 1002.)

An outer valve member 1026 and a hole 1029 formed therein are positioned in line with a cylindrical cavity 1027 formed in and a pin 1030 and protruding into, respectively, a valve sleeve 1028. Then the outer valve member 1026 is pressed into the cavity 1027. The valve sleeve 1026 is supported by two external circumferential ribs 1032 which are formed on the input shaft 1006 and utilized as bearing surfaces for relative rotation therebetween. Increased axial separation (with respect to an equivalent assembly of the torque reaction valve 816) between the two external circumferential ribs 1032 results by positioning an input slip ring 1034 outboard of output slip rings 1036. Fluid is then conducted from and/or to output slots 1038 via axially and radially formed holes 1040a and 1040b, respectively. As in the torque reaction valve 816, pressurized fluid flows into input slots 1042 via radially formed holes 1044 while return fluid flows from return slots 1046 via holes 1048 formed in a barrier ring 1049. As before, the barrier ring 1049 is retained by a beveled retaining ring 1050.

Figure 39:
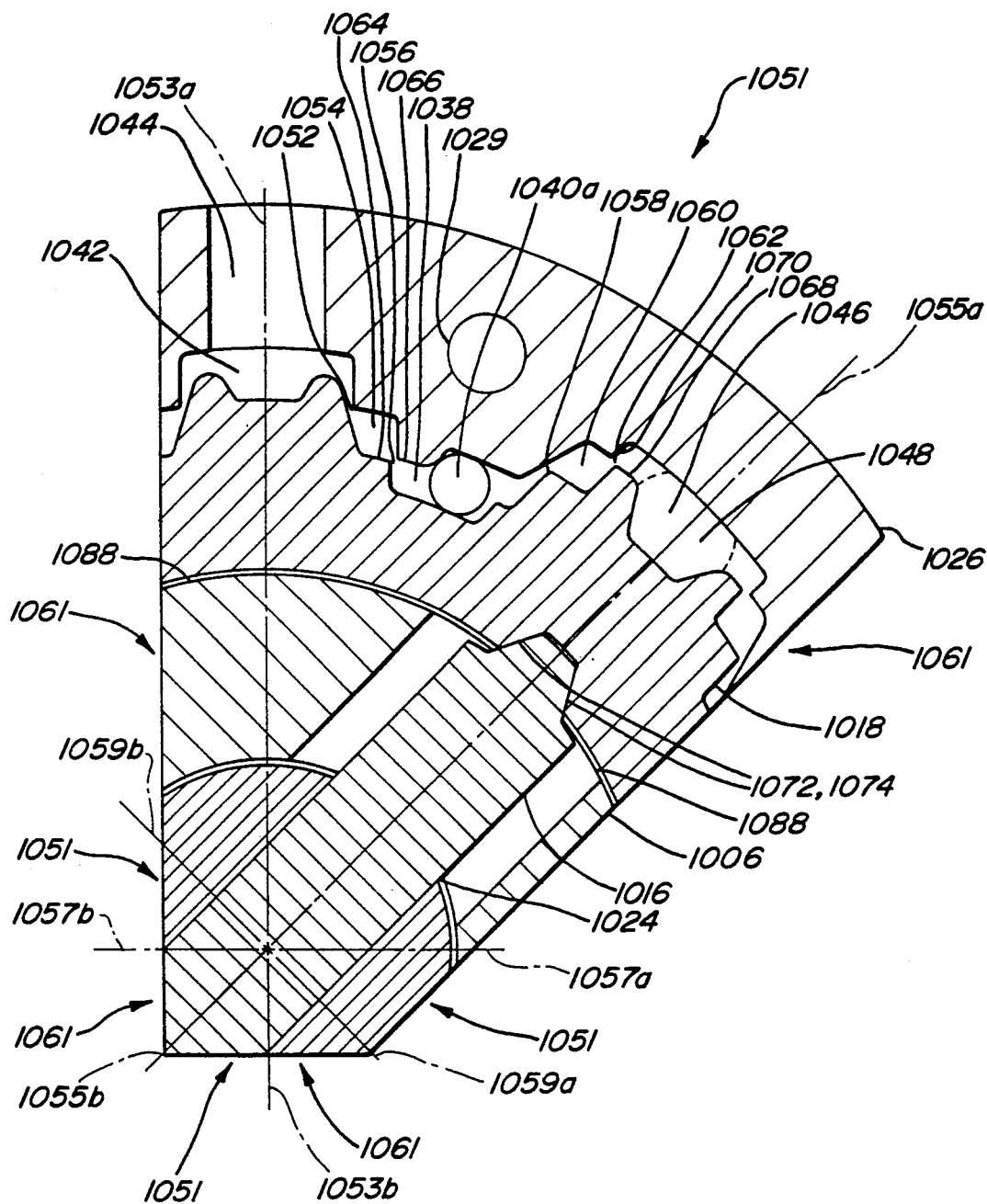
FIG. 39 is an enlarged section view of a segment of inner and outer valve members of the variable ratio reaction valve of FIG. 38 wherein the inner valve member is located in a centered position concomitant with a zero value of input torque.

However, the fundamental difference between the variable ratio reaction valve 1000 and the torque reaction valve 816 concerns reconfigured fluid flow channels in the hydraulic interface between the inner and outer valve members 1018 and 1026, respectively. The reconfigured fluid flow channels are shown in considerable detail in FIG. 39. Shown in FIG. 39 is an enlarged section depicting a generally pie shaped segment 1051 of the inner and outer valve members 1018 and 1026, respectively. In FIG. 39 the inner valve member 1018 is depicted in a centered position with respect to the outer valve member 1026 as would generally be consistent with a zero value of input torque. Also shown are portions of the torsion bar 1002, the input shaft 1006 and the drive pin 1016.

Pressurized fluid flows through the hole 1044 to the input slot 1042 and through a secondary input orifice 1052 to an intermediate input chamber 1054. The fluid next flows through a primary input orifice 1056 to the output slot 1038—from or to whence some of the fluid may flow through the axially formed hole 1040a. The remaining fluid then flows through a secondary return orifice 1058 to an intermediate return chamber 1060. Finally, the remaining fluid flows through a primary return orifice 1062 to the return slot 1046 and out the hole 1048 (which is shown in phantom because it is actually formed in the barrier ring 1049 which is out of the plane of the page).

Thus, incoming fluid is subject to additive pressure drops resulting from a series arrangement of the secondary and primary input orifices 1052 and 1056, respectively, and returning fluid is subject to additive pressure drops resulting from a series arrangement of the secondary and primary return orifices 1058 and 1062, respectively. The effective area corresponding to the primary input and return orifices 1056 and 1062, respectively, is nominally similar to the effective valve area of the torque reaction valve 816. On the other hand, the effective area corresponding to the secondary input and return orifices 1052 and 1058, respectively, is perhaps an order of magnitude smaller.

The secondary input and return orifices 1052 and 1058, respectively, are formed in substantially the same manner as the gaps 304 and 306 in FIG. 2B, and 324 and 326 in FIG. 2C, respectively, and function in substantially the same manner. The primary input and return orifices 156 and 162 are formed similarly to the input control orifices 220 and 222, and return control orifices 232 and 234, respectively. However, the primary input and return orifices 156 and 162 are formed with significant radial clearance between surfaces 1064 and 1066, and 1068 and 1070, respectively. Thus, they progressively cease to function as control orifices concomitant with their closure as will be described in more detail below with reference to FIGS. 40A, 40B, 41A and 41B.

The segment 1051 is depicted as a 45(deg.) segment bounded by lines 1053a and 1055a. The segment 1051 is one of four substantially identical segments 1051 located at 90(deg.). The additional three segments 1051 are bounded, in clockwise order, by lines 1057a and 1059a, 1053b and 1055b, and 1057b and 1059b. Their combined outputs are hydraulically coupled together via one of the output slip rings 1036. In addition, there are four 45(deg.) segments 1061 which are mirror image segments to the four segments 1051 and are bounded, in clockwise order, by lines 1055a and 1057a, 1059a and 1053b, 1055b and 1057b, and 1059b and 1053a. Their combined outputs are hydraulically coupled together via the other one of the output slip rings 1036. Because the four segments 1061 are mirror image segments to the four segments 1051, their combined output is counter to the combined output of the four segments 1051 (i.e., when the output slots 1038 of the four segments 1051 are more nearly coupled to the input slots 1042, the corresponding output slots (not shown) of the four segments 1061 are more nearly coupled to the return slots 1046, etc.).

The drive pin 1016 and the inner valve member 1018 comprise a tooth 1072 and a space 1074, respectively, on each end and proximate to each end, respectively, of the drive pin 1016 which conform generally to a single tooth and space, respectively, as listed in the specification for an American Standard Involute Spline. Thus, the combined lines 1055a-1055b and 1059a-1059b comprise mirror image planes of all of the parts illustrated in FIG. 39 (except for the hole 1029) while the combined lines 1053a-1053b and 1057a-1057b comprise mirror image planes of the hydraulic interface between the inner and outer valve members 1018 and 1026, respectively.

Figure 40A:
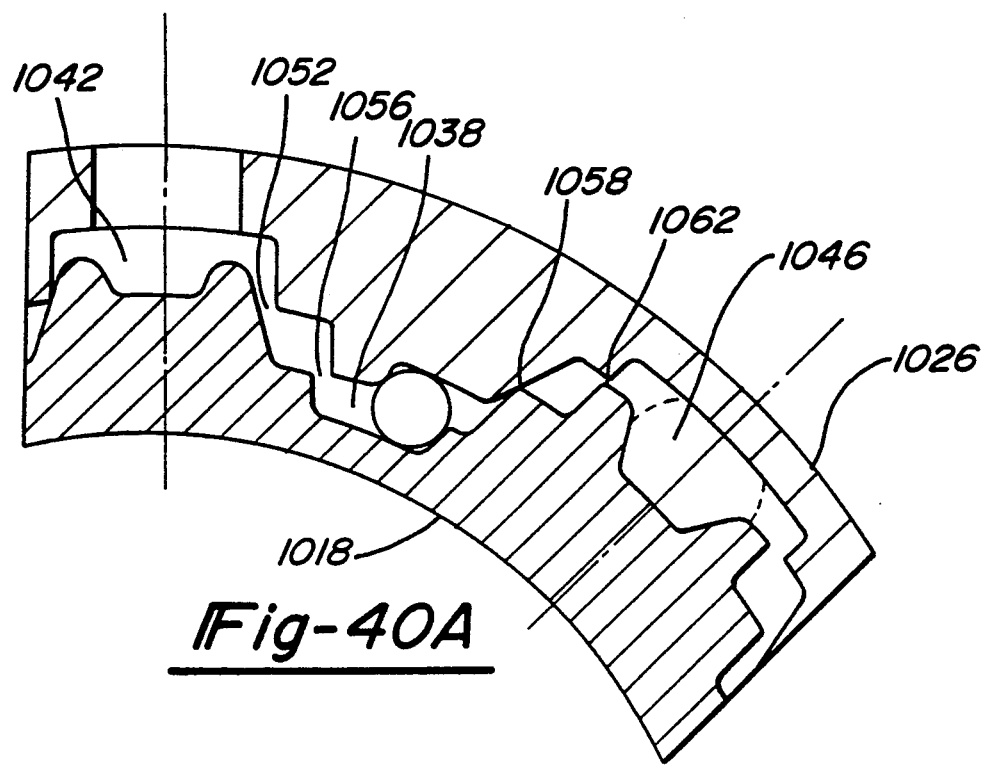
FIGS. 40A and 40B are similarly enlarged section views of portions of the inner and outer valve members depicted in relative positions concomitant with high values of counterclockwise and clockwise input torques, respectively.
Figure 40B:
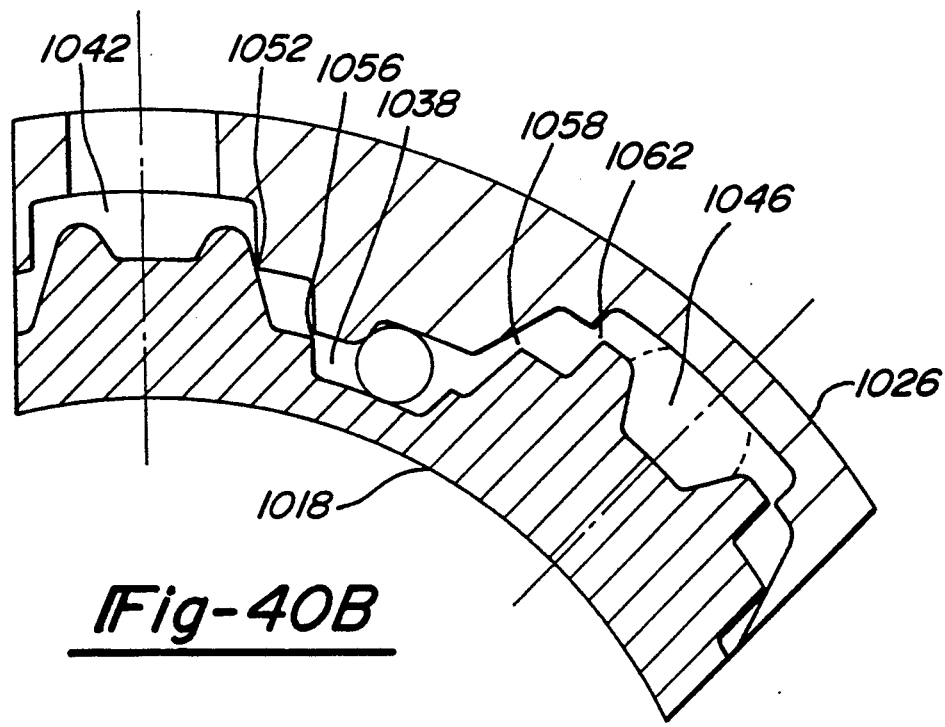

This is illustrated in a clearer manner in FIGS. 40A and 40B which depict the output slots 1038 of the four segments 1051 more nearly coupled to the input slots 1042 in FIG. 40A and to the return slots 1046 in FIG. 40B. The mirror image nature of the hydraulic interface between the inner and outer valve members 1018 and 1026, respectively, as described above can be clearly seen. In addition, FIG. 40A depicts the radial clearance present at the primary return orifice 1062 when the secondary return orifice 1058 closes and FIG. 40B depicts the radial clearance at the primary input orifice 1056 when the secondary input orifice 1052 closes.

Figure 41A:
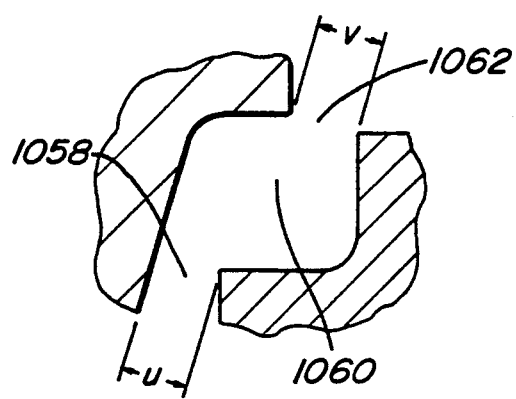
FIGS. 41A and 41B are descriptive section views depicting positions of primary and secondary return control orifices of a variable ratio reaction valve concomitant with a zero value and a large value of input torque, respectively.
Figure 41B:
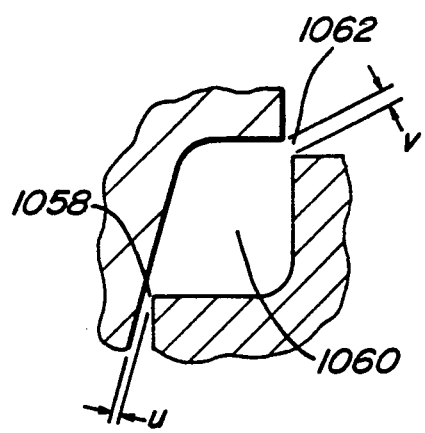

This can be seen more clearly in FIGS. 41A and 41B where the primary return orifice 1062 and the secondary return orifice 1058 are shown in even greater magnification in centered and nearly closed positions, respectively. It can be seen that their respective opening dimensions v and u, respectively, are substantially the same in FIG. 41A while the dimension v is much larger than the dimension u in FIG. 41 B. Because pressure drop at each orifice is nominally proportional to its area squared, the pressure drop at the secondary orifice 1058 (i.e., indicated by the smaller dimension "u") becomes progressively dominant as valve closure occurs. Therefore, because the radial distance between the secondary orifices 1052 and 1058 is much smaller than the radial distance between the primary orifices 1056 and 1062, the effective reaction area of the variable reaction valve 1000 also becomes progressively smaller as valve closure occurs.

Thus, modifying the static response characteristic of a reaction valve such that its gain decreases as a function of output pressure can be accomplished via the method of utilizing multiple orifices with differing closure characteristics and placing them hydraulically in series therein. The multiple orifices utilized in implementing this method comprise sets of orifices which control pressures present in reaction zones having differing effective areas. And, the closure characteristic of the set, or sets, of orifices which control pressures in the reaction zones having the largest effective areas comprises an incomplete closure characteristic relative to the closure characteristic of the set, or sets, of orifices which control pressures in the reaction zones having smaller effective areas.

One method of forming the inner and outer members 1018 and 1026, respectively, is by a metal removal process known as broaching. Broaching involves progressively cutting a desired contour in a part via sequential removal of material with a progression of culling teeth on a longitudinal tooling member known as a broach. Generally this can be thought of as a progressive process whereby the part in question progressively approximates its final appearance as the cutting teeth pass by, or through the part. However, because it is desirable to form various adjacent surfaces where between corners which define the primary and secondary orifices 1056 and 1062, and 1052 and 1058, respectively, such that these corners are nominally sharp corners, broaching of these two parts should be thought of as two distinct operations.

Figure 42:
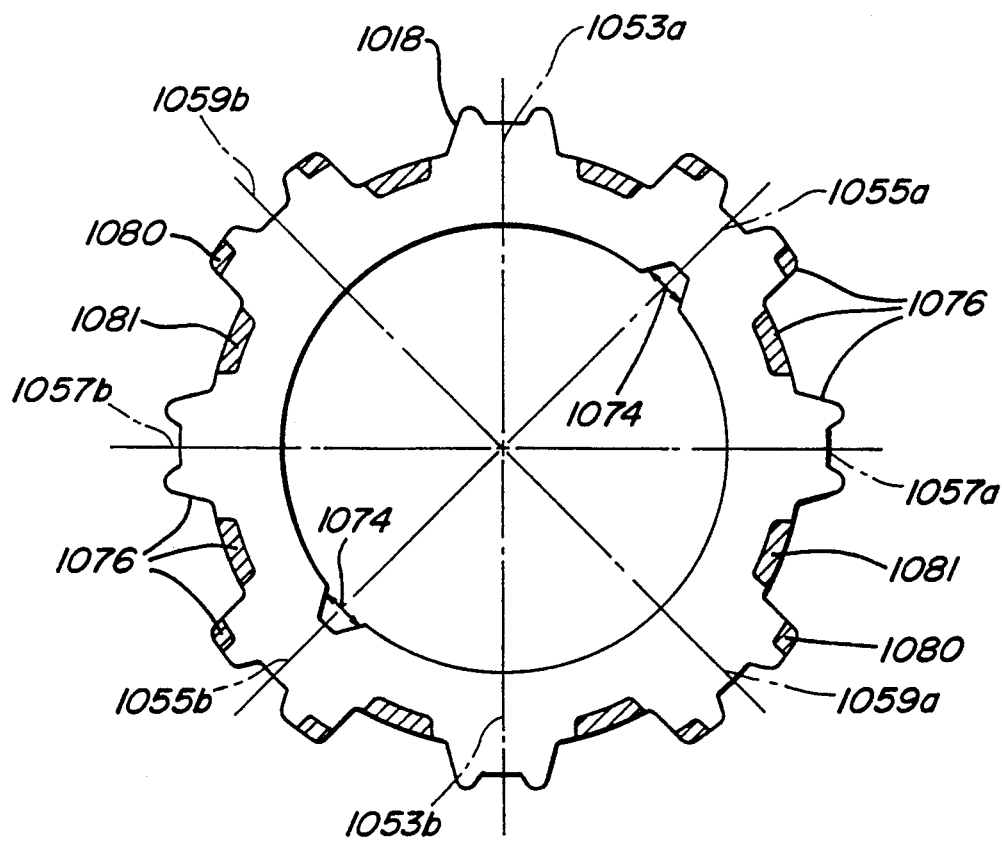
FIG. 42 is an enlarged end view of the inner valve member of the variable ratio reaction valve.
Figure 43:
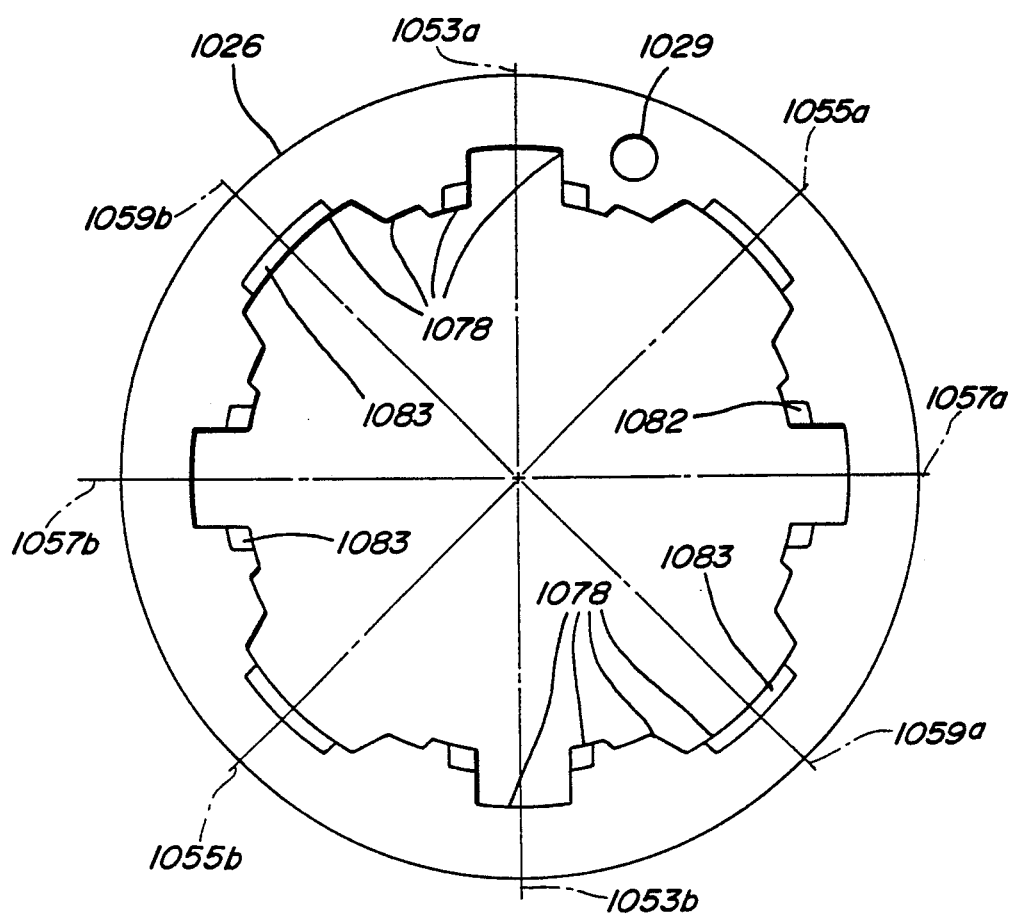
FIG. 43 is an enlarged and view of the outer valve member of the variable ratio reaction valve.

This is illustrated by FIGS. 42 and 43 which depict first and second broaching operations utilized in forming the hydraulic interface surfaces on the inner valve member 1018 and the outer valve member 1026, respectively. The first broaching operation serves to configure the inner valve member in an intermediate manner as indicated by the outer line 1076 in FIG. 42 and the inner line 1078 in FIG. 43. The second broaching operation serves to reconfigure the inner and outer valve members 1018 and 1026 in final form by removing the material indicated by cross-hatched areas 1080 and 1081, and 1082 and 1083 in FIGS. 42 and 43, respectively. The spline spaces 1074 and the hole 1029 can be utilized for indexing the inner and outer valve members 1018 and 1026, respectively, during the first and second broaching operations. Alternately, either of the parts can be formed by first and second broaching operations performed concomitantly by two sequential sets of cutting teeth on a single broach.

In operation, the input shaft 1006, the inner valve member 1018 and an assembly comprising the outer valve member 1026, the valve sleeve 1028 and the barrier ring 1049 must be free to rotate relative to one another. As described above, the circumferential rib 1022 and ribs 1032 support the inner valve member 1018 and the valve sleeve 1028, respectively, for rotation with respect to the input shaft 1006. The inner valve member 1018 is guided axially and in pitch and yaw within the outer valve member 1026 by a shoulder 1084, formed as a defining wall of the cavity 1027 of the valve sleeve 1028, and the barrier ring 1049. The axial spacing between the shoulder 1084 and the barrier ring 1049 is determined by the axial length of the outer valve member 1026. Thus, the axial clearance between the inner valve member 1018 and either of the shoulder 1084 and the barrier ring 1049 is nominally one-half of the difference between the axial thicknesses of the outer valve member 1026 and the inner valve member 1018.

In order to maintain rotational freedom for the inner valve member, it is desirable to avoid the condition known as "hydraulic lock" described hereinabove. Hydraulic lock is discussed in considerable depth in a section 5-7 entitled LATERAL FORCES ON SPOOL VALVES of the book entitled HYDRAULIC CONTROL SYSTEMS for the case of spool valves. One passage therein reads as follows:

"If the higher pressure is at the small end of the piston the lateral force acts to center the piston. If there is a distinct high pressure side on the piston, an intentional taper to that side could be used to obtain a centering force to prevent hydraulic lock. However, this is not practical, especially on spool valves, because the taper direction would be different on the various valve lands, making manufacture most difficult."

However, contrary to the above statement, the inner valve member 1018 has a "distinct pressure side" in the form of the outer periphery thereof. Thus, in one preferred embodiment, a generally convex conical or spherical "taper" formed on each side of the inner valve member 1018 can be used to obtain an equivalent centering force to the one called for above. In fact, the resulting inwardly radial flow passages comprise opposing hydrostatic bearings. This is depicted descriptively in FIG. 44A by inward radial flow passages 1085a and 1085b (whose curvature is greatly distorted to illustrate the concept). One method of forming spherically convex surfaces on the inner valve member 1018 is by lapping them to a very large radius. Such technology is readily available within the optics industry and is easily adaptable for this purpose. Typical dimensions comprise an overall axial clearance dimension between the inner valve member 1018 and the space between the shoulder 1084 and the barrier ring 1049 of perhaps 0.0003(in.) and spherical surface radii of perhaps 30 inches.

Figures 44A, 44B, 45:
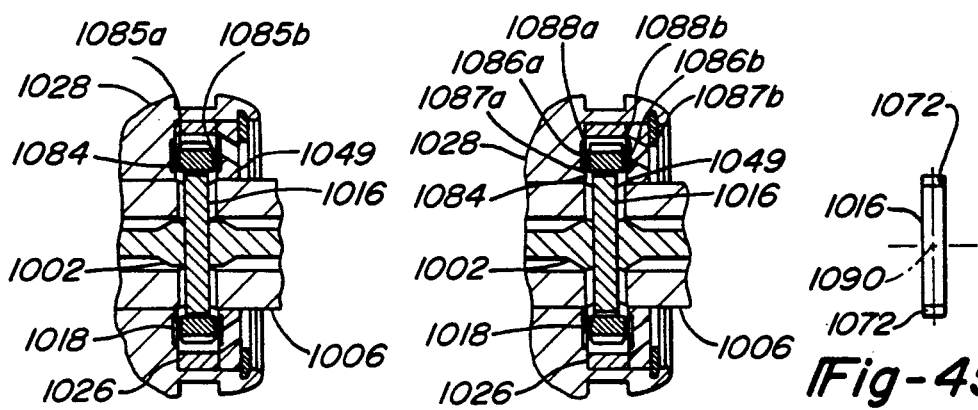
FIGS. 44A and 44B are descriptive side views of assemblies comprising the inner valve member which illustrate supporting hydrostatic bearings formed by convex lapped surfaces formed thereon and stepped surfaces formed on juxtaposed surfaces, respectively.
FIG. 45 is a side view of a drive pin used to transmit input torque to the inner valve member which illustrates a crowned tooth profile used thereon.

In another preferred embodiment, alternate hydrostatic bearing flow passages 1086a and 1086b can be formed via stepped surfaces 1087a and 1087b, respectively, which are formed on the shoulder 1084 and the barrier ring 1049, respectively, as depicted in FIG. 44B. In this case it is also convenient to fabricate both the inner and outer valve members 1018 and 1026, respectively, at precisely the same thickness (i.e., as with parallel laps). Overall axial clearance is provided by additional spacing shoulders 1088a and 1088b formed on the shoulder 1084 and the barrier ring 1049, respectively. Typical dimensions comprise the above noted overall axial clearance of 0.0003(in.) combined with stepped surface heights of 0.0001 (in.).

It is important not to over-constrain the inner valve member via constricting an interface with the circumferential rib 1022. Thus, the circumferential rib 1022 is narrower than the inner valve member 1018 (forming it as an equatorial segment of a sphere would even be better. The requirement for such non-constraint is indicated by a radial gap 1088 between the input shaft 1006 and the inner valve member 1018 in FIG. 39.)

In addition, it is also important not to drive the inner valve member 1018 asymmetrically by the drive pin 1016 via the mechanical interface comprising the teeth 1072 and the spaces 1074. This possibility can be precluded by forming the teeth 1072 in a crowned manner as shown in FIG. 45. One method of so fabricating the teeth 1072 is to rotate the drive pin 1016 about axis 1090 (i.e., an axis in and out of the plane of the page) in a cylindrical grinder and plunge grind the contours comprised in the teeth 1072.

Detailed analysis and plotting of the functions utilized hereinbefore is performed generally as shown above. However, slight changes in the programs are required to accommodate the new primary and secondary orifices. A revised first program utilized for typical plots of steering force as functions of applied torque, tangential valve motion and input shaft rotation is as follows:

```
kt = 1080.0;
kf = 1080.0;
lve = 1.0;
rv1 = 0.585;
av1 = 0.1;
rv2 = 0.585;
av2 = 0.005;
xo1 = 0.008;
xo2 = xo1 rv2/rv1;
xv1[xv_]:= xv;
xv2[xv_]:= xv1[xv] rv2/rv1;
gap = 0.002;
qs = 6;
lp = 0.0001;
r = 100;
tv1[xv_]:=rv1 av1 qs∧2/(90000 lve∧2 ((xo1 − xv1[xv])∧2 + gap∧2));
tv2[xv_]:= rv2 av2 qs∧2/(90000 lve∧2 (xo2 − xv2[xv])∧2);
tv[xv_]:= tv1[xv] + tv2[xv];
ts[xv_]:= tv[xv] + kf xv1[xv]/rv1;
```

-continued

```
kv1[xv_]: = rv1 av1 qs∧2 (xo1 − xv1[xv])/(45000 lve∧2 ((xo1 −
  xv1[xv])∧2 +
  gap∧2));
kv2[xv_]:= rv2 av2 qs∧2/(45000 lve∧2 (xo2 − xv2[xv])∧3);
kv[xv]:= kv1[xv] + kv2[xv];
k2[xv_]:= kt kv[xv]/(kt (kv[xv] + kf));
np = 0.333333;
fm[xv_]:= ts[xv]/np;
a = 1.0;
fp[xv_]:= tv1[xv] a/(rv1 av1 (1 + rlp)) + tv2[xv] a/(rv2 av2 (1 +
  rlp));
ft[xv_]:= fm[xv] + fp[xv];
thetae[xv_]:= ts[xv]/kt;
thetav[xv_]:= xv1[xv]/rv1;
thetas[xv_]:= thetae[xv] + thetav[xv];
``` where "gap" is the radial clearance present at both the primary input and return orifices 1056 and 1062, respectively, when they are closed. (Note, if it was desired to have different "gaps" for the primary input and return orifices 1056 and 1062, respectively—or a modified hydraulic interface between the inner valve member 1018 and the outer valve member 1026 such that the "gaps" varied as a function of relative position of the inner valve member 1018—further program modification of both the first and second programs would be necessary. i.e., see further discussion below for a description of modifications which can be utilized to achieve such variable "gaps".)

Figure 46A:
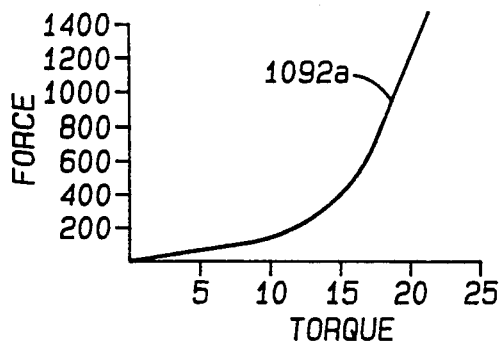
FIGS. 46A-C are plots depicting steering force as a function of applied torque, tangential valve motion and input shaft rotation, respectively, for a variable ratio reaction valve.
Figure 46B:
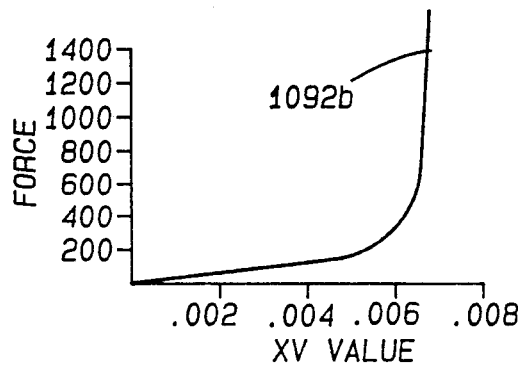
Figure 46C:
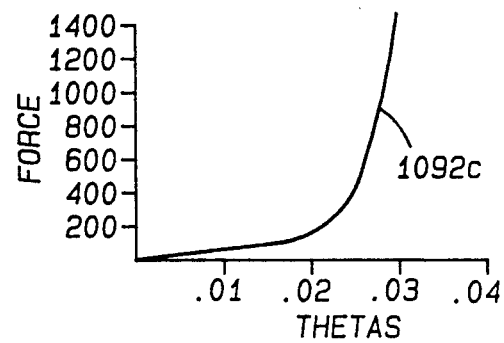

Shown in FIGS. 46A-C are curves 1092a-c, respectively which depict the output force $F_t$ as a function of $T_S$, $X_v$ and $\theta_s$, respectively, via utilization of the above values for one example of the variable ratio reaction valve 1000. A revised second program utilized for typical plots of system performance is as follows:

```
xv = 0.0065;
js = 0.32;
bs = 0.0;
ksc = 3200.0;
kt = 1080.0;
kf = 1080.0;
lve = 1.0;
rv1 = 0.585;
av1 = 0.1;
rv2 = 0.585;
av2 = 0.005;
xo1 = 0.008;
xo2 = xo1 rv2/rv1;
xv1 = xv;
xv2 = xv rv2/rv1;
gap = 0.002;
qs = 6;
lp = 0.0001;
r = 100;
pv1 = qs∧2/(90000 lve∧2 ((xo1 − xv1)∧2 + gap∧2));
pv2 = qs∧2/(90000 lve∧2 (xo2 − xv2)∧2);
tv1 = rv1 av1 pv1;
tv2 = rv2 av2 pv2;
tv = tv1 + tv2;
ts = tv + kf xv1/rv1;
tf = ts − tv;
kv1 = rv1 av1 qs∧2 (xo1 − xv1)/(45000 lve∧2 ((xo1 − xv1)∧2 +
  gap∧2));
kv2 = rv2 av2 qs∧2/(45000 lve∧2 (xo2 − xv2)∧3);
kv = kv1 + kv2;
k1 = kt (kv + kf)/(kt + kv + kf);
k4 = ksc/(ksc + k1)
k2 = kt kv/(kt (kv + kf));
np = 0.333333;
fm = ts/np;
a = 1.0;
fp = tv1 a/(rv1 av1 (1 + rlp)) + tv2 a/(rv2 av2 (1 + rlp));
ft = fm + fp;
xp = −Log[1 − ft/400]/1.5;
```

-continued

```
ktp = 15000.0 E (−1.5 xp);
btp = 250 + 500 xp + 87.5 xp 2;
ksw = 25000.0;
bsw = 100.0;
jw = 6.25;
rw = 5.0;
kr = 4000.0;
mp = 0.025;
bp = 2.0;
q1[s_]:= bsw s + ksw;
q2[s_]:= (btp + bsw) s + ktp + ksw;
q3[s_]: = jw s∧2 + q1[s] − q1[s]∧2/q2[s] + kr rw∧2;
q4[s_]: = mp s∧2 + bp s + kr;
tau = 0.005;
kc = 0.000025;
pi = N[Pi, 10];
q5[s_]:= tau s + 1;
q8[s_]: = js s∧2 + bs s + k1 k4;
q9[s_]: = js s∧2 + bs s;
q10[s_]:= 1 + r (kc s + lp);
go[s_]:= Block[{myq3,myq4,myq5,myq10},
    myq3 = q3[s];
    myq4 = q4[s];
    myq5 = q5[s];
    myq10 = q10[s];
    N[k4 (k1/np + k1 k2 (pv1 + pv2) a/ (myq5 myq10 tv))/
      (myq4 − (kr rw)∧2myq3 + r a∧2 s/myq10),
      10]];
ho = N[1/np , 10];
g[s_]:= Block[{myq3,myq4,myq5,myq8,myq10},
    myq3 = q3[s];
    myq4 = q4[s];
    myq5 = q5[s];
    myq8 = q8[s];
    myq10 = q10[s];
    N[k4 (k1/np + k1 k2 (pv1 + pv2) a/ (myq5 myq10 tv))/
      (myq8 (myq4 − (kr rw)∧2myq3 + r a∧2 s/myq10)), 10]];
h[s_]:= N[q9[s]/np , 10];
```

Shown in FIGS. 47A-H are plots depicting Log[Abs[GH]], Log[Abs[GH]] as a function of Arg[GH], Re[$\theta_{tp}$ Q9/$T_s$], Im[$\theta_{tp}$Q9/$T_s$], Re[$\theta_{tp}$/$\theta_s$], Im[$\theta_{tp}$/$\theta_s$], $R_s$ and $X_s$, respectively, for a power steering system which uses the variable ratio reaction valve 1000 at a steering load of approximately 290(lbs.). As before, these curves depict a tactile feel that is quite acceptable.

It is possible to modify the closure characteristic of either, or both, of the primary input and return orifices 1056 and 1062 and thus modify the static response characteristic of a modified variable ratio reaction valve 1000a, and still be within the scope of the present invention. For instance, if the closure characteristics of either, or both, of the primary input and return orifices 1056 and 1062 are modified to form modified primary input and return orifices 1056a and 1062a, respectively, so that closure thereof occurs at a slower rate than that of the secondary input and return orifices 1052 and 1058, respectively, then dominant pressure control smoothly inverts from the primary sets of control orifices to the secondary sets of control orifices, (i.e., at the centered position the dimension v is smaller than dimension u, but finally the dimension u becomes smaller than the dimension v as the valve closes.) Thus, the affective reaction area will be larger whenever such a version of the variable ratio reaction valve is substantially open and an even wider range of output pressure to input torque gain is enabled.

Figure 48A:
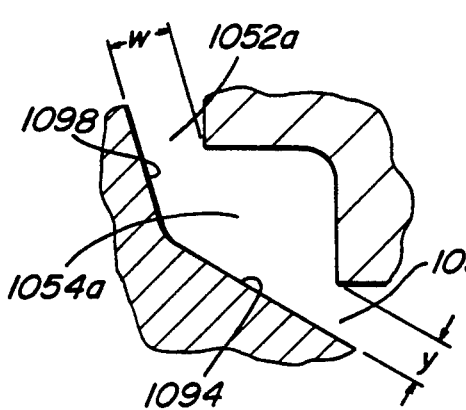
FIGS. 48A-B are descriptive section views depicting positions of primary and secondary input control orifices of a modified variable ratio reaction valve concomitant with a zero value and a large value of input torque, respectively.
Figure 48B:
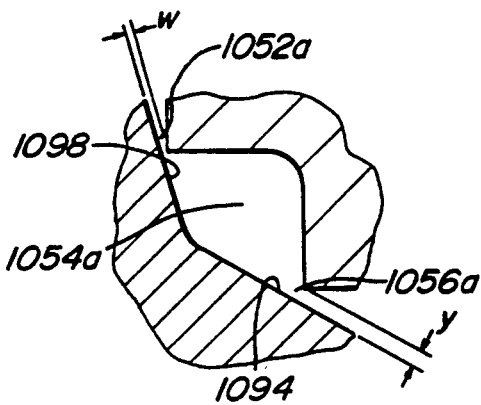
Figure 49A:
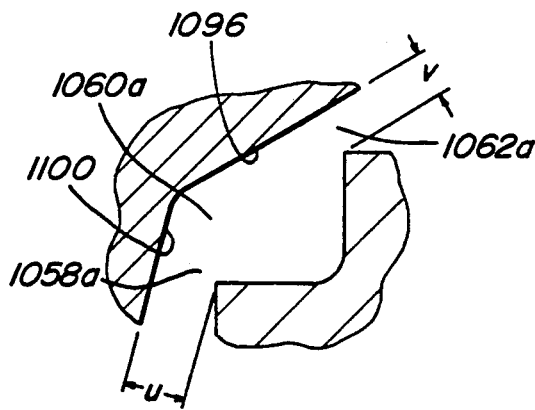
FIGS. 49A-B are descriptive section views depicting positions of primary and secondary return control orifices of a variable ratio reaction valve concomitant with a zero value and a large value of input torque, respectively.
Figure 49B:
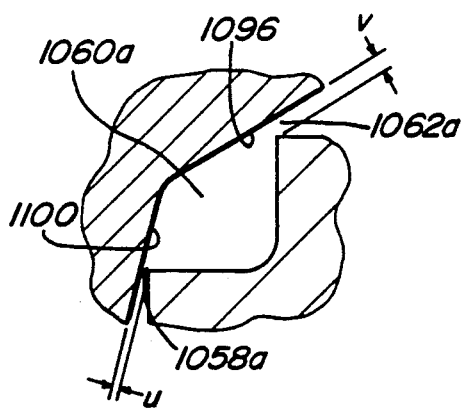

This can be accomplished as depicted in FIGS. 48A-B and 49A-B wherein such modified primary input and return orifices 1056a and 1062a, respectively, are shown in centered and substantially closed positions (i.e., in manner equivalent to the depiction in FIGS. 41A and 41B). In addition to the dimensions u and v which are carried over from FIGS. 41A and 41B, dimensions w and y are used in FIGS. 48A and 48B for the primary and secondary input orifices 1052 and 1056a, respectively. In FIGS. 48A and 49A the dimensions y and v are indeed smaller than the dimensions w and u, respectively, while in FIGS. 48B and 49B the dimensions w and u are smaller than the dimensions y and v, respectively. This is because surfaces 1094 and 1096, which partially define the modified primary input and return orifices 1056a and 1062a, respectively, are now formed at angles $\alpha$ and $\beta$, respectively, with a circumferential direction. If surfaces 1098 and 1100, which partially define the secondary input and return orifices 1052 and 1058, respectively, are formed at angles $\phi$ and $\gamma$, respectively, with a radial direction then the dimensions u, v, w and y can be evaluated by u = ($x_o$ − X) cos$\gamma$,
v = ($x_1$ − x) sin$\beta$,
w = ($x_o$ − x) cos$\phi$ and
y = ($x_1$ − x) sin$\alpha$ where $x_o$ is the tangential distance the modified variable ratio reaction valve 1000a can move from a centered position to completely closed position, $x_1$ is the tangential clearance at either of the modified primary input and return orifices 1056a and 1062a (which is, in general, larger than $x_o$) and x is a tangential distance actually moved by the modified variable ratio reaction valve toward closure thereof.

Figure 50:
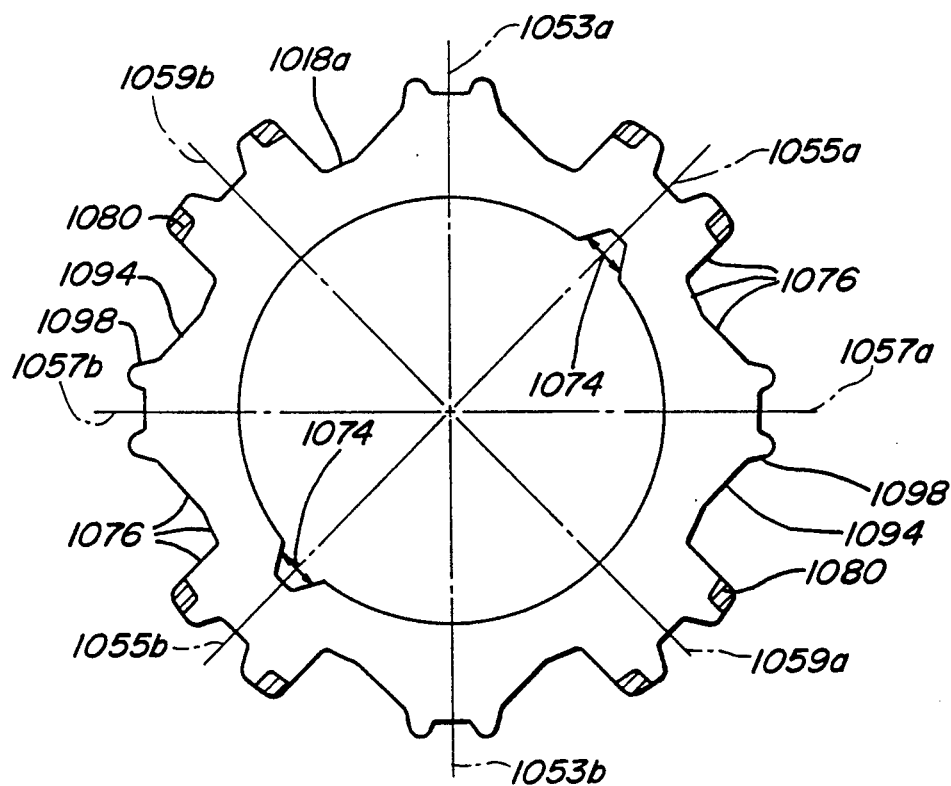
FIG. 50 is an enlarged end view of a modified inner valve member of a modified variable ratio reaction valve.
Figure 51:
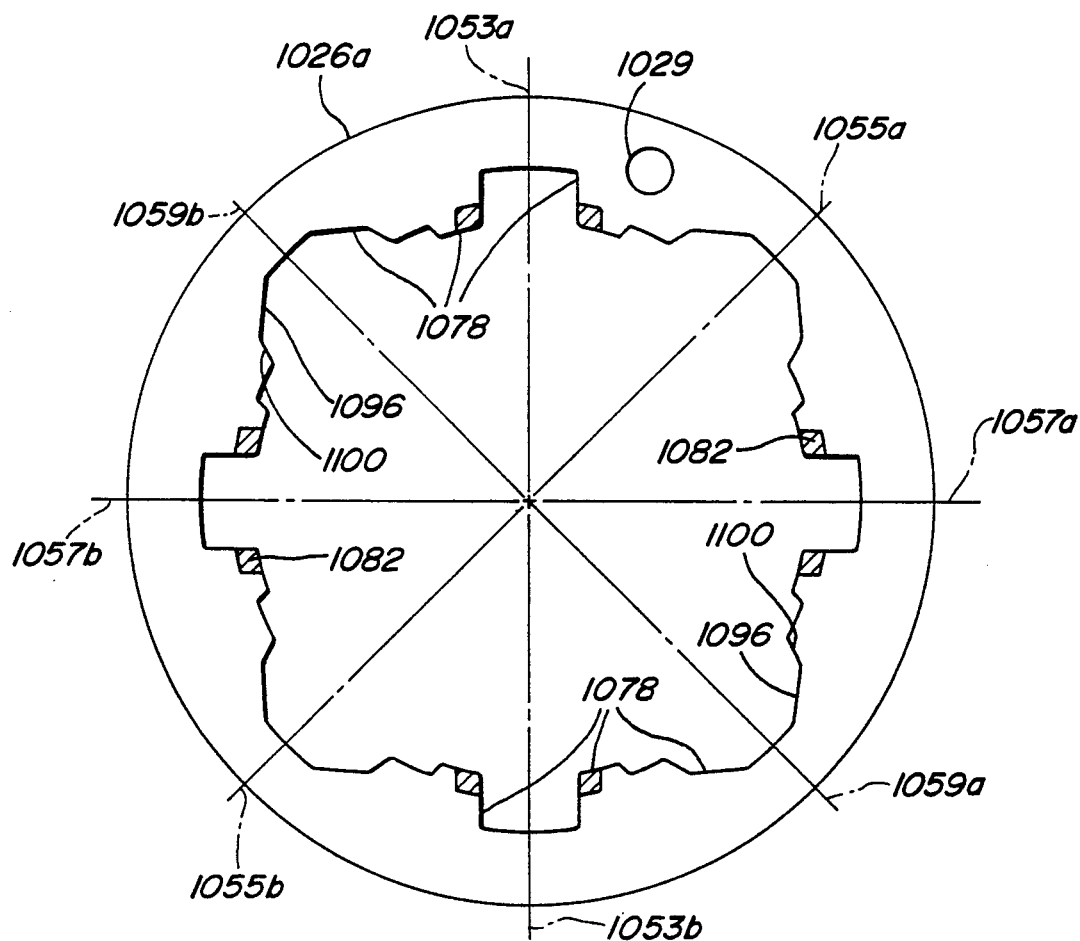
FIG. 51 is an enlarged end view of a modified outer valve member of the modified variable ratio reaction valve.
Figure 53C:
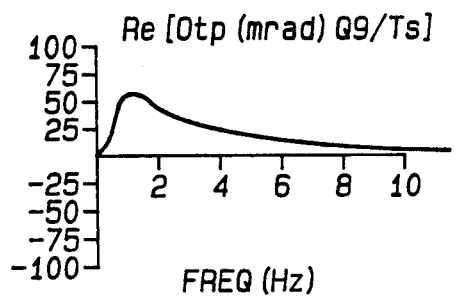
Figure 53D:
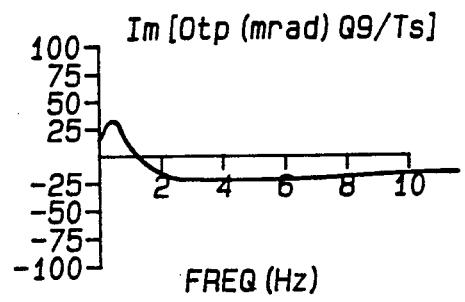
Figure 53E:
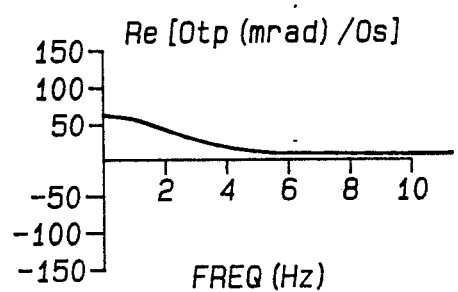
Figure 53F:
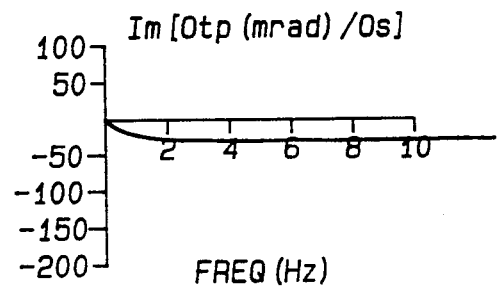
Figure 53G:
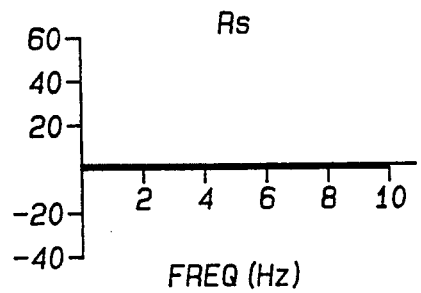
Figure 53H:
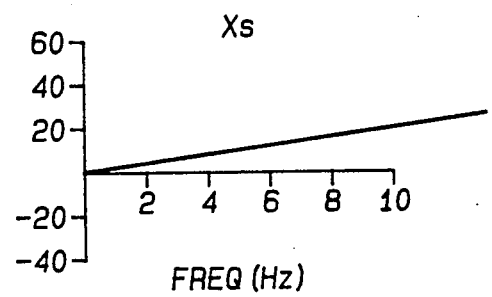

It can be seen that if all of the angles $\alpha$, $\beta$, $\phi$ and $\gamma$ are smaller than 45(deg.) then the above criterion can be satisfied. For instance, if $x_o$=0.009(in.),$x_1$=0.011(in.),$\alpha$=$\beta$=30(deg.) and $\phi$=$\gamma$=15(deg.), the u=w=0.0087(in.) and v=y=0.0055(in.) at x=0.0(in.)—and u=w=0.0010(in.) and v=y=0.0015(in.) at x=0.0080(in.). Thus, the modified hydraulic interface between the inner valve member 1018 and the outer valve member 1026 having "gaps" which vary as a function of relative position of the inner valve member 1018 called for above can indeed be achieved. In addition, the second broaching operation can be simplified to the extent that the cross-hatched areas 1081 and 1083 need not be present and therefore no longer require removal thereby. This is shown in FIGS. 50 and 51 which are enlarged end views of a modified inner valve member 1018a and a modified outer valve member 1026a, respectively, of the modified variable ratio reaction valve 1000a.

Thus, the method of modifying the static response characteristic of a reaction valve such that its gain decreases as a function of output pressure can be extended via altering the nature of the orifice closures as described above. In this case the method comprises smoothly inverting dominant pressure control from primary to secondary sets of control orifices which are in series arrangement, thereby extending the range of effective reaction zone areas even further.

As noted above, further program modification of both the first and second programs is necessary in order to depict the performance of the modified variable ratio reaction valve 1000a. The respective modified first and second programs are as follows:

```
kt = 1080.0;
kf = 360.0;
lve = 1.0;
rv1 = 0.585;
av1 = 0.1;
rv2 = 0.585;
```

-continued

```
av2 = 0.01;
xo1 = 0.009;
xo2 = xo1 rv2/rv1;
x11 = 0.011;
x12 = x11 rv2/rv1;
xv1[xv_]:= xv;
xv2[xv_]:= xv1[xv] rv2/rv1;
beta = 0.524;
gamma = 0.262;
qs = 6;
lp = 0.0001;
r = 100;
gap1 = x11 Sin[beta];
gap2 = (x11 − xo2 + 0.001) Sin[beta];
tv1[xv_]: = rv1 av1 qs∧2/(90000 lve∧2 (x11 − xv1[xv]∧2 Sin[beta]∧2);
tv2[xv_]: = rv2 av2 qs∧2/(90000 lve∧2 (xo2 − xv2[xv]∧2 Cos[gamma]∧2);
tv[xv_]:= tv1[xv] + tv2[xv];
ts[xv_]:= tv[xv] + kf xv1[xv]/rv1;
kv1[xv_]:=rv1 av1 qs∧2/(45000 lve∧2 (xo1 − xv1[xv])∧3 Sin[beta]∧2);
kv2[xv_]: = rv2 av2 qs∧2/(45000 lve∧2 (xo2 − xv2[xv])∧3 Cos[gamma]∧2);
kv[xv_]:= kv1[xv] + kv2[xv];
k2[xv_]:= kt kv[xv]/(kt (kv[xv] + kf));
np = 0.333333;
fm[xv_]:= ts[xv]/np;
a = 1.0;
fp[xv_]:= tv1[xv] a/(rv1 av1 (1 + rlp)) + tv2[xv] a/(rv2 av2 (1 + rlp));
ft[xv_]:= fm[xv] + fp[xv];
thetae[xv_]:= ts[xv]/kt;
thetav[xv_]:= xv1[xv]/rv1;
thetas[xv_]:= thetae[xv] + thetav[xv];
``` and

```
xv = 0.0075;
js = 0.32;
bs = 0.0;
ksc = 3200.0;
kt = 1080.0;
kf = 360.0;
lve = 1.0;
rv1 = 0.585;
av1 = 0.1;
rv2 = 0.585;
av2 = 0.01;
xo1 = 0.009;
xo2 = xo1 rv2/rv1;
x11 = 0.011;
x12 = x11 rv2/rv1;
xv1 = xv;
xv2 = xv rv2/rv1;
beta = 0.524;
gamma = 0.262;
qs = 6;
lp = 0.0001;
r = 100;
gapp = (x11 − xv1) Sin[beta];
gaps = (xo2 − xv2) Cos[gamma];
pv1 = qs∧2/(90000 lve∧2 (x11 − xv1)∧2 Sin[beta]∧2);
pv2 = qs∧2/(90000 lve∧2 (xo2 − xv2)∧2 Cos[gamma]∧2);
tv1 = rv1 av1 pv1;
tv2 = rv2 av2 pv2;
tv = tv1 + tv2;
ts = tv + kf xv1/rv1;
tf = ts − tv;
thetas = ts/kt + xv/rv1;
kv1 = rv1 av1 qs∧2/(45000 lve∧2 (xo1 − xv1)∧3 Sin[beta]∧2);
kv2 = rv2 av2 qs∧2/(45000 lve∧2 (xo2 − xv2)∧3 Cos[gamma]∧2);
kv = kv1 + kv2;
k1 = kt (kv + kf)/(kt + kv + kf);
k4 = ksc/(ksc + k1)
k2 = kt kv/(kt (kv + kf));
np = 0.333333;
fm = ts/np;
a = 1.0;
fp = tv1 a/(rv1 av1 (1 + rlp)) + tv2 a/(rv2 av2 (1 + rlp));
ft = fm + fp;
xp = −Log[1 − ft/400]/1.5;
ktp = 15000.0 E∧(−1.5 xp);
```

-continued

```
btp = 250 + 500 xp + 87.5 xp∧2;
ksw = 25000.0;
bsw = 100.0;
jw = 6.25;
rw = 5.0;
kr = 4000.0;
mp = 0.025;
bp = 2.0;
q1[s_]:= bsw s + ksw;
q2[s_]:= (btp + bsw) s + ktp + ksw;
q3[s_]: = jw s∧2 + q1[s] − q1[s]∧2/q2[s] + kr rw∧2;
q4[s_]: = mp s∧2 + bp s + kr;
tau = 0.005;
kc = 0.000025;
pi = N[Pi, 10];
q5[s_]:= tau s + 1;
q8[s_]: = js s∧2 + bs s + k1 k4;
q9[s_]: = js s∧2 + bs s;
q10[s_]:= 1 + r (kc s + lp);
go[s_]:= Block[{myq3,myq4,myq5,myq10},
    myq3 = q3[s];
    myq4 = q4[s];
    myq5 = q5[s];
    myq10 = q10[s];
    N[k4 (k1/np + k1 k2 (pv1 + pv2) a/(myq5 myq10 tv))/
        (myq4 − (kr rw)∧2/myq3 + r a∧2 s/myq10),
        10]];
ho = N[1/np , 10];
g[s_]:= Block[{myq3,myq4,myq5,myq8,myq10},
    myq3 = q3[s];
    myq4 = q4[s];
    myq5 = q5[s];
    myq8 = q8[s];
    myq10 = q10[s];
    N[k4 (k1/np + k1 k2 (pv1 + pv2) a/(myq5 myq10 tv))/
        (myq8 (myq4 − (kr rw)∧2/myq3 + r a∧2 s/myq10)),
        10]];
h[s_]:= N[q9[s]/np , 10];
```

Figure 52A:
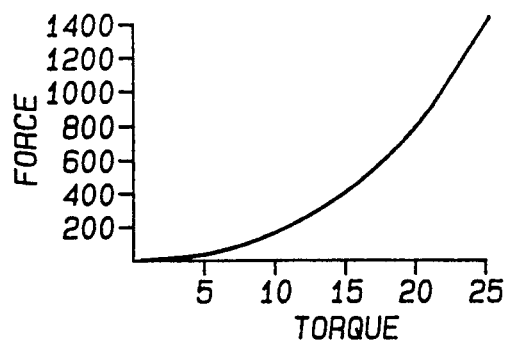
FIGS. 52A-C are plots depicting steering force as a function of applied torque, tangential valve motion and input shaft rotation, respectively, for the modified variable ratio reaction valve.
Figure 52B:
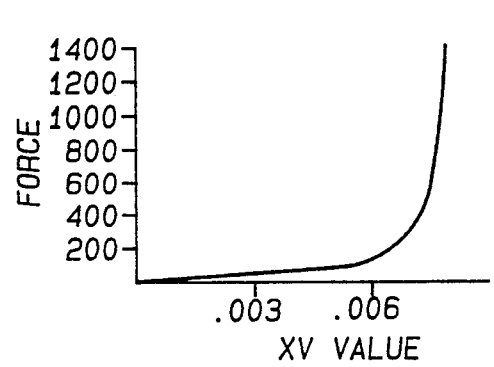
Figure 52C:
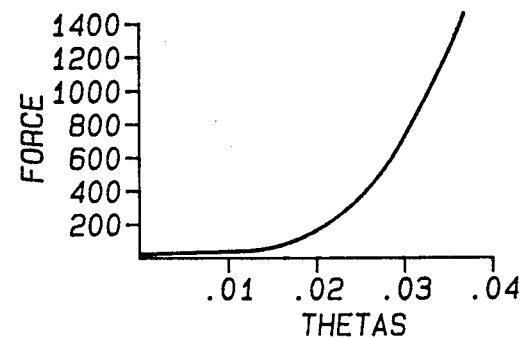
Figure 47A:
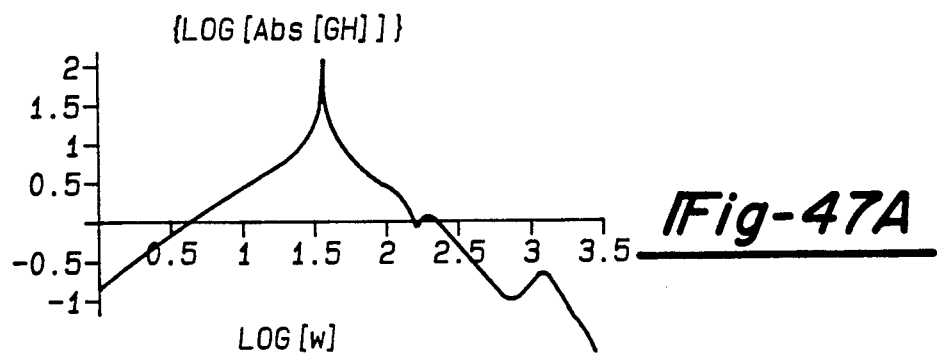
FIGS. 47A-H are plots depicting performance of a power steering system utilizing the variable ratio reaction valve for a high value of steering force.
Figure 47B:
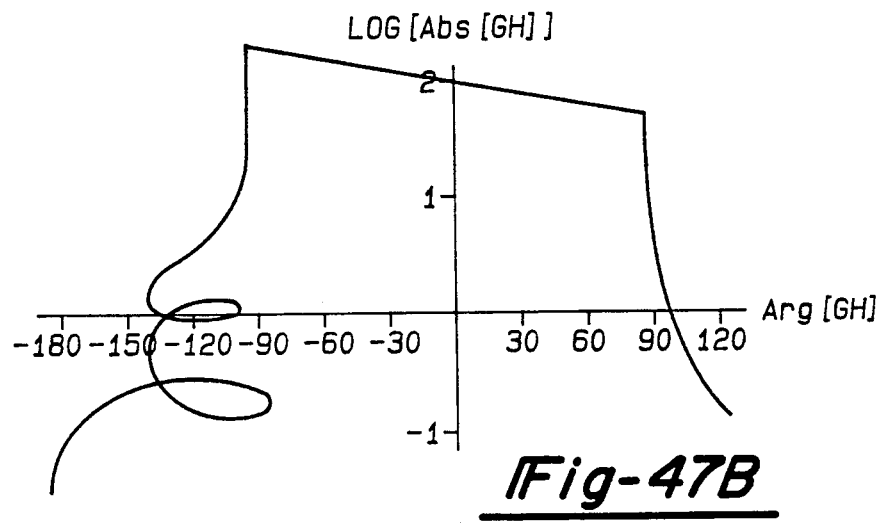
Figure 47C:
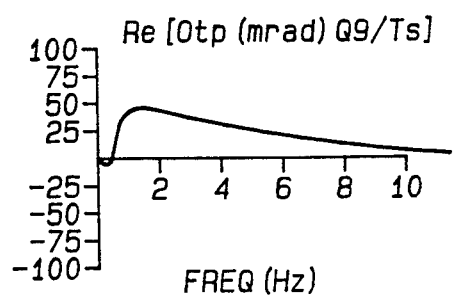
Figure 47D:
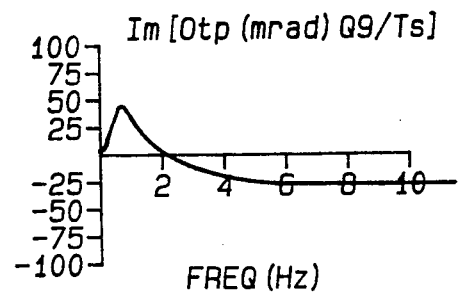
Figure 47E:
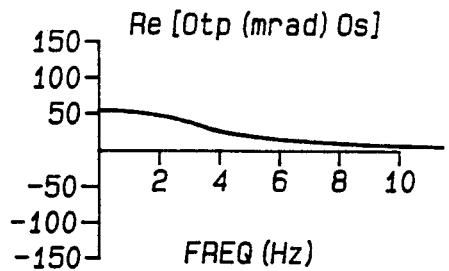
Figure 47F:
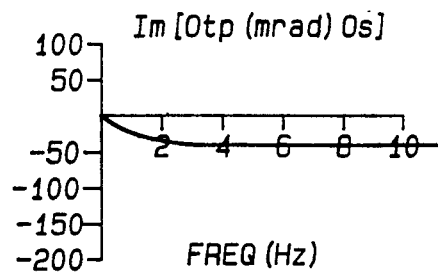
Figure 47G:
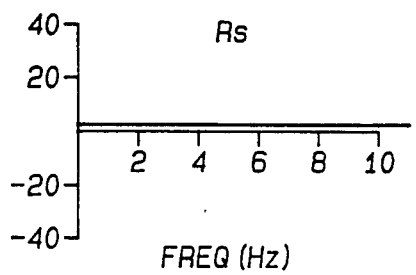
Figure 47H:
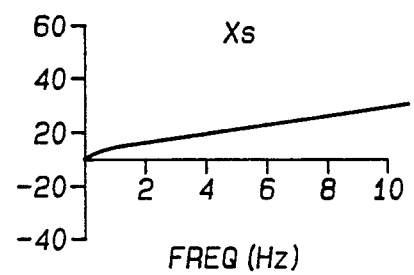
Figure 53A:
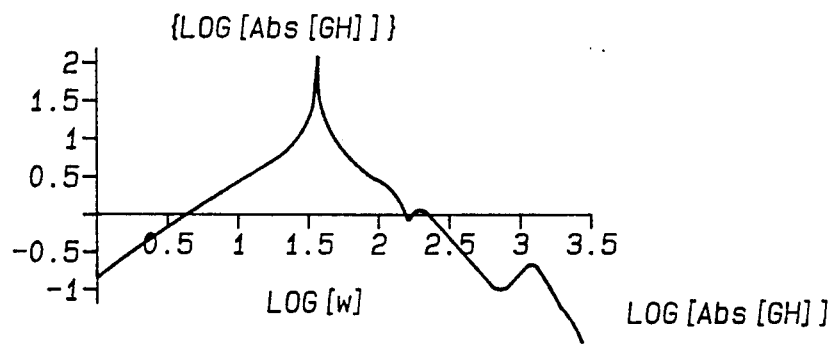
FIGS. 53A-H are plots depicting performance of a power steering system utilizing the modified variable ratio reaction valve for a high value of steering force.
Figure 53B:
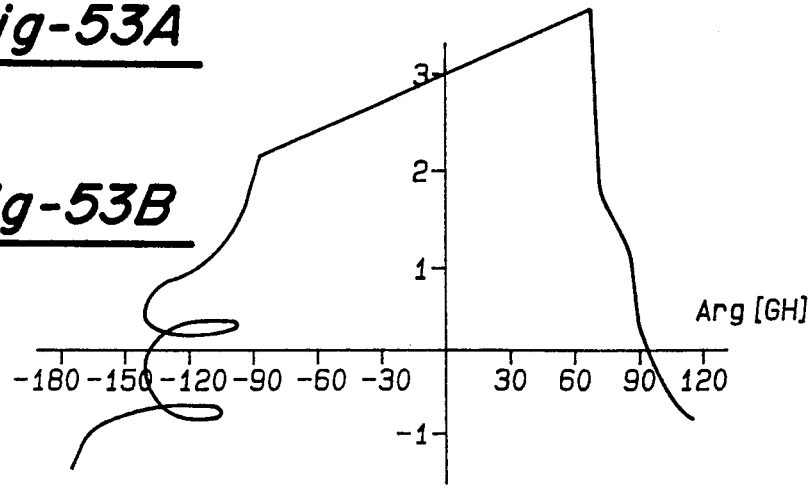

The values chosen result in steering force curves which differ considerably from those in FIGS. 46A–C. Shown in FIGS. 52A–C are plots depicting steering force as a function of applied torque, tangential valve motion and input shaft rotation, respectively, for the modified variable ratio reaction valve 1000a (when these values are utilized). Although these sets of curves differ greatly, they do not represent limits of any kind. There are enough variables available for selection that virtually any plausible curve shapes can be obtained.

Shown in FIGS. 53A–H are plots depicting performance of a power steering system utilizing these values for the modified variable ratio reaction valve. Even though these values yield the dramatic changes in (static) steering forces, mentioned above, there is remarkably little change in any of the (dynamic) performance curves between those shown in FIGS. 47A–H and 53A–H.

I claim:

1. An apparatus for generating a hydraulic fluid pressure from an input torque, the ratio of said hydraulic fluid pressure to input torque being variable, said apparatus comprising:
an input shaft operable to receive said input torque;
a first valve member coupled to said input shaft;
a second valve member being in fluid communication with said first valve member via a hydraulic interface, said second valve member being coupled to a reference member, said hydraulic interface having primary and second sets of input and return orifices, said primary and secondary sets of input and return orifices being selectively utilized to define effective reaction areas as a function of said input torque, said primary and secondary sets of input and return orifices being located at selected radii;
said selected radii locating said primary sets of input and return orifices are first and second radii, respectively, wherein said first radii are smaller in value than said second radii;
said selected radii locating said secondary sets of input and return orifices are third and fourth radii, respectively, wherein said third radii are smaller in value than said fourth radii;
the difference between said second radii and said first radii is greater than the difference between said fourth radii and said third radii;
means for inducing hydraulic fluid to flow through said hydraulic interface; and
means for coupling hydraulic fluid in direct communication with said hydraulic interface to a hydraulic load.

2. The apparatus of claim 1, wherein said hydraulic fluid pressure is fluidically coupled to a utilization device and said reference member is mechanically coupled to an output member of said utilization device.

3. The apparatus of claim 2, wherein said first valve member is compliantly coupled to said input shaft.

4. The apparatus of claim 2, further comprising means for compliantly coupling said first valve member to said reference member.

5. The apparatus of claim 3, further comprising means for compliantly coupling said first valve member to said reference member.

6. The apparatus of claim 1, wherein at least one of said primary sets of input and return orifices is defined by first and second sets of nominally sharp edged corners wherein:
said first set of nominally sharp edged corners is comprised in said first valve member;
said second set of nominally sharp edged corners is comprised in said second valve member; and
said first and second sets of nominally sharp edged corners are located at slightly differing first and second radii, respectively, wherein said second radii are larger than said first radii such that said at least one of said primary sets of orifices cannot completely close when any of said secondary sets of orifices are completely closed.

7. The apparatus of claim 1, wherein at least one of said primary sets of input and return orifices is defined by a set of nominally sharp edged corners and a set of surfaces located at other than an orthogonal angle with a radial direction wherein:
said set of nominally sharp edged corners is comprised on one of said first or second valve members;
said set of surfaces is comprised on the other of said first or second valve members; and
said set of nominally sharp edged corners and said set of surfaces are proximate to one another but located such that they do not come in contact when any of said secondary sets of orifices are completely closed.

8. An apparatus for generating an output force from an input torque, the ratio of said output force to input torque being variable, said apparatus comprising:
an input shaft operable to receive said input torque;
a first valve member coupled to said input shaft;
a second valve member being in fluid communication with said first valve member via a hydraulic interface, said second valve member being coupled to an output member, said hydraulic interface having primary and secondary sets of input and return orifices, said primary and secondary sets of input and return orifices being selectively utilized to define effective reaction areas as a function of said input torque, said primary and secondary sets of input and return orifices being located at selected radii;

said selected radii locating said primary sets of input and return orifices are first and second radii, respectively, wherein said first radii are smaller in value than said second radii;

said selected radii locating said secondary sets of input and return orifices are third and fourth radii, respectively, wherein said third radii are smaller in value than said fourth radii;

the difference between said second radii and said first radii is greater than the difference between said fourth radii and said third radii;

means for inducing hydraulic fluid to flow through said hydraulic interface;

means for generating said output force in response to an applied hydraulic fluid pressure; and means for coupling hydraulic fluid from said hydraulic interface to said means for generating said output force.

9. The apparatus of claim 8, wherein said first valve member is compliantly coupled to said input shaft.

10. The apparatus of claim 8, further comprising means for compliantly coupling said first valve member to said output member of said means for generating said output force.

11. The apparatus of claim 8, further comprising means for compliantly coupling said first valve member to said output member of said means for generating said output force.

12. The apparatus of claim 8, wherein said hydraulic interface comprises primary and secondary sets of input and return orifices, said primary and secondary sets of input and return orifices being selectively utilized to define said effective reaction areas as a function of said input torque.

13. The apparatus of claim 8, wherein at least one of said primary sets of input and return orifices is defined by first and second sets of nominally sharp edged corners wherein:

said first set of nominally sharp edged corners is comprised in said first valve member;

said second set of nominally sharp edged corners is comprised in said second valve member; and said first and second sets of nominally sharp edged corners are located at slightly differing first and second radii, respectively, wherein said second radii are larger than said first radii such that said at least one of said primary sets of orifices cannot completely close when any of said secondary sets of orifices are completely closed.

14. The apparatus of claim 8, wherein at least one of said primary sets of input and return orifices is defined by a set of nominally sharp edged corners and a set of surfaces located at other than an orthogonal angle with a radial direction wherein:

said set of nominally sharp edged corners is comprised on one of said first or second valve members;

said set of surfaces is comprised on the other of said first or second valve members; and said set of nominally sharp edged corners and said set of surfaces are proximate to one another but located such that they do not come in contact when any of said secondary sets of orifices are completely closed.

15. A method for allowing an operator of a power assisted steering system to generate an output steering force comprising the steps of:

delivering an input torque to an input member which mechanically communicates with a first valve member;

forming a set of primary input and return orifices defined by first and second radii wherein said first radii are smaller than said second radii;

forming a set of secondary input and return orifices defined by third and fourth radii wherein said third radii are smaller than said fourth radii;

forming said primary and secondary orifices such that the difference between said second radii and said first radii is greater than the difference between said fourth radii and said third radii;

generating an output hydraulic pressure in response to pressure developed within a variable effective reaction area comprised within a hydraulic interface defined by said primary and secondary sets of input and return orifices between said first valve member and a second valve member; and generating an output steering force in response to said output hydraulic pressure in which the ratio of said output steering force to said input torque is variable.

16. The method of claim 15, wherein said output hydraulic pressure is substantially inversely proportional to said variable effective reaction area and said variable effective reaction area is a selected function of said input torque, said method comprising the additional step of generating said output steering force as a linear function of the ratio of said input torque divided by said variable effective reaction area.

17. The method of claim 16, wherein said power assisted steering system comprises an input shaft, said method comprising the additional step of compliantly coupling said first valve member to said input shaft.

18. The method of claim 16, wherein said power assisted steering system comprises a power cylinder for generating said output steering force in response to said output hydraulic pressure and a reference member which is coupled to an output member of said power cylinder, said method comprises the additional step of coupling said second valve member to said reference member.

19. The method of claim 18, wherein said method comprises the additional step of compliantly coupling said first valve member to said reference member.

20. The method of claim 17, wherein said power assisted steering system comprises a power cylinder for generating said output steering force in response to said output hydraulic pressure and a reference member which is coupled to an output member of said power cylinder, said method comprises the additional step of coupling said second valve member to said reference member.

21. The method of claim 20, wherein said method comprises the additional step of compliantly coupling said first valve member to said reference member.

* * * * *